(12) United States Patent
Icho et al.

(10) Patent No.: US 8,085,308 B2
(45) Date of Patent: Dec. 27, 2011

(54) IMAGE CORRECTION DEVICE, METHOD, INTEGRATED CIRCUIT AND SYSTEM FOR CORRECTING IMAGES CAPTURED BY A CAMERA PROVIDED IN A MOVING OBJECT

(75) Inventors: Keiji Icho, Osaka (JP); Jun Ohmiya, Kyoto (JP)

(73) Assignee: Panasonic Corporation, Osaka (JP)

( * ) Notice: Subject to any disclaimer, the term of this patent is extended or adjusted under 35 U.S.C. 154(b) by 593 days.

(21) Appl. No.: 12/279,013

(22) PCT Filed: Feb. 23, 2007

(86) PCT No.: PCT/JP2007/053426
§ 371 (c)(1),
(2), (4) Date: Dec. 12, 2008

(87) PCT Pub. No.: WO2007/097431
PCT Pub. Date: Aug. 30, 2007

(65) Prior Publication Data
US 2010/0007751 A1    Jan. 14, 2010

(30) Foreign Application Priority Data
Feb. 23, 2006  (JP) .................................. 2006-047110

(51) Int. Cl.
*H04N 5/225* (2006.01)
(52) U.S. Cl. .............. 348/208.99; 348/168; 348/208.14; 348/211.9
(58) Field of Classification Search .................. 348/168, 348/208.99, 208.14, 211.6, 211.9, 231.3, 348/333.02
See application file for complete search history.

(56) References Cited

U.S. PATENT DOCUMENTS

| 6,812,835 B2 | 11/2004 | Ito et al. |
| 2004/0201756 A1* | 10/2004 | VanBree ....................... 348/239 |
| 2005/0179801 A1 | 8/2005 | Miwa et al. |

(Continued)

FOREIGN PATENT DOCUMENTS

JP    60-53942    3/1985

(Continued)

OTHER PUBLICATIONS

International Search Report issued May 15, 2007 in the International (PCT) Application of which the present application is the U.S. National Stage.

*Primary Examiner* — Gevell Selby
(74) *Attorney, Agent, or Firm* — Wenderoth Lind & Ponack, L.L.P.

(57) ABSTRACT

An image correction device trims an image, which has been captured by a camera provided in a moving object, in accordance with a predetermined image frame to generate a corrected image that is enclosed by the predetermined image frame, and then outputs the corrected image as an output image. Even when there is an error between an actual camera position in which the camera is actually positioned and a scheduled camera position in which the camera is scheduled to be positioned, the image correction device (i) decomposes the error into a first component that extends along an imaging direction of the camera and a second component that extends along a plane orthogonal to the imaging direction, (ii) shifts the image frame in accordance with the first component, and (iii) enlarges or shrinks a size of the image frame in accordance with the second component.

24 Claims, 26 Drawing Sheets

U.S. PATENT DOCUMENTS

| | | | |
|---|---|---|---|
| 2005/0222753 A1* | 10/2005 | Ishikawa | 348/118 |
| 2006/0078162 A1* | 4/2006 | Wonneberger | 348/208.99 |
| 2006/0082656 A1* | 4/2006 | Ochiai | 348/207.99 |

FOREIGN PATENT DOCUMENTS

| | | |
|---|---|---|
| JP | 2001-319279 | 11/2001 |
| JP | 2004-4043 | 1/2004 |
| JP | 2004-328484 | 11/2004 |
| JP | 2005-295495 | 10/2005 |
| JP | 2005-303806 | 10/2005 |

* cited by examiner

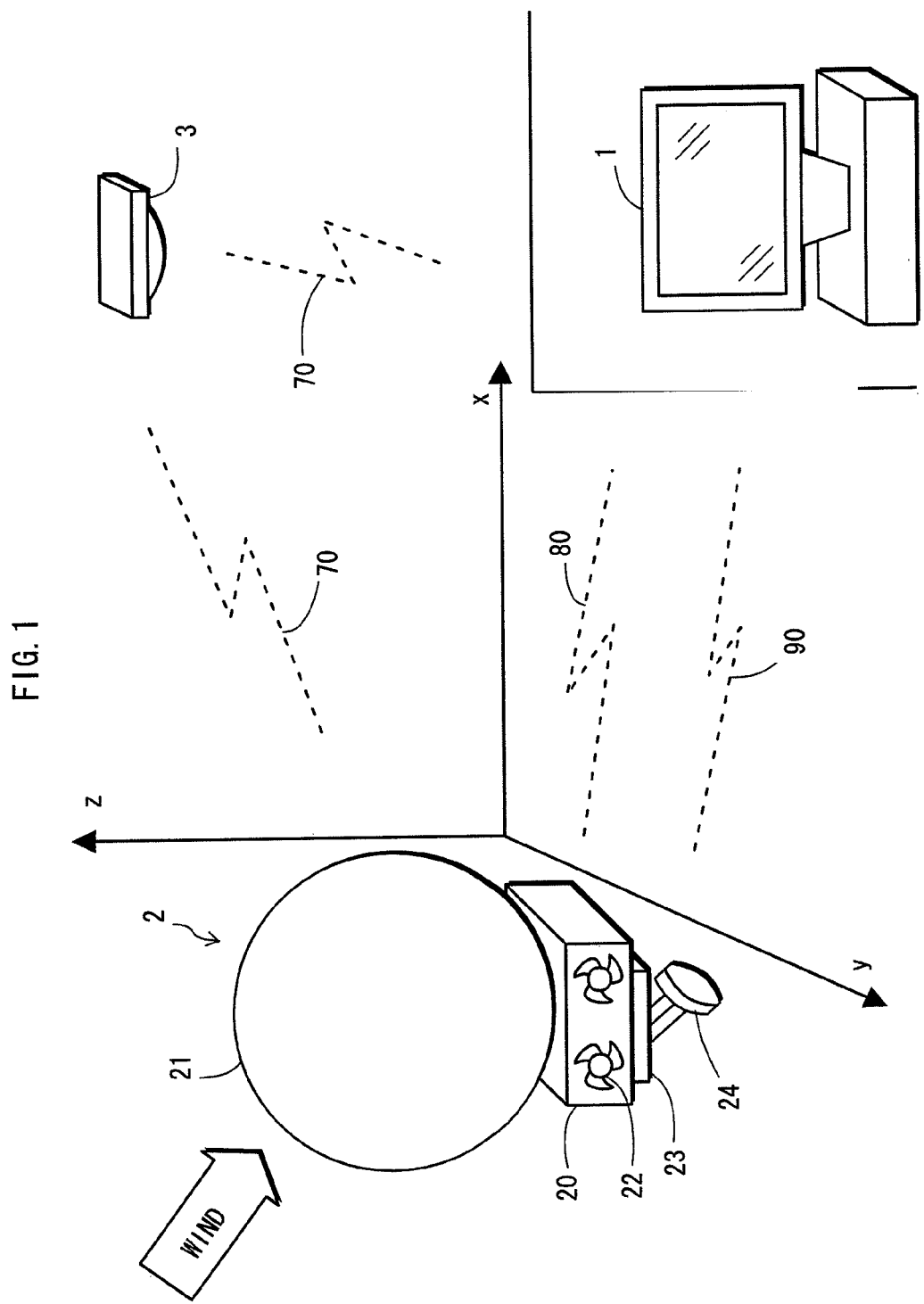

| TIME | POSITION | MOVING DIRECTION | IMAGING DIRECTION | ANGLE OF VIEW | DISTANCE |
|---|---|---|---|---|---|
| 00:16 | (10, 40, 40) | (0, -1, 0) | (0.9, 0, -0.4) | 26 | 272 |
| 00:17 | (10, 30, 40) | (0, -1, 0) | (0.9, 0, -0.4) | 26 | 271 |
| 00:18 | (10, 20, 40) | (0, -1, 0) | (0.8, -0.1, -0.6) | 26 | 271 |
| 00:19 | (20, 10, 40) | (0.6, 0.8, 0) | (0.8, 0.1, -0.6) | 26 | 271 |

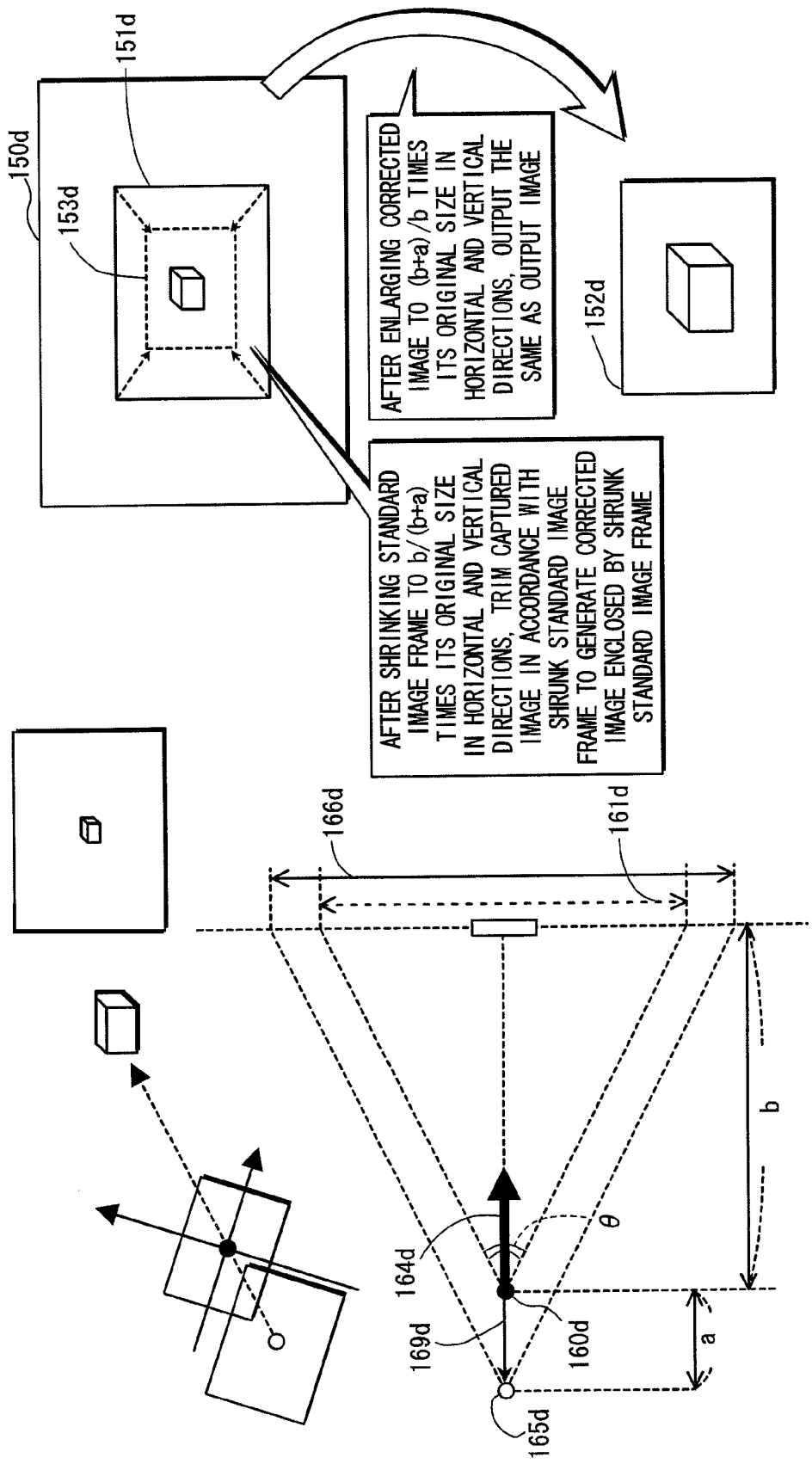

FIG. 23

| | | | | | 70a |
|---|---|---|---|---|---|
| 71a | 72a | 73a | 74a | 75a | 76a |

| | FOLLOWED TRAJECTORY INFORMATION | | | | |
|---|---|---|---|---|---|
| TIME | POSITION | MOVING DIRECTION | IMAGING DIRECTION | ANGLE OF VIEW | DISTANCE |
| 00:16 | (10, 40, 40) | (0, -1, 0) | (0.9, 0, -0.4) | 26 | 272 |
| 00:17 | (10, 30, 40) | (0, -1, 0) | (0.9, 0, -0.4) | 26 | 271 |
| 00:18 | (10, 20, 40) | (0, -1, 0) | (0.8, -0.1, -0.6) | 26 | 271 |
| 00:19 | (20, 10, 40) | (0.6, 0.8, 0) | (0.8, 0.1, -0.6) | 26 | 271 |

IMAGE CORRECTION DEVICE, METHOD, INTEGRATED CIRCUIT AND SYSTEM FOR CORRECTING IMAGES CAPTURED BY A CAMERA PROVIDED IN A MOVING OBJECT

BACKGROUND OF THE INVENTION

1. Technical Field

The present invention relates to technology for correcting an image, and in particular to technology for correcting an image captured by a camera provided in a moving object.

2. Background Art

Conventionally, in order for a camera to capture an image of a subject, technology for controlling a position and direction from/in which the camera captures the image (hereafter, "camera position" and "imaging direction") has been widely used.

For example, Patent Document 1 discloses an intruding object monitoring system for monitoring a monitor area using a first camera, detecting an intruding object within the monitor area with use of captured images, and controlling an imaging direction of a second camera such that the second camera can follow the intruding object. Patent Document 2 discloses technology for providing a camera in a moving object that moves around within a monitor area, and capturing images of a subject by controlling the camera with the moving object itself following the subject.

However, when capturing an image of a subject with use of a camera provided in a moving object (e.g., an airborne object) while the moving object is in motion, the following problem occurs: the position of the moving object may be changed by a disturbance (e.g., a wind), which can cause a detrimental effect on the image captured by the camera.

For example, assume a case where the moving object is scheduled to capture an image of the subject while it is in motion. Here, if the moving object gets dislocated from a scheduled position from which it is scheduled to perform an image capturing, then the image is captured from an unscheduled position (i.e., the camera cannot capture the image of the subject exactly as desired). Resulting problems include the subject appearing small in the captured image, the subject being located in an unscheduled position within the captured image, and so on. Although conventional technologies have been developed under the assumption that the camera is fixed and the moving object can move stably, the detrimental effect caused by the disturbance on the captured images is still too significant to ignore.

In order to address such a detrimental effect caused by the disturbance, people have been using technology for capturing an image of a subject by mechanically controlling a moving object, such that the moving object can fly, move, etc. without yielding to a disturbance. For example, in the field of observation cameras, there is technology that uses a camera provided in an airborne object (e.g., a balloon aircraft) to capture images of various areas of the Earth while keeping the airborne object stabilized in the air. Patent Document 3, listed below, discloses technology for hanging an imaging device from an airborne object (e.g., a balloon aircraft) in such a manner that the imaging device can return to its original position by its own weight even after the balloon aircraft is swayed, and for capturing an image of a designated area by remote-controlling the imaging device such that the imaging device faces a given direction.

[Patent Document 1]
Japanese Laid-Open Patent Application No. 2001-319279
[Patent Document 2]
Japanese Laid-Open Patent Application No. 2004-328484
[Patent Document 3]
Japanese Laid-Open Patent Application No. S60-53942

The above-described conventional technology is for capturing an image as scheduled, by controlling the camera to return to its original camera position, even when the disturbance has caused a detrimental effect on the camera.

However, since a disturbance occurs irregularly most of the time and thereby cannot be modeled, the moving object requires some time until it can fly stably. Until the moving object can fly stably, the camera cannot capture a desired image. Namely, it is difficult to prevent such a detrimental effect caused by the disturbance.

Incidentally, there has been proposed technology for controlling the camera and the moving object in accordance with images captured by the camera provided in the moving object. In this case, however, whether the images are captured as desired, or whether the captured images turned out to be undesirable due to the disturbance, is difficult to judge based on the captured images.

In light of the above, the present invention aims to provide an image correction device that can capture an image using a camera provided in a moving object and output the image that has been captured exactly as desired, even when a disturbance has caused detrimental effects on the moving object and the camera.

SUMMARY OF THE INVENTION

In order to solve the above problems, the present invention is an image correction device for correcting at least one image that has been captured by a camera provided in a moving object, comprising: an image acquisition unit operable to acquire the image captured by the camera; a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time; a determination unit operable to determine an output image frame, by correcting a standard image frame in accordance with the acquired positional difference information; and a corrected image output unit operable to (i) trim the captured image in accordance with the determined output image frame to generate a corrected image that is enclosed by the determined output image frame, and (ii) output the corrected image.

With the above structure, the image correction device (i) trims a captured image in accordance with a certain image frame to generate a corrected image that is enclosed by the certain output image frame, and (ii) outputs the corrected image as an output image. As the corrected image is enclosed by the certain image frame, the captured image is larger in size than the corrected image. Therefore, even when there is a positional difference between the actual camera position at the scheduled time and the scheduled camera position, the captured image includes an output image that would have been output if the image capturing were performed from the scheduled camera position, as long as the positional difference is equal to or smaller than a predetermined difference. This output image frame can be determined (position-wise and size-wise) within the captured image in accordance with a magnitude and a direction of the positional difference.

Hence, even when a disturbance has caused a detrimental effect on the image correction device, the image correction device can output, exactly as scheduled, an output image that has been unaffected by the disturbance. This can be realized by determining an output image frame (position-wise and size-wise) within the captured image in accordance with the positional difference, the output image frame enclosing an output image that would have been output if the camera performed the image capturing from the scheduled camera position.

To be specific, the above structure can be implemented in the following manner.

The present invention may be the above image correction device, further comprising: a camera information acquisition unit operable to acquire imaging direction information indicating at least one of (i) an actual imaging direction that is in range with an optical axis of the camera along which the camera captures the image from the actual camera position, and (ii) a scheduled imaging direction that is in range with an optical axis of the camera along which the camera is scheduled to perform an image capturing from the scheduled camera position, wherein (i) the standard image frame is located within the captured image in a position that is determined by a first reference point, and (ii) the determination unit includes: a decomposition subunit operable to, in accordance with the acquired imaging direction information, decompose the difference indicated by the positional difference information into (a) a first component that extends along the imaging direction indicated by the imaging direction information, and (b) a second component that extends along a plane orthogonal to the imaging direction; a size calculation subunit operable to determine a size of the output image frame, by correcting a size of the standard image frame in accordance with the first component; and a point calculation subunit operable to determine a second reference point that determines a position in which the output image frame is located within the captured image, by shifting the first reference point of the standard image frame in accordance with the second component.

Namely, the first component of the positional difference indicates whether the actual camera position is closer to or farther from a plane of a subject to be captured than the scheduled camera position. When the actual camera position is closer to the plane of the subject than the scheduled camera position, the subject naturally appears larger in the captured image than it is scheduled to. On the other hand, when the actual camera position is farther from the plane of the subject than the scheduled camera position, the subject naturally appears smaller in the captured image than it is scheduled to.

Therefore, a size of the subject within the captured image can be corrected to a scheduled size, by determining a size of the output image frame in accordance with the first component of the positional difference.

Meanwhile, the second component of the positional difference indicates to what extent an actual imaging range captured from the actual camera position has strayed off a scheduled imaging range that would have been captured if the camera were positioned in the scheduled camera position (note, an imaging range denotes a range enclosing the whole image captured).

Therefore, by determining a second reference point that determines a position in which the output image frame is located within the captured image, the output image frame can enclose an output image that would have been output if the camera was positioned in the scheduled camera position.

To be specific, the difference indicated by the positional difference information is a vector whose initial point is the scheduled camera position and whose terminal point is the actual camera position at the scheduled time; the second component is a projection vector that is projected on the orthogonal plane; and the point calculation subunit is operable to (i) calculate, in accordance with a magnitude of the projection vector, a shift amount by which the first reference point should be shifted, and (ii) shift the first reference point of the standard image frame by the calculated shift amount in a direction opposite to a direction pointed by the projection vector extending along the orthogonal plane.

It should be noted here that the decomposition of the vector is also referred to as vector resolution, which is a process of determining the magnitude of a vector.

Also, the camera information acquisition unit may be further operable to acquire (i) angle-of-view information indicating at least one of (a) an angle of view of the camera positioned in the actual camera position at the scheduled time and (b) an angle of view that the camera is scheduled to have when performing the image capturing from the scheduled camera position, and (ii) distance information indicating at least one of (c) a distance between the actual camera position and a subject to be captured in the image and (d) a distance between the scheduled camera position and the subject to be captured, and the point calculation subunit may be operable to (i) calculate a size of an imaging range in accordance with the acquired angle-of-view information and distance information, and (ii) calculate the shift amount in view of a ratio of the size of the imaging range to the magnitude of the projection vector.

The direction and the shift amount in/by which a first reference point should be shifted are determined based on the projection vector. This determination process can be conducted more accurately (i.e., it is possible, with higher accuracy, to output an output image that has a resemblance to an output image that is scheduled to be output), by determining the second reference point that determines a position in which the output image frame is located within the captured image. Moreover, it is possible to calculate the reference point of the output image frame with even higher accuracy, by calculating the shift amount of the first reference point in view of the camera angle and the distance between the camera position and the plane of the subject.

As stated earlier, the first component of the positional difference indicates whether the actual camera position is closer to or farther from the plane of the subject than the scheduled camera position. The following specifically describes how to determine the output image frame.

The difference may be expressed by a vector whose initial point is the scheduled camera position and whose terminal point is the actual camera position at the scheduled time, and the size calculation subunit may determine the output image frame by (i) enlarging the size of the standard image frame when the first component of the vector is pointing in the same direction as the imaging direction, or (ii) shrinking the size of the standard image frame when the first component of the vector is pointing in a direction opposite to the imaging direction.

With this structure, the image correction device enlarges or shrinks the size of the output image frame, depending on whether the actual camera position is closer to or farther from the plane of the subject than the scheduled camera position. This way, a size of the subject is uniform in both (i) the corrected image (output image) obtained by trimming the captured image captured from the actual camera position, and (ii) an output image that would have been output if the image capturing were performed from the scheduled camera position. Put another way, it is possible to output the output image that has a resemblance to an output image that is scheduled to be output.

More specifically, the size calculation subunit may (i) include a scale determination subunit operable to, in accordance with a magnitude of the first component, determine a scale according to which the size of the standard image frame should be corrected, and (ii) correct the size of the standard image frame according to the determined scale.

Also, the difference indicated by the positional difference information may be a vector whose initial point is the scheduled camera position and whose terminal point is the actual camera position at the scheduled time; the magnitude of the first component of the vector is a, while a distance between the scheduled camera position and a subject to be captured in the image is b; the camera information acquisition unit may be further operable to acquire distance information indicating the distance between the scheduled camera position and the subject to be captured, and the scale determination subunit may determine the scale to be (i) b/(b−a) when the first component of the vector is pointing in the same direction as the imaging direction, and (ii) b/(b+a) when the first component of the vector is pointing in a direction opposite to the imaging direction.

This way, the size of the output image frame can be determined with higher accuracy.

Incidentally, there are cases where a size of the output image is preferably standardized, because the size of the output image may sometimes be limited to a certain displayable size due to restrictions placed by image display software/hardware. Here, assume a case where the size of the output image frame has been changed by the size calculation subunit; if the corrected image enclosed by the output image frame is output unmodified, then a size of this corrected image would be different from the standardized size.

In light of the above, the corrected image output unit may (i) include an output image size adjustment subunit operable to (a) trim the captured image in accordance with the output image frame to generate the corrected image that is enclosed by the determined output image frame and (b) enlarge or shrink the corrected image by multiplying a size of the corrected image by a multiplicative inverse of the determined scale, and (ii) output the corrected image whose size has been multiplied by the multiplicative inverse of the determined scale.

This way, the size of the output image can be standardized.

It is also possible to determine the output image frame in view of a roll control of the camera.

That is to say, the camera can be rotated in roll about an imaging direction that is in range with an optical axis of the camera along which the camera captures the image at the scheduled time, the imaging direction serving as a rotation axis; the image correction device may further comprise a roll angle information acquisition unit operable to acquire actual roll angle information indicating an actual rotation amount by which an imaging range has been rotated at the scheduled time, the actual rotation amount being expressed by means of an angle, and the determination unit may determine the output image frame, by correcting the standard image frame in accordance with the positional difference information in view of the acquired actual roll angle information.

More specifically, the roll angle information acquisition unit may be further operable to acquire scheduled roll angle information indicating a scheduled rotation amount, by which the imaging range is scheduled to be rotated when the camera is in the scheduled camera position; the determination unit may include a rotation amount difference calculation subunit operable to calculate a rotation amount difference indicating a difference between (i) the scheduled rotation amount indicated by the acquired scheduled roll angle information and (ii) the actual rotation amount indicated by the acquired actual roll angle information, and the determination unit may determine the output image frame, by rotating the corrected standard image frame according to the rotation amount difference calculated by the rotation amount difference calculation subunit.

Also, the standard image frame may be located within the captured image in a position that is determined by a first reference point; the determination unit further may include (i) a point calculation subunit operable to determine, in accordance with the positional difference information, a direction in which and a shift amount by which the first reference point of the standard image frame should be shifted and (ii) a point correction subunit operable to (a) shift the first reference point by the determined shift amount in the determined direction, and (b) rotate the shifted first reference point about the original first reference point of the standard image frame, by the actual rotation amount indicated by the actual roll angle information, in a direction opposite to a rotation direction suggested by the actual roll angle information; and the determination unit determines the output image frame by (a) positionally determining a new image frame within the captured image in accordance with the shifted and rotated first reference point, and (b) rotating the new image frame about the shifted and rotated first reference point, by the rotation amount difference calculated by the rotation amount difference calculation subunit, in a direction opposite to a rotation direction suggested by the rotation amount difference.

Even when the camera has been rolled at the scheduled time of capturing the image from the actual camera position, the image correction device with the above structure can determine a frame enclosing the scheduled output image as the output image frame, in view of the roll control.

When the actual imaging direction, in which the camera captures the image from the actual camera position, is not parallel to the scheduled imaging direction, in which the camera is scheduled to perform the image capturing from the scheduled camera position, the following should be implemented specifically.

The above image correction device may further comprise an imaging direction error information acquisition unit operable to acquire imaging direction error information indicating an error between (i) an actual imaging direction that is in range with an optical axis of the camera along which the camera captures the image from the actual camera position, and (ii) a scheduled imaging direction that is in range with an optical axis of the camera along which the camera is scheduled to perform an image capturing from the scheduled camera position, wherein the determination unit determines the output image frame, by correcting the standard image frame in accordance with the positional difference information in view of the acquired imaging direction error information.

More specifically, the above image correction device may further comprise a camera information acquisition unit operable to acquire imaging direction information indicating at least one of the actual imaging direction and the scheduled imaging direction. Here, the standard image frame may be located within the captured image in a position that is determined by a first reference point, and the determination unit may include: a decomposition subunit operable to, in accordance with the acquired imaging direction information, decompose (i) the difference indicated by the positional difference information into (a) a first component that extends along the imaging direction indicated by the imaging direction information and (b) a second component that extends along a plane orthogonal to the imaging direction, and (ii) the error indicated by the imaging direction error information into (c) a first component that extends along the imaging direction indicated by the imaging direction information and (d) a second component that extends along a plane orthogonal to the imaging direction; a size calculation subunit operable to determine a size of the output image frame, by correcting a size of the standard image frame in accordance with the first component of the difference and the first component of the error; and a point calculation subunit operable to determine a second reference point that determines a position in which the output image frame is located within the captured image, by shifting the first reference point of the standard image frame in accordance with the second component of the difference and the second component of the error.

The error between the actual imaging direction and the scheduled imaging directions can be decomposed into the first component and the second component. Hence, even when there is such an error in the actual and scheduled imaging directions, the output image frame can be determined in view of the error.

Assume a case where the moving object has been rolled or pitched, and the scheduled camera position denotes a camera position in an unrolled/unpitched moving object where as the actual camera position denotes a camera position in the unrolled/unpitched moving object. In such a case, the camera's actual imaging direction strays, off its scheduled imaging direction due to the rolling/pitching control of the moving object. For example, if the moving object is scheduled to be in an unpitched state when positioned in the scheduled camera position, there is a case where the moving object may be pitched when positioned in the actual camera position, which results in the actual imaging direction being different from the scheduled imaging direction by an amount of the pitch. However, even if such a result is derived, the output image frame may be determined by decomposing the error between the actual and scheduled imaging directions into the first and second components, in the above-described manner.

The above image correction device may further comprise a movement error information acquisition unit operable to acquire moving object movement error information indicating at least one of (i) an actual roll angle and a scheduled roll angle, (ii) an actual pitch angle and a scheduled pitch angle, and (iii) an actual yaw angle and a scheduled yaw angle, where the actual roll, pitch and yaw angles are of the moving object at the scheduled time, whereas the scheduled roll, pitch and yaw angles are of the moving object when the camera is in the scheduled camera position, wherein the determination unit determines the output image frame, by correcting the standard image frame in accordance with the positional difference information in view of the acquired moving object movement error information.

More specifically, the above image correction device may further comprise a camera information acquisition unit operable to acquire imaging direction information indicating at least one of (i) an actual imaging direction that is in range with an optical axis of the camera along which the camera captures the image from the actual camera position, and (ii) a scheduled imaging direction that is in range with the optical axis of the camera along which the camera is scheduled to perform an image capturing from the scheduled camera position, wherein the determination unit includes: a decomposition subunit operable to, in accordance with the acquired imaging direction information, decompose (i) the difference indicated by the positional difference information into (a) a first component that extends along the imaging direction indicated by the imaging direction information and (b) a second component that extends along a plane orthogonal to the imaging direction, and (ii) the difference indicated by the moving object movement error information into (c) a first component that extends along the imaging direction indicated by the imaging direction information and (d) a second component that extends along a plane orthogonal to the imaging direction; a size calculation subunit operable to determine a size of the output image frame, by correcting a size of the standard image frame in accordance with a sum of (i) the first component of the difference indicated by the positional difference information and (ii) the first component of the difference indicated by the moving object movement error information; and a point calculation subunit operable to determine a second reference point that determines a position in which the output image frame is located within the captured image, by shifting the first reference point of the standard image frame in accordance with a sum of (i) the second component of the difference indicated by the positional difference information and (ii) the second component of the difference indicated by the moving object movement error information.

This way, the output image frame can be determined in view of an error between the actual and scheduled movements of the moving object.

Also, the present invention may be the above image correction device wherein (i) the standard image frame is located within the captured image in a position that is determined by a first reference point, and (ii) the determination unit includes a point calculation subunit operable to determine a second reference point that determines a position in which the output image frame is located within the captured image, by shifting the first reference point of the standard image frame in accordance with the difference indicated by the positional difference information.

For example, when the first component of the difference between the scheduled and actual camera positions is so small that the effect of such a difference on the captured image is ignorable, it is allowed to only determine the output image frame positionally within the captured image while leaving the size of the corrected image unmodified. This can accelerate the speed of determining the output image frame.

The present invention may also be the above image correction device wherein the determination unit is operable to determine a size of the output image frame, by enlarging or shrinking a size of the standard image frame in accordance with the difference indicated by the positional difference information.

For example, when the second component of the difference between the scheduled and actual camera positions is so small that the effect of such a difference on the captured image is ignorable, it is allowed to only determine the size of the output image frame while leaving the position of the first reference point unmodified. This can accelerate the speed of determining the output image frame.

The present invention may also be the above image correction device further comprising an instruction information acquisition unit operable to acquire instruction information indicating a path that the moving object is scheduled to follow, wherein (i) the moving object makes the camera capture the image while moving in accordance with the instruction information, and (ii) the scheduled camera position is on the path indicated by the instruction information.

The present invention may be implemented in the following manner.

The above image correction device may further comprise an image correction information acquisition unit operable to acquire and store therein image correction information that includes a correction method for correcting the standard image frame, the image correction information and the correction method corresponding to the difference indicated by the positional difference information, wherein the determination unit determines the output image frame in accordance with the correction method, by reading out the correction method from the stored image correction information.

More specifically, the present invention may be the above image correction device wherein: the standard image frame is located within the captured image in a position that is determined by a first reference point; the image correction information includes, in one-to-one correspondence, (i) a size of the output image frame and (ii) a second reference point that determines a position in which the output image frame is located within the captured image; and the determination unit determines the output image frame to be a frame specified by the size and the second reference point that are included in the image correction information.

In this case, since a method for determining the output image frame in accordance with the difference is pre-acquired and pre-stored, there is no need to perform processing for calculating the position and the size of the output image frame. This can accelerate a processing speed.

The present invention may also be implemented as follows.

The present invention may be the above image correction device, wherein (i) the moving object makes the camera capture the at least one image that is used for generating a video, (ii) the image correction device makes the determination unit determine the output image frame for each of the images, and (iii) the corrected image output unit includes a video output subunit operable to output the video by (a) trimming each image in accordance with a corresponding one of the determined output image frames to generate at least one corrected image each of which is enclosed by the corresponding one of the output image frames, and (b) reconstructing the corrected images in a video format.

This way, the image correction device can correct and output the video, which has been generated using the images captured by the camera, by correcting the captured images.

The present invention may also be implemented as follows.

The present invention may be an image correction system for correcting at least one image that has been captured by a camera provided in a moving object, comprising: a scheduled position reception unit operable to receive a scheduled camera position in which the camera is scheduled to be positioned at a scheduled time to capture the image; a scheduled position information storage unit operable to store therein the received scheduled camera position as scheduled position information; a trajectory information acquisition unit operable to acquire trajectory information indicating a trajectory that the moving object has actually followed; a positional difference calculation unit operable to, in accordance with the scheduled position information and the acquired trajectory information, calculate a difference between (i) the scheduled camera position and (ii) an actual camera position in which the camera is positioned at the scheduled time; a determination unit operable to determine an output image frame, by correcting a standard image frame in accordance with the difference calculated by the positional difference calculation unit; and a corrected image output unit operable to (i) trim the captured image in accordance with the determined output image frame to generate a corrected image that is enclosed by the determined output image frame, and (ii) output the corrected image.

This way, the scheduled path that the moving object is supposed to follow can be specified even after the image capturing, which allows outputting an output image that would have been obtained if the moving object performed the image capturing following the scheduled path.

The present invention is also an image correction method for correcting at least one image that has been captured by a camera provided in a moving object, comprising the steps of: acquiring the image captured by the camera; acquiring positional difference information indicating a difference between (i) a scheduled camera position in which the camera is scheduled to be positioned at a scheduled time to capture the image and (ii) an actual camera position in which the camera is positioned at the scheduled time; determining an output image frame by correcting a standard image frame in accordance with the calculated difference; and trimming the captured image in accordance with the determined output image frame to generate a corrected image that is enclosed by the determined output image frame, and outputting the corrected image.

The present invention is also A control program that makes an image correction method perform image correction processing for correcting at least one image that has been captured by a camera provided in a moving object, comprising the steps of: acquiring the image captured by the camera; acquiring positional difference information indicating a difference between (i) a scheduled camera position in which the camera is scheduled to be positioned at a scheduled time to capture the image and (ii) an actual camera position in which the camera is positioned at the scheduled time; determining an output image frame by correcting a standard image frame in accordance with the calculated difference; and trimming the captured image in accordance with the determined output image frame to generate a corrected image that is enclosed by the determined output image frame, and outputting the corrected image.

The present invention may be an integrated circuit that performs image correction processing for correcting at least one image that has been captured by a camera provided in a moving object, comprising: an image acquisition unit operable to acquire the image captured by the camera; a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time; a determination unit operable to determine an output image frame by correcting a standard image frame in accordance with the calculated difference; and a corrected image output unit operable to (i) trim the captured image in accordance with the determined output image frame to generate a corrected image that is enclosed by the determined output image frame, and (ii) output the corrected image.

BRIEF DESCRIPTION OF THE DRAWING

FIG. 1 shows an overview of the structure of the present invention.

FIGS. 18A and 18B show a process in which the image correction processing unit 14 determines the output image frame when the positional error vector is pointing in the opposite direction from the imaging direction.

FIG. 23 shows followed trajectory information 70a.

DESCRIPTION OF CHARACTERS

Figure 2A:
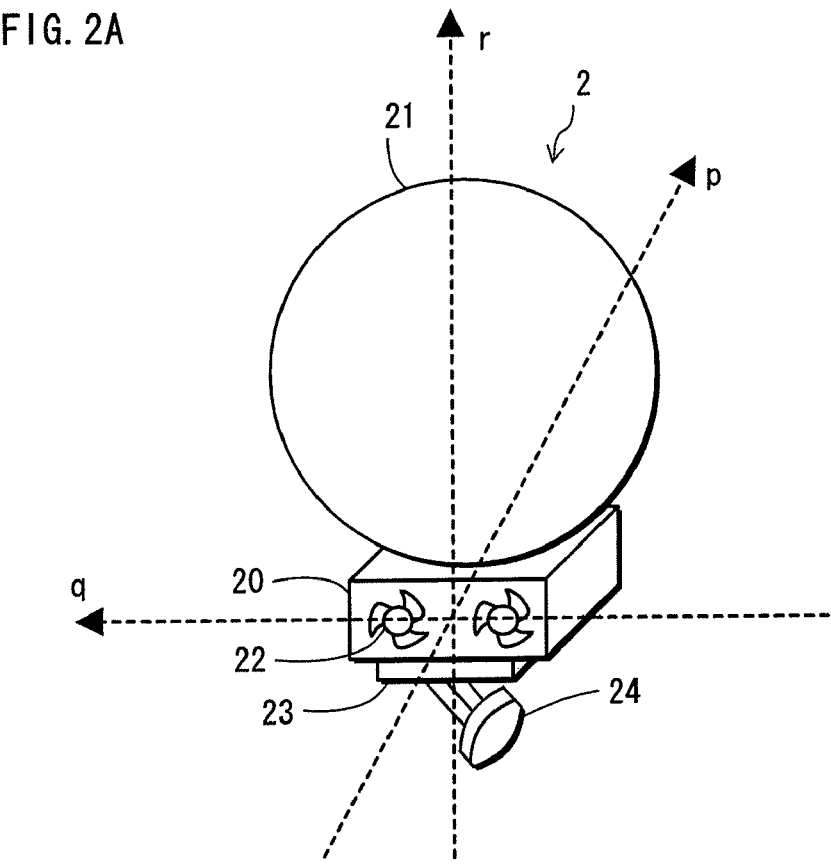
FIGS. 2A-2C each show a camera coordinate system.

1 image correction device
2 moving object
3 movement instruction device
4 display
20 main body of the moving object
21 balloon
22 propeller
23 ball head
24 camera
201 instruction information acquisition unit
202 positional error calculation unit
203 position management unit
204 GPS
205 directional error calculation unit
206 direction management unit
207 gyroscope
208 positional difference information transmission unit
209 propeller power correction unit
210 propeller power control unit
211 camera angle correction unit
212 camera angle control unit
213 captured image acquisition unit
214 captured image information transmission unit
1000 image correction device
1010 image correction processing unit
1011 positional difference information acquisition unit
1012 captured image information acquisition unit
1013 camera information acquisition unit
1101 point calculation subunit
1102 size calculation unit
1015 image output unit
2000 camera device
3000 path specifying device

DETAILED DESCRIPTION OF THE INVENTION

Embodiment

A description of the present invention is provided below, with an emphasis on an image correction device 1.

1.1 Overview

The image correction device 1 of the present invention outputs an image captured by a camera 24 provided in a moving object 2 after making a correction to the captured image. The moving object 2 is, for example, an airborne object, such as a gas balloon object. In the following example case, the moving object 2 will be described as a gas balloon object. The camera 24 is provided in the moving object 2. The moving object 2 moves around and captures an image according to instruction information 70, which is obtained by performing communication with a movement instruction device 3 indoors, in a park, or the like.

FIG. 1 shows an overview of the structure of the present invention.

The image correction device 1, the moving object 2 and the movement instruction device 3 are illustrated in FIG. 1.

First, functions of the movement instruction device 3, the moving object 2 and the image correction device 1 are briefly explained below, in listed order.

1.1.1 Overview of the Movement Instruction Device 3

The movement instruction device 3 issues an instruction specifying (i) a scheduled path that the moving object 2 is scheduled to follow and (ii) an imaging method of the camera 24. Specifically, the movement instruction device 3 transmits, to the moving object 2, instruction information 70 including information on (i) the scheduled path that the moving object 2 is scheduled to follow and (ii) the imaging method of the camera 24. The movement instruction device 3 transmits the instruction information 70 to the image correction device 1 as well.

1.1.2 Overview of the Moving Object 2

The moving object 2 captures an image using the camera 24 while controlling its own movement, so as to follow the scheduled path as instructed by the movement instruction device 3, even when it has been affected by a disturbance (e.g., a wind).

Specifically, upon receiving the instruction information 70 from the movement instruction device 3, the moving object 2 controls itself, so as to follow the scheduled path indicated by the instruction information 70 and to capture an image using the imaging method indicated by the instruction information 70.

Provided on top, at the bottom, and in the back of the moving object 2 are a balloon, a pair of ball head 23 and camera 24, and a propeller 22, respectively. The moving object 2 successively acquires its current (actual) position, and stores therein positional difference information 80 indicating an error between its actual position and its scheduled position (i.e., a position in which the moving object 2 is scheduled to be positioned along the scheduled path indicated by the instruction information 70). If the disturbance (e.g., the wind) causes the moving object 2 to stray off the scheduled path indicated by the instruction information 70, then the moving object 2 controls the propeller 22 to make a course correction and put itself back on the scheduled path.

The moving object 2 also controls the imaging method of the camera 24 by means of the ball head 23, such that the camera captures an image using the imaging method indicated by the instruction information 70. The moving object 2 stores therein the image captured by the camera 24 with an identifier added thereto, and generates captured image information 90 indicating, in one-to-one correspondence, (i) the time at which the image was captured and (ii) the identifier. The captured image information 90 is for managing the image captured by the camera 24.

The moving object 2 transmits the captured image, the positional difference information 80 and the captured image information 90 to the image correction device 1.

1.1.3 Overview of the Image Correction Device 1

The image correction device obtains the captured image, the positional difference information 80 and the captured image information 90 that are transmitted by the moving object 2. The positional difference information 80 indicates, in one-to-one correspondence with the time at which the image was captured, an error between the actual position of the moving object 2 and the scheduled position of the moving object 2. Based on this error, the image correction device 1 corrects the image captured at the stated time.

1.1.4 How to Express a Position of the Moving Object 2 and an Imaging Direction of the Camera 24

The following is an additional description of the position of the moving object 2 and the imaging direction of the camera 24.

Assume that the position of the moving object 2 is expressed in a real-space, three-dimensional coordinate system. Real-space, three-dimensional coordinates are referred to as global coordinates. In FIG. 1, the global coordinates are of the form (x,y,z). It is assumed in Embodiment 1 that the xy-plane is a plane parallel to the surface of the Earth and the z direction represents a height direction.

The imaging direction of the camera 24 is expressed in a camera coordinate system whose origin is the camera 24.

Figure 2B:
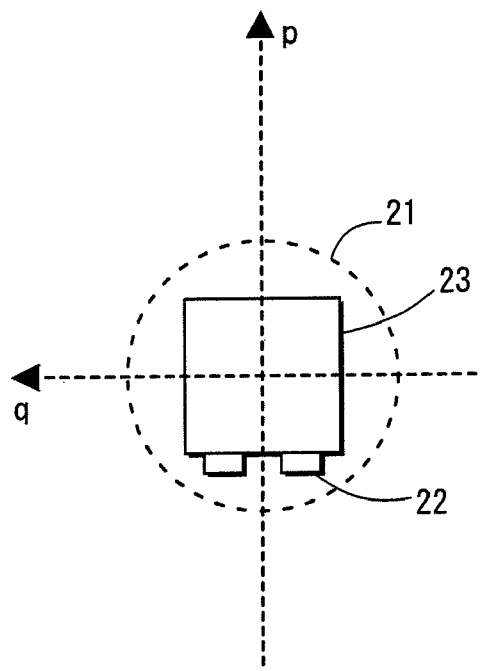
Figure 2C:
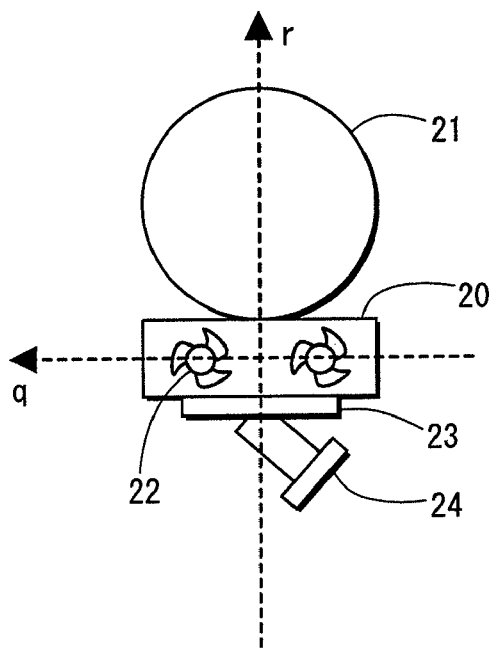

FIGS. 2A-2C each show a camera coordinate system.

FIG. 2A is a perspective view showing the moving object 2. As shown in FIG. 2A, the camera coordinate system comprises the p-, q- and r-axes, with the camera 24 being the origin of the system. In the present embodiment, the p-axis extends in the direction connecting the front and back of the moving object 2, and the r-axis extends in the direction connecting the top and bottom of the moving object 2. The p- and r-axes are orthogonal to each other. The q-axis extends orthogonal to the pr-plane. That is, the p-, q- and r-axes respectively represent the direction connecting the front and back of the moving object 2, the direction connecting the left and right of the moving object 2, and the direction connecting the top and bottom of the moving object 2. A positive direction of the p-axis is the direction along the p-axis toward the front of the moving object 2. A positive direction of the q-axis is the direction along the q-axis toward the left of the moving object 2. A positive direction of the r-axis is the direction along the r-axis toward the top of the moving object 2.

FIG. 2B is a plan view of the moving object 2. FIG. 2C is a rear view of the moving object 2.

The imaging direction of the camera 24 is expressed by a unit vector that starts from the origin of the camera coordinate system and is described by a combination of the following components: the p-, q- and r-axes. For example, when the imaging direction of the camera 24 is "(1, 0, 0)", the camera 24 faces the front of the moving object 2. When the imaging direction of the camera 24 is "(0, 1, 0)", the camera 24 faces the left of the moving object 2.

1.1.5 Prerequisites for Embodiment 1

Described below are prerequisites for Embodiment 1.

First, prerequisites for the maneuver of the moving object 2 are described.

Movements of an airborne object, such as the moving object 2, are categorized into three major types: roll, pitch and yaw.

Roll refers to rotations of the moving object 2 about the p-axis (the axis connecting the front and back of the moving object 2). In other words, roll indicates tilting of the moving object to the left or right.

Pitch refers to rotations of the moving object 2 about the q-axis (the axis connecting the left and right of the moving object 2). In other words, pitch is an up-down movement of a nose of the moving object 2.

Yaw refers to rotations of the moving object 2 about the r-axis (the axis connecting the top and bottom of the moving object 2). In other words, yaw is a side-to-side movement of the nose of the moving object 2.

It is assumed in Embodiment 1 that the moving object 2 is hardly rolled/pitched, or that the moving object 2 by nature puts itself back to its original equilibrium state if it was rolled/pitched. Put another way, in terms of structure, the moving object 2 has an excellent lateral and longitudinal stabilities. It should be noted that technology for improving lateral and longitudinal stabilities of an airborne object, such as the moving object 2, has been extensively studied and disclosed conventionally. This technology is not a characteristic element of the present invention, and detailed descriptions of such technology are therefore omitted.

Second, prerequisites for the maneuver of the camera 24 will be described below.

The camera 24 provided in the moving object 2 can be tilted, panned, and rolled. Panning the camera 24 means rotating the camera 24 about the r-axis of the moving object 2. Panning the camera 24 makes the camera 24 turn to the left or right, from the perspective of the moving object 2. Tilting the camera 24 means tilting the camera 24 relative to the pq-plane. Tilting the camera 24 makes the camera 24 tilt up or down (i.e., look up above or look down below the moving object 2), from the perspective of the moving object 2. Rolling the camera 24 means rotating the camera 24 about the imaging direction of the camera 24.

In Embodiment 1, it is assumed that the camera 24 can be tilted and panned, but not rolled.

It should be mentioned that in reality, the moving object 2 gets rolled and pitched as it makes up/down movements and clockwise/counterclockwise turns. However, it is assumed that the rolling and pitching of the moving object 2 has such a minuscule effect on the image captured by the camera 24 that the effect can be ignored. Put another way, it is assumed that movements of the moving object 2 are so gentle that they do not yield any poor result for the captured image (examples of the poor result include a situation where, regardless of an attempt of the camera 24 to capture an image of the Earth's horizon horizontally, the Earth's horizon appears slanted in the captured image as if the captured image was rotated by rolling the moving object 2). Or, alternatively, if the moving object 2 is tilted by getting rolled or pitched, then the camera 24 may be automatically rolled or pitched in accordance with the tilt movement of the moving object 2, so as to protect the captured image from being rotated to the point where the tilt is too obviously noticeable in the captured image to ignore.

The following describes the structures of the moving object 2 and the image correction device 1 in listed order. It should be noted here that all the movement instruction device 3 needs is to have a communication function for transmitting the instruction information 70; therefore, constituent elements of the movement instruction device 3 have no characteristic features. Accordingly, detailed descriptions of the movement instruction device 3 are omitted.

1.2 Structure of the Moving Object 2

The following is a specific description of the structure of the moving object 2.

Figure 3:
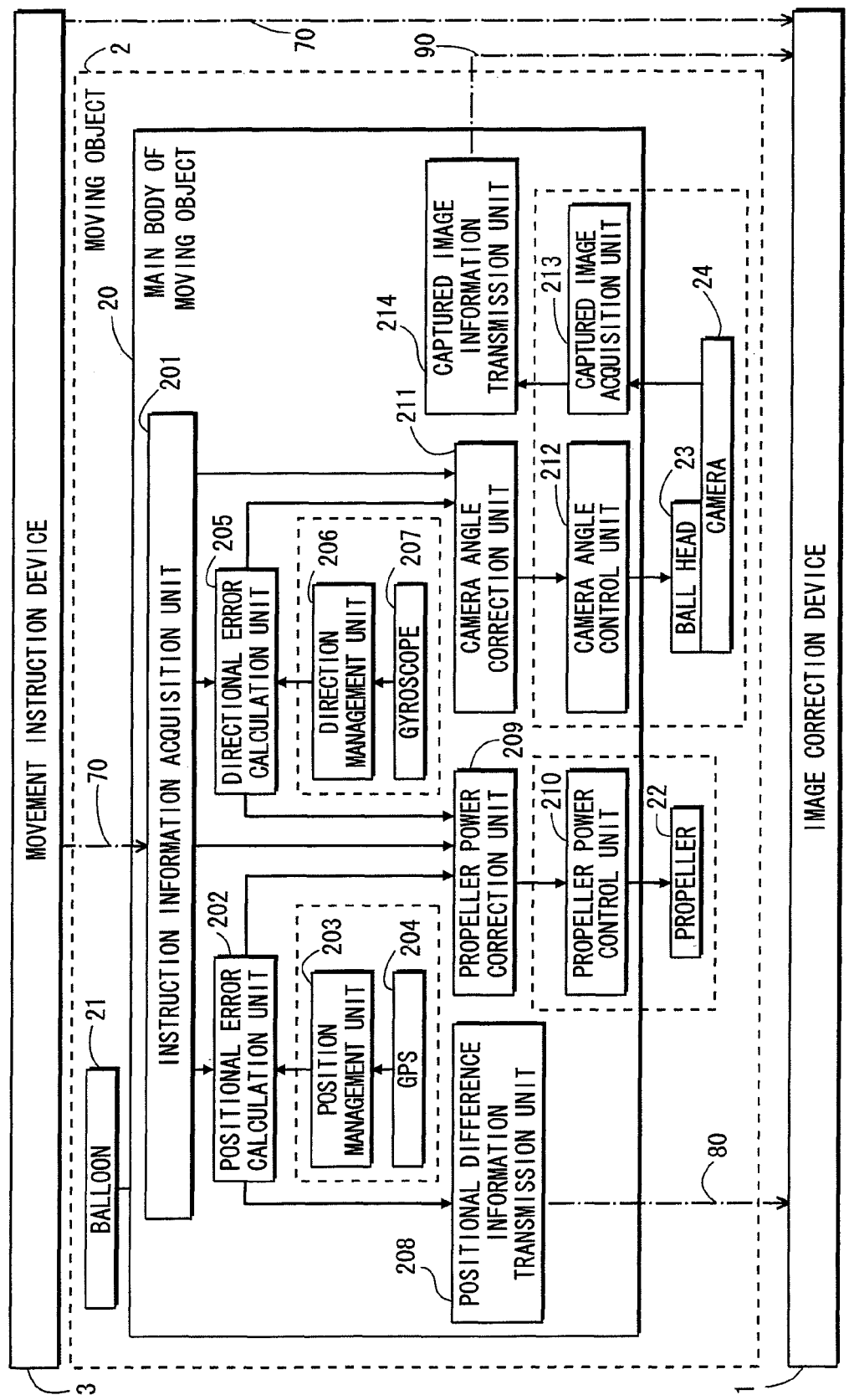
FIG. 3 is a functional block diagram showing the structure of a moving object 2.

FIG. 3 is a functional block diagram showing the structure of the moving object 2.

As shown in FIG. 3, the moving object 2 includes a main body 20, a balloon 21, a propeller 22, a ball head 23, and a camera 24. In the past, a moving object having a balloon, a propeller, a ball head and a camera has been used in a variety of scenes. One example of such scenes is when a disaster has occurred inside a building, outdoors, and so forth where it is necessary to capture, from a bird's eye view, an image of an area that is too dangerous for a person to get in. For this reason, specific implementations of the moving object 2 (i.e., the size of the balloon and the weight of the moving object 2) are omitted.

1.2.1 Balloon 21

As described above, the balloon 21 is provided on top of the moving object 2, and in the present embodiment, the balloon 21 is regarded as a gas balloon object. The balloon 21 is filled with a gas lighter than the surrounding atmosphere, such as helium. This gives the moving object 2 enough buoyancy to make itself airborne in the air.

1.2.2 Propeller 22

As mentioned earlier, the propeller 22 is provided in the back of the moving object 2. The moving object 2 can control its movement by controlling the propeller 22.

1.2.3 Ball Head 23

The ball head 23 allows changing the camera angle of the camera 24. In other words, the ball head 23 allows panning and tilting the camera 24.

1.2.4 Camera 24

The camera 24 can capture an image with a wider angle of view than it is scheduled to. For example, the camera 24 captures an image with an angle of view 2-4 times wider than an angle of view that is required in an image to be output thereby.

1.2.5 Main Body 20

The main body 20 is composed of CPU (Central Processing Unit), ROM (Read Only Memory), RAM (Random Access Memory), etc., and controls maneuvering of the propeller 22, ball head 23 and camera 24 by executing a computer program. The main body 20 also has a communication function and performs communication with the movement instruction device 3 and the image correction device 1.

Specifically, the main body 20 is composed of: an instruction information acquisition unit 201; a positional error calculation unit 202; a position management unit 203; GPS 204; a directional error calculation unit 205; a direction management unit 206; a gyroscope 207; a positional difference information transmission unit 208; a propeller power correction unit 209; a propeller power control unit 210; a camera angle correction unit 211; a camera angle control unit 212; a captured image acquisition unit 213; and a captured image information transmission unit 214.

1.2.6 Instruction Information Acquisition Unit 201

The instruction information acquisition unit 201 has a communication function and performs communication with the movement instruction device 3.

To be specific, the instruction information acquisition unit 201 acquires the instruction information 70 transmitted from the movement instruction device 3.

1.2.6.1 Instruction Information 70

The following describes the instruction information 70 in detail, in order to make it convenient to further describe the present invention below.

Figure 7A:
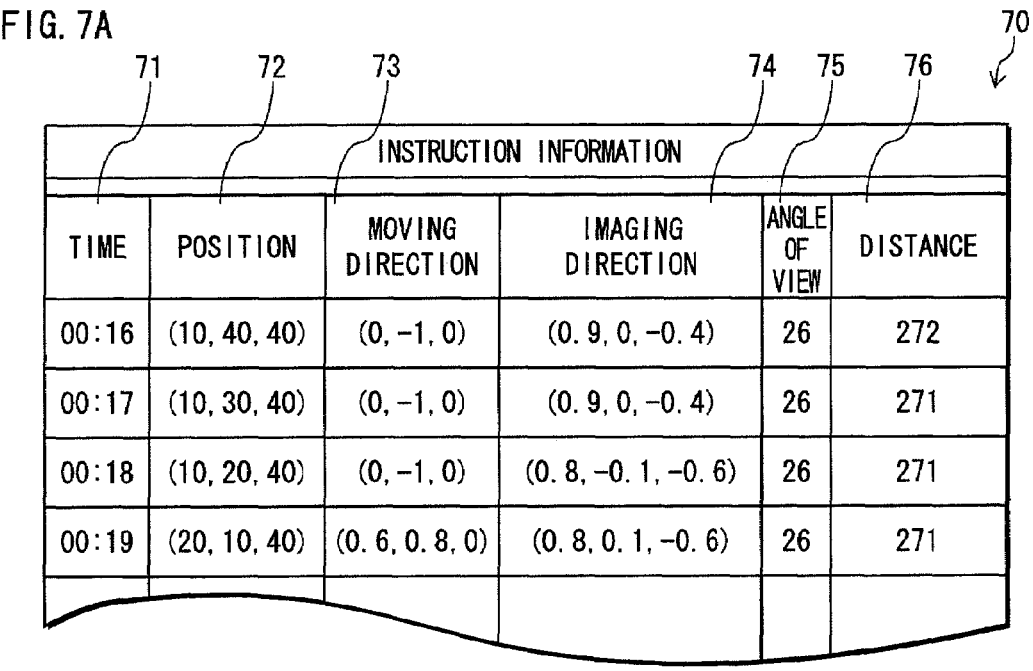
FIGS. 7A and 7B show instruction information 70.
Figure 7B:
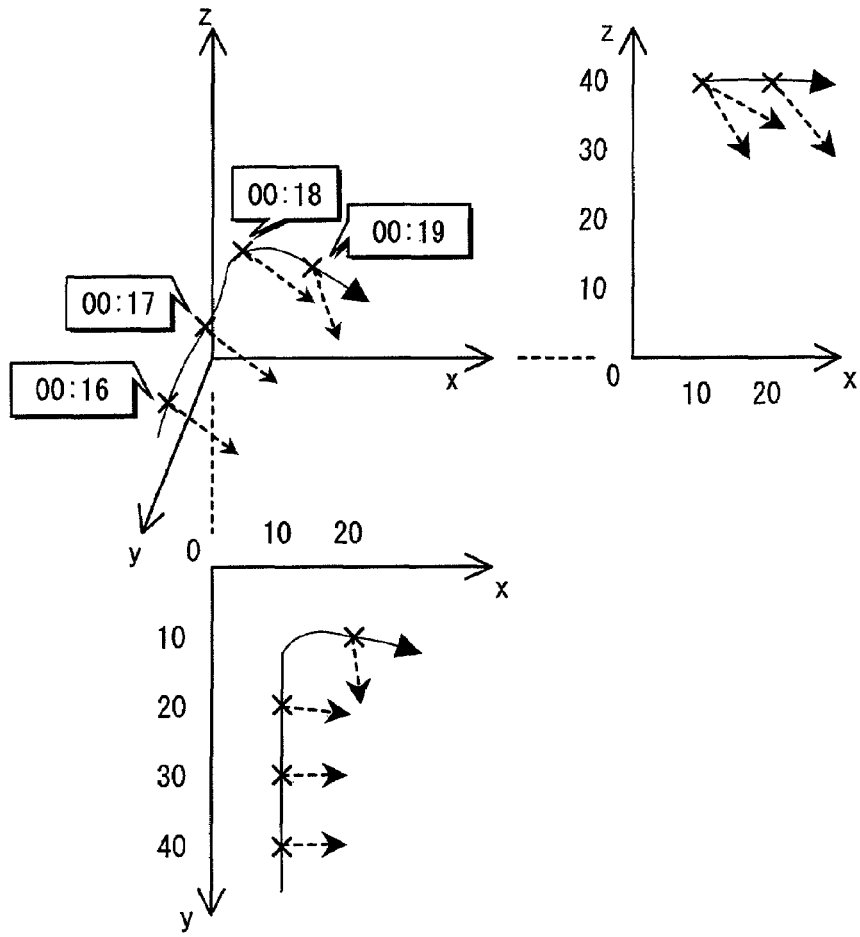

FIGS. 7A and 7B show diagrams relating to the instruction information 70.

As shown in FIG. 7A, the instruction information 70 is composed of one or more information sets each of which indicates: time 71; a position 72; a moving direction 73; an imaging direction 74; an angle of view 75; and a distance 76 indicating a distance between the camera 24 and a plane of a subject to be captured in the image (hereafter, simply "the plane of the subject").

Each time 71 indicates a scheduled time at which the camera 24 captures a corresponding image. Times indicated by the information sets may be arranged at any interval, such as at an interval of 1 second, 1 minute, etc.

Each position 72 indicates coordinates of the global coordinate system, the coordinates representing a scheduled position in which the moving object 2 is scheduled to be positioned at the scheduled time indicated by the corresponding time 71. The components (the x-, y- and z-axes) of the global coordinate system are expressed as "x,y,z".

Each moving direction 73 indicates a direction in which the moving object 2 is scheduled to face at the scheduled time indicated by the corresponding time 71. This direction is expressed by a unit vector whose origin is the origin of the global coordinate system, "(0, 0, 0)". The moving object 2 is controlled such that it faces the direction parallel to the unit vector while being positioned at the coordinates indicated by the position 72. For instance, when the moving direction 73 indicates "(0, −1, 0)", the moving object 2 should be facing the direction parallel to the y-axis (i.e., the direction orthogonal to the xz-plane).

Each imaging direction 74 indicates a direction in which the camera 24 is scheduled to face at the scheduled time indicated by the corresponding time 71. Because the imaging direction of the camera 24 is expressed in the camera coordinate system as mentioned earlier, each imaging direction 74 indicates the stated direction according to the camera coordinate system.

Each angle of view 75 indicates an angle of view that is set for the camera 24 at the scheduled time indicated by the corresponding time 71. It is assumed, for example, that each angle of view 75 included in the instruction information 70 is expressed by a focal length of the camera 24 (in millimeters). Each angle of view 75 may be expressed by means of an angle. Or, when an angle of view in the horizontal direction is different from that in the vertical direction, each angle of view 75 may indicate two different angles of view.

Each distance 76 indicates a distance between the camera 24 and the plane of the subject. The plane of the subject is, for instance, a plane that is (i) orthogonal to the vector pointing in the imaging direction of the camera 24 and (ii) includes the subject to be captured. Unlike tangible planes that actually exist (e.g., the Earth's surface), the plane of the subject is a hypothetical plane. Put another way, the distance 76 means the distance from the camera 24 to the subject to be captured. However, since it is not always the case that a predetermined subject to be captured has been determined in advance, any distance may be set as the distance 76. As set forth, the distance between the camera 24 and the plane of the subject is equal to the distance between the camera 24 and the subject to be captured. The distance 76 is expressed, for example, in a unit of distance in meters.

1.2.6.2 Additional Description of the Instruction Information 70

As shown in FIGS. 7A and 7B, the instruction information 70 includes (i) the position 72 that is expressed by coordinates at which the moving object 2 is supposed to be positioned at the time 71, (ii) the moving direction 73 in which the moving object 2 is scheduled to face at the time 71, and (iii) the imaging direction 74 in which the camera 24 is supposed to capture the image in the camera coordinate system. The moving object 2 controls the propeller 22 so as to pass through the coordinates indicated by the position 72 at the time 71. At the same time, the moving object 2 also controls the camera 24, such that the camera 24 captures an image facing in the direction indicated by the imaging direction 74. In sum, the instruction information 70 shows (i) a scheduled path that the moving object 2 is scheduled to follow and (ii) an imaging method.

FIG. 7B is a brief illustration of the scheduled path of the moving object 2, which is indicated by the above-described instruction information 70. Referring to FIG. 7B, each "x" represents coordinates at which the moving object 2 is scheduled to be positioned at the scheduled time indicated by the corresponding time 71. Also referring to FIG. 7B, each solid line represents the scheduled path of the moving object 2, and each dashed line represents the imaging direction in which the camera 24(?) is scheduled to capture a corresponding image. Note, the imaging direction 74 indicates an imaging direction of the camera 24 and is expressed in the camera coordinate system. Thus, the direction in which the camera 24 captures an image in the global coordinate system is parallel to a sum of the vector indicated by the moving direction 73 and the vector indicated by the imaging direction 74.

1.2.7 Positional Error Calculation Unit 202

The positional error calculation unit 202 calculates how far the moving object 2 has strayed off its scheduled position due to a disturbance (e.g., a wind).

Specifically, the positional error calculation unit 202 acquires the time 71 and the position 72 from the instruction information 70, which has been acquired by the instruction information acquisition unit 201. The positional error calculation unit 202 also acquires, from the position management unit 203 (discussed later in "1.2.8 Position management unit 203"), information indicating the coordinates at which the moving object 2 is actually positioned. At the scheduled time indicated by the time 71, the positional error calculation unit 202 calculates, in the form of a vector, an error between the coordinates representing the scheduled position of the moving object 2 and the coordinates representing the actual position of the moving object 2; here, the calculation is performed based on the position 72 (i.e., information indicating coordinates representing the scheduled position of the moving object 2) and the information received from the position management unit 203 (i.e., the information indicating the coordinates at which the moving object 2 is actually positioned). The calculated vector is referred to as a positional error vector.

Figure 4:
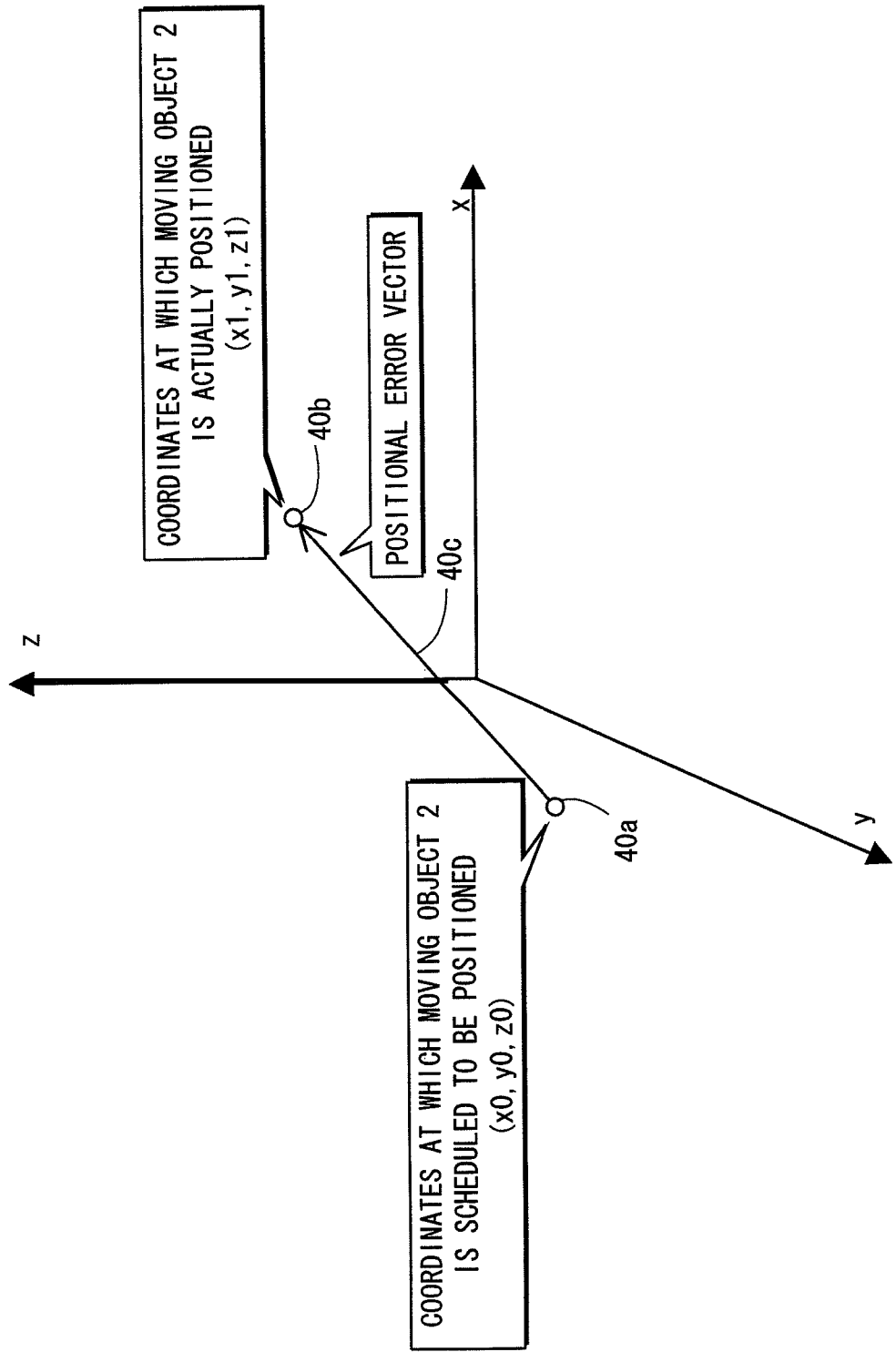
FIG. 4 shows an example of calculating a positional error vector.

For example, as shown in FIG. 4, the positional error vector is a vector whose (i) initial point is a point 40a, which is coordinates representing the scheduled position of the moving object 2, and (ii) terminal point is a point 40b, which is coordinates representing the actual position of the moving object 2 and is away from the point 40a due to the disturbance.

1.2.8 Position Management Unit 203

The position management unit 203 manages the coordinates at which the moving object 2 is actually positioned.

To be specific, the position management unit 203 receives and stores therein information sets each of which indicates coordinates at which the moving object 2 is actually positioned, the information sets being successively output by GPS 204. In order to manage the actual position of the mobile 2 with higher accuracy, the position management unit 203 may have an altimeter so as to successively measure the barometric altitude of the moving object 2, correct the GPS altitude, and store therein results of the correction.

1.2.9 GPS 204

GPS 204 has a GPS (Global Positioning System) function, successively acquires coordinates at which the moving object 2 is actually positioned using the GPS function, and successively outputs the acquired coordinates to the position management unit 203. It is more desirable as the error between the coordinates measured by GPS 204 and the coordinates at which the moving object 2 is actually positioned is smaller.

It should be mentioned that since the GPS function is technology that has been traditionally known, a detailed description thereof is omitted.

1.2.10 Directional Error Calculation Unit 205

The directional error calculation unit 205 calculates to what extent the moving object 2 is out of its scheduled direction due to the disturbance.

More specifically, the directional error calculation unit 205 acquires, from the instruction information acquisition unit 201, the time 71 and the moving direction 73 that are acquired by the instruction information acquisition unit 201. The directional error calculation unit 205 also receives, from the direction management unit 206 (discussed later in "1.2.11 Direction Management Unit 206"), information indicating the direction in which the moving object 2 is actually facing. At the scheduled time indicated by the time 71, the directional error calculation unit 205 calculates, in the form of a vector, an error between the direction in which the moving object 2 is scheduled to face and the direction in which the moving object 2 is actually facing; here, the calculation is performed based on the moving direction 73 (i.e., information indicating the direction in which the moving object 2 is scheduled to face) and the information acquired from the direction management unit 206 (i.e., the information indicating the direction in which the moving object 2 is actually facing). The calculated vector is referred to as a directional error vector.

Figures 5A, 5B:
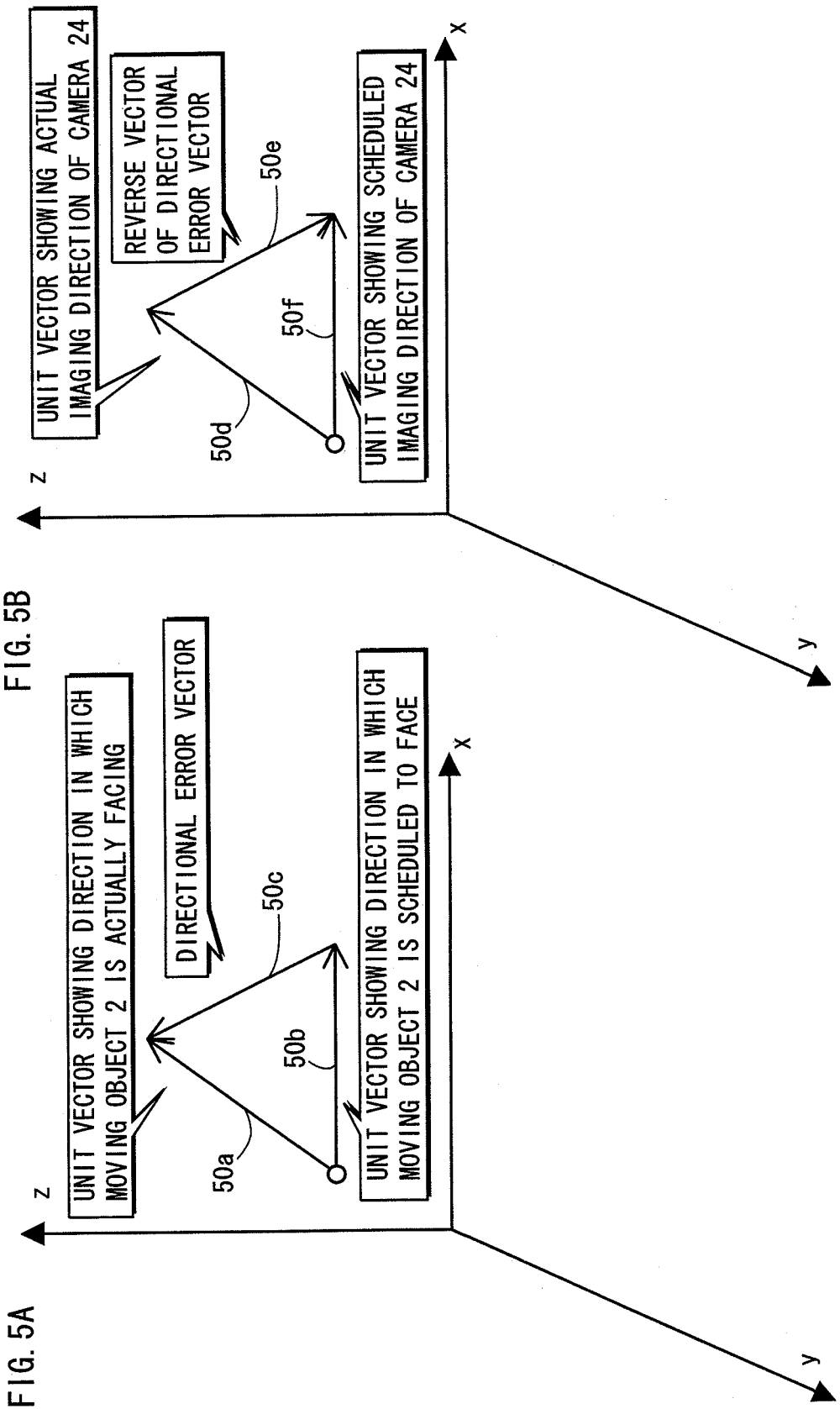
FIGS. 5A and 5B show an example of calculating a directional error vector.

For instance, as shown in FIG. 5A, a directional error vector 50c is a vector difference obtained by subtracting a unit vector 50b, which is pointing in the direction in which the moving object 2 is scheduled to face, from a unit vector 50c, which is pointing in the direction in which the moving object 2 is actually facing.

The directional error calculation unit 205 outputs the calculated directional error vector to the camera angle correction unit 211 and the propeller power correction unit 209.

1.2.11 Direction Management Unit 206

The direction management unit 206 manages the direction in which the moving object 2 is actually facing in the global coordinate system.

More specifically, the direction management unit receives and stores therein information sets each of which indicates the direction in which the moving object 2 is actually facing, the information sets being successively output from the gyroscope 20.

1.2.12 Gyroscope 207

Using its gyroscope mechanism, the gyroscope 20 detects directions in which the moving object 2 is actually facing at different times, and successively outputs the detected directions to the direction management unit 206.

It should be mentioned that, since detecting directions using a gyroscope mechanism is technology that has been conventionally known, a detailed description thereof is omitted.

1.2.13 Positional Difference Information Transmission Unit 208

The positional difference information transmission unit 208 has a communication function and performs communication with the image correction device 1.

More specifically, the positional difference information transmission unit 208 (i) generates positional difference information 80 by making a corresponding pair of the positional error vector, which has been calculated by the positional error calculation unit 202, and a time at which the calculation was performed, then (ii) transmits the positional difference information 80 to the image correction device 1.

1.2.14 Propeller Power Correction Unit 209

The propeller power correction unit 209 corrects a propeller power, such that the moving object 2 moves following the scheduled path of the moving object 2, which is indicated by the instruction information 70 which has been acquired by the instruction information acquisition unit 201.

To be specific, the propeller power correction unit 209 acquires the time 71, the position 72 and the moving direction 73 from the instruction information 70. The propeller power correction unit 209 also acquires the positional error vector from the positional error calculation unit 202, and the directional error vector from the directional error calculation unit 205.

Based on the positional error vector and the directional error vector, the propeller power correction unit 209 successively calculates a necessary amount of correction to be made for the propeller power to place the moving object 2 back at the coordinates representing the scheduled position of the moving object 2, and to make the moving object 2 face the scheduled direction. The propeller power correction unit 209 then outputs, to the propeller power control unit 21, the calculated amount as propeller correction information. Basically, the propeller power should be corrected so that the positional error vector and the directional error vector each becomes a zero vector.

1.2.15 Propeller Power Control Unit 210

The propeller power control unit 210 acquires the time 71, the moving direction 73 and the propeller correction information from the propeller power correction unit 209. The propeller power control unit 210 then controls the propeller power of the propeller 22, such that the moving object 2 follows the scheduled path indicated by the instruction information 70 (i.e., such that, at each scheduled time indicated by the time 71, the moving object 2 is positioned in the position indicated by the corresponding position 72 and is facing the direction indicated by the corresponding moving direction 73). The propeller power control unit 210 also corrects the propeller power based on the propeller correction information.

Conventionally, people have known technology that controls movements of an airborne object for the purpose of eliminating the positional and directional errors. Accordingly, a detailed description of such technology is omitted.

1.2.16 Camera Angle Correction Unit 211

The camera angle correction unit 211 corrects an imaging direction of the camera 24 such that the camera 24 is directed to the scheduled direction.

With the imaging direction 74 indicated by the instruction information 70, the moving object 2 manages a scheduled imaging direction in which the camera 24 is scheduled to capture an image at a predetermined time. As described earlier, the imaging direction is expressed using the camera coordinate system. That is to say, the imaging direction 74 indicates a direction in which the camera 24 is scheduled to capture an image, from the perspective of the moving object 2. The imaging direction 74 is defined independently of the direction in which the moving object 2 is facing in the global coordinate system. Therefore, when the moving object 2 is not facing the moving direction in which it is scheduled to face, the actual imaging direction of the camera 24 is accordingly off an imaging direction in which the camera 24 is scheduled to capture an image in the global coordinate system. To correct such an error in the actual imaging direction, it is necessary to correct the actual imaging direction of the camera 24 using the directional error vector of the moving object 2.

For example, as shown in FIG. 5B, a unit vector 50f (a scheduled imaging direction in which the camera 24 is scheduled to capture an image) can be obtained by adding a reverse vector 50e (a reverse vector of the above-described directional error vector) to a unit vector 50d (the actual imaging direction of the camera 24).

The camera angle correction unit 211 acquires the time 71 and the imaging direction 74 from the instruction information acquisition unit 201, and receives the directional error vector from the directional error calculation unit 205. Based on the directional error vector, the camera angle correction unit 211 corrects the imaging direction of the camera 24 indicated by the imaging direction 74, and calculates a unit vector indicating the scheduled imaging direction of the camera 24. Then the camera angle correction unit 211 outputs, to the camera angle control unit 212, information regarding the corrected imaging direction of the camera 24.

1.2.17 Camera Angle Control Unit 212

The camera angle control unit 212 acquires, from the camera angle correction unit 211, the information regarding the corrected imaging direction of the camera 24, and controls the imaging direction of the camera 24 by means of the ball head 23. Put another way, even when the disturbance has affected the moving object 2 to the point where the moving object 2 does not face the direction it is scheduled to face, the camera angle control unit 212 controls the ball head 23 so that, in the global coordinate system, the imaging direction of the camera 24 is parallel to the scheduled imaging direction of the camera 24.

It is assumed in Embodiment 1 that, due to the control performed by the camera angle control unit 212, the imaging direction of the camera 24 in the global coordinate system almost always remains parallel to the scheduled imaging direction in the global coordinate system.

1.2.18 Captured Image Acquisition Unit 213

The captured image acquisition unit 213 controls the camera 24 such that the camera 24 successively captures an image, and stores therein the captured image in correspondence with an identifier (e.g., a file name). The captured image acquisition unit 213 also stores therein captured image information 90 composed of (i) the identifier of the captured image and (ii) a time at which the image was captured.

1.2.19 Captured Image Information Transmission Unit 214

The captured image information transmission unit 214 has a communication function, and transmits, to the image correction device 1, the image captured by the camera 24 and the captured image information 90.

Specifically, the captured image information transmission unit 214 first acquires the captured image and the captured image information 90 that have been stored in the captured image acquisition unit 213, then transmits the acquired captured image and captured image information 90 to the image correction device 1.

1.2.20 Additional Remarks

As mentioned earlier, the instruction information 70 includes the angle of view 75 and the distance 76 indicating a distance between the camera 24 and the plane of a subject to be captured. Although not illustrated in the drawings, the moving object 20 sets parameters according to which the camera 24 captures images, based on information such as the angle of view 75 and the distance 76. For instance, the moving object 20 configures settings for a focal length, adjusts a flash, luminance and a color difference, and so on.

1.3 Structure of the Image Correction Device 1

The following is a specific description of the structure of the image correction device 1.

Figure 6:
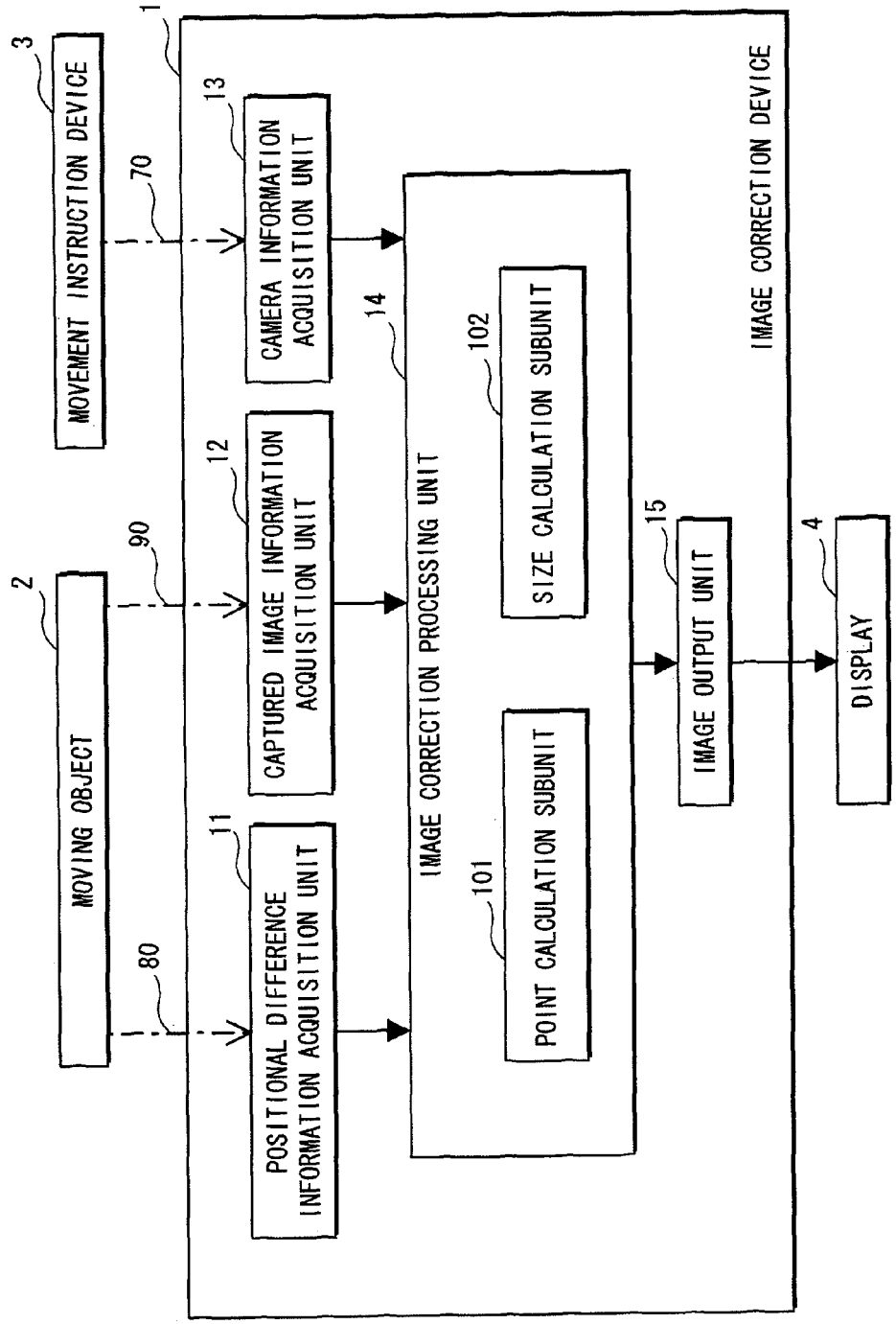
FIG. 6 is a functional block diagram showing the structure of an image correction device 1.

FIG. 6 is a functional block diagram showing the structure of the image correction device 1.

As shown in FIG. 6, the image correction device 1 includes: a positional difference information acquisition unit 11; a captured image information acquisition unit 12; a camera information acquisition unit 13; an image correction processing unit 14; and an image output unit 15.

More specifically, the image correction device 1 is a computer system comprising CPU, ROM, RAM, etc., and performs image correction processing in accordance with a computer program. The image correction device 1 has a communication function, and performs communication with the movement instruction device 3 and the moving object 2.

1.3.1 Positional Difference Information Acquisition Unit 11

The positional difference information acquisition unit 11 acquires the positional difference information 80, which has been transmitted from the positional difference information transmission unit 208 of the moving object 2, and outputs the positional difference information 80 to the image correction processing unit 14.

1.3.2 Captured Image Information Acquisition Unit 12

The captured image information acquisition unit 12 acquires the image and the captured image information 90, which have been transmitted from the captured image information transmission unit 214 of the moving object 2, and outputs the image and the captured image information 90 to the image correction processing unit 14.

1.3.3 Camera Information Acquisition Unit 13

The camera information acquisition unit 13 acquires the instruction information 70, which has been transmitted from the movement instruction device 3, and outputs the instruction information 70 to the image correction processing unit 14.

1.3.4 Image Correction Processing Unit 14

Based on the positional error vector included in the positional difference information 80, the image correction processing unit 14 determines an image frame within the image captured by the camera 24 with a wide angle of view at the corresponding time 71, the image frame enclosing an output image to be output. Then the image correction processing unit 14 (i) trims the captured image in accordance with the determined image frame to generate a corrected image that is enclosed by the determined image frame, and (ii) outputs the corrected image as an output image.

The image correction processing unit 14 stores therein a standard image frame that encloses a corrected image to be output, the corrected image being included within an image captured with a wide angle of view. An image frame is defined by (i) a reference point that positionally determines the image frame within the captured image, and (ii) its size (i.e., a size of the corrected image). In Embodiment 1, it is assumed that the above-mentioned reference point is the central point of the image frame. Therefore, stated another way, the image frame is defined by (i) its central point and (ii) the size of the corrected image. It is also assumed that the central point (i.e., the reference point) of the standard image frame is the central point of the whole image captured with the wide angle of view as well. When there is no positional error in the moving object 2, the captured image is trimmed in accordance with the standard image frame to generate a corrected image that is enclosed by the standard image frame; then, the corrected image is output as the output image. Specifics of the image frame will be described later.

Below is a specific description of the image correction processing unit 14. The image correction processing unit 14 acquires (i) the positional difference information 80 from the positional difference information acquisition unit 11, (ii) the image captured by the camera 24 and the captured image information 90 from the captured image information acquisition unit 12, and (iii) the instruction information from the camera information acquisition unit 13.

As illustrated in FIG. 6, the image correction processing unit 14 includes a point calculation subunit 101 and a size calculation subunit 102.

Based on the positional error vector, the point calculation subunit 101 calculates the central point of the image frame in accordance with which the captured image is to be trimmed.

Based on the positional error vector, the size calculation subunit 102 calculates a size of the above image frame in accordance with which the captured image is to be trimmed.

The image correction processing unit 14 acquires, from the positional difference information 80, the positional error vector associated with the corresponding time 71. The image correction processing unit 14 makes a correction to the standard image frame based on the positional error vector. That is to say, the image correction processing unit 14 determines an output image frame, in accordance with which the captured image is to be trimmed, by (i) moving the central point of the standard image frame and (ii) enlarging or shrinking the size thereof, based on the positional error vector.

The following is a brief description of processing for determining the image frame. First, the image correction processing unit 14 acquires, from the instruction information 70, (i) the direction in which the moving object 2 is scheduled to face at a given time (i.e., the moving direction 73), and (ii) the imaging direction of the camera 24 (i.e., the imaging direction 74) as expressed in the camera coordinate system. Then the image correction processing unit 14 calculates a unit vector pointing in the direction in which the camera 24 is scheduled to face in the real space (i.e., the global coordinate system). This unit vector is referred to as an imaging direction unit vector. Note, due to the correction made by the camera angle correction unit 211, the direction pointed by this unit vector is parallel to the imaging direction in which the camera 24 actually captures an image in the global coordinate system.

The imaging direction unit vector, as well as the positional error vector, is expressed in the global coordinate system. Therefore, the positional error vector can be decomposed into (i) a first component that extends along the imaging direction of the camera 24 and (ii) a second component that extends along a plane orthogonal to the imaging direction of the camera 24.

The image correction processing unit 14 decomposes the positional error vector into two components in the above-described manner. Using the angle of view 75 and the distance 76 (the distance between the camera 24 and the plane of the subject), the image correction processing unit 14 further determines the output image frame in accordance with which the captured image is to be trimmed, by making a correction to the standard image frame. With use of the second component of the positional error vector, the image correction processing unit 14 makes the point calculation subunit 101 correct the position of the reference point. Similarly, with use of the first component of the positional error vector, the image correction processing unit 14 makes the size calculation subunit 102 correct the size of the corrected image to be output. In the above-described manner, the output image frame is determined by making corrections to the central point of the standard image frame and the size of the corrected image. This processing will be discussed later in detail.

Once the image correction processing unit 14 determines the output image frame, it (i) trims the captured image in accordance with the output image frame to generate a corrected image that is enclosed by the determined output image frame, then (ii) outputs the corrected image as an output image to the image output unit 15, after adjusting its size.

In sum, with reference to the positional error, the image correction processing unit 14 determines a frame that encloses a corrected image that would have been output if there were no positional error, the frame being within the whole image captured with a wide angle of view. Then the image correction processing unit 14 (i) trims the captured image in accordance with the determined frame to generate the corrected image that is enclosed by the determined frame, and (ii) outputs the corrected image as the output image.

1.3.5 Image Output Unit 15

The image output unit 15 receives the output image output by the image correction processing unit 14, and outputs the received output image as an image signal to a display 4.

1.4 Data

The following are descriptions of the positional difference information 80 and the captured image information 90.

1.4.1 Positional Difference Information 80

Figure 8A:
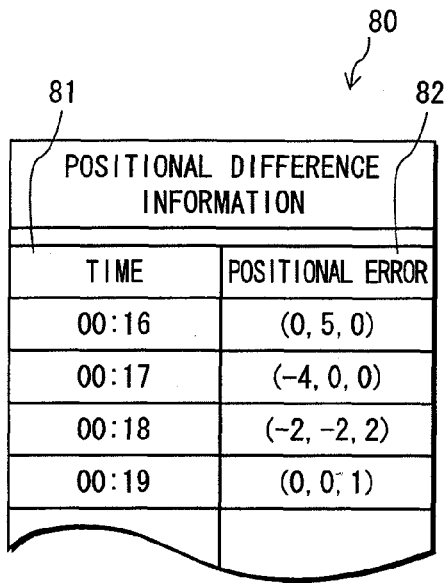
FIGS. 8A and 8B show positional difference information 80.
Figure 8B:
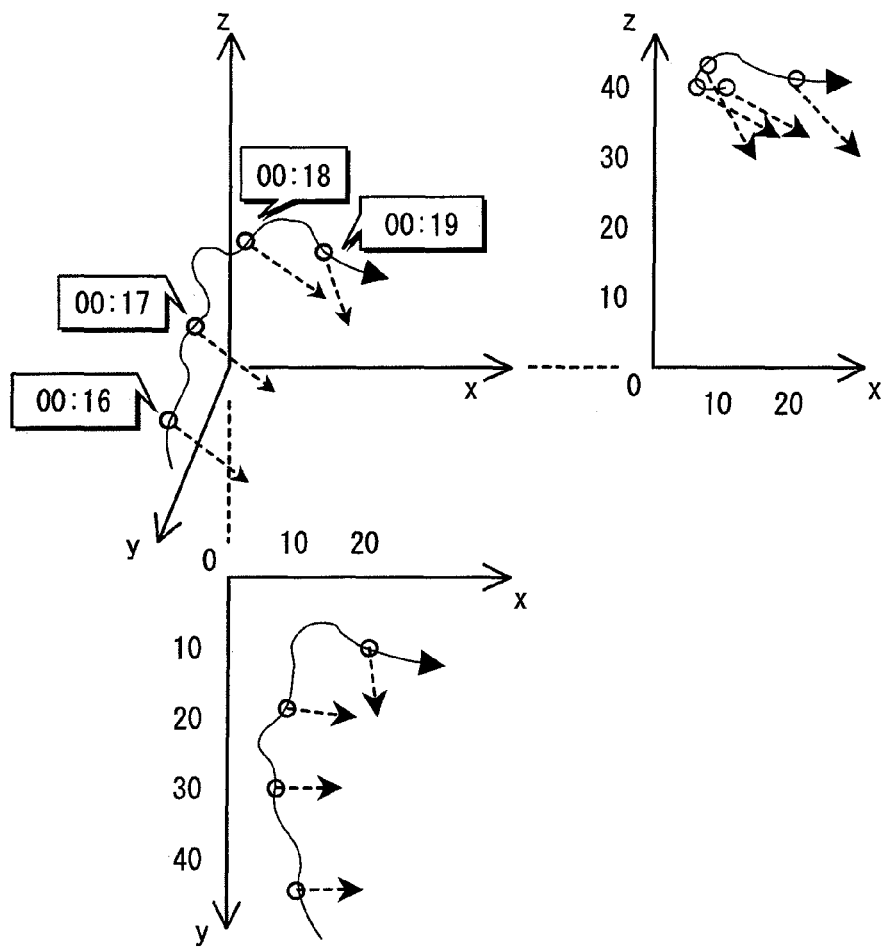

FIGS. 8A and 8B show diagrams relating to the positional difference information 80.

As shown in FIG. 8A, the positional difference information 80 is composed of one or more information sets each of which includes a time 81 and a positional error 82.

Each time 81 indicates a scheduled time at which the camera 24 captures a corresponding image.

Each positional difference 82 indicates a positional error vector obtained at the corresponding time 81.

FIG. 8B briefly shows an actual path that the moving object 2 has actually followed in a case where there are positional errors as shown by the above-mentioned positional error 82. It should be mentioned that the path that the moving object 2 is originally scheduled to follow is shown by the instruction information 70 as illustrated in FIG. 7A. Referring to FIG. 8B, each circle "○" represents coordinates at which the moving object 2 is actually positioned at the corresponding time 81. Each solid line represents the actual path of the moving object 2, and each dashed line represents an actual imaging direction in which the moving object 2 has actually captured the corresponding image. Here, since each actual imaging direction has been corrected by the camera angle correction unit 211, it is parallel to an imaging direction in which the moving object 2 is scheduled to face from a corresponding scheduled position.

Figure 9:
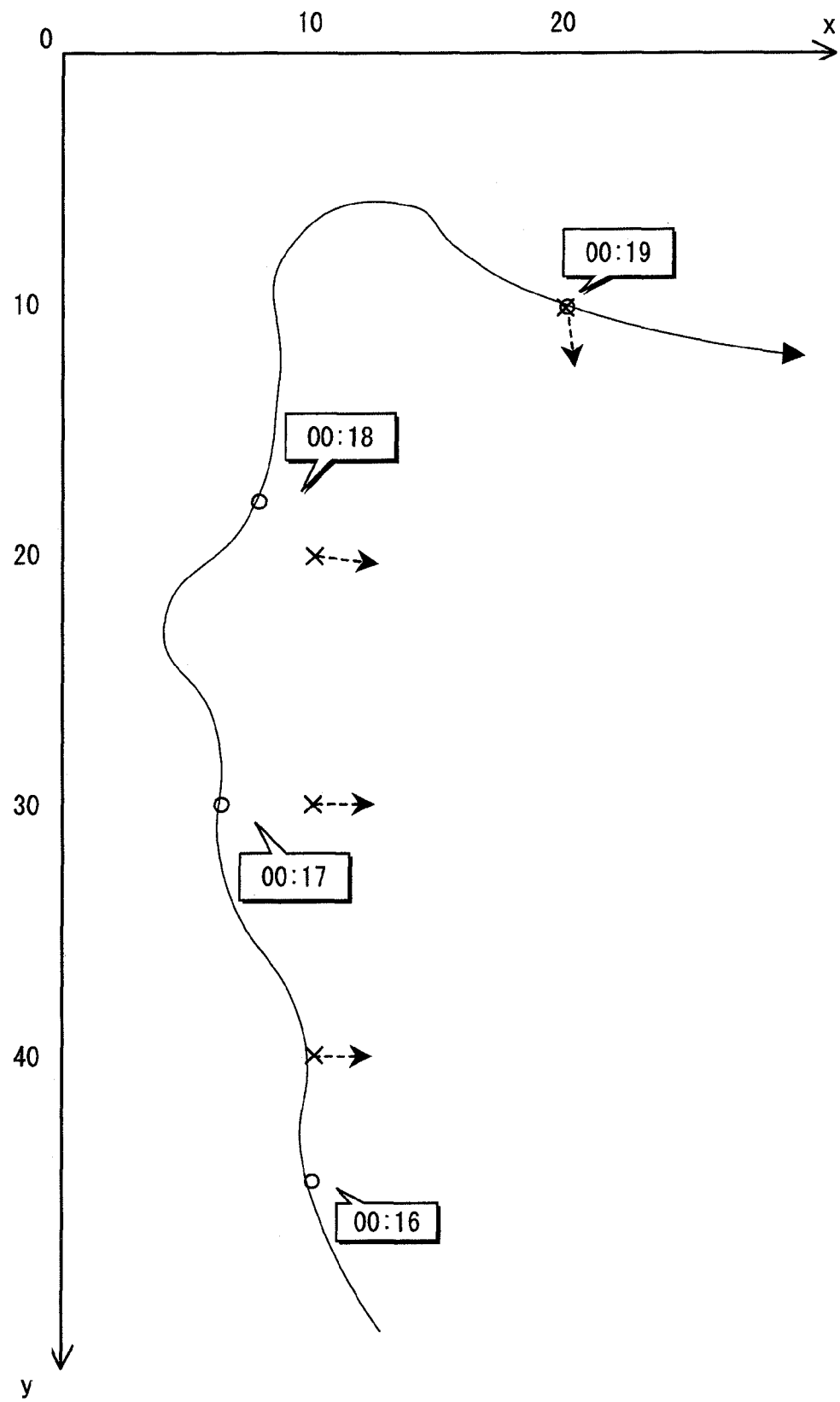
FIG. 9 shows (i) sets of coordinates, at each of which the moving object 2 is scheduled to be positioned at a corresponding time, and (ii) an actual path that the moving object 2 has actually followed, the sets of coordinates and the path being projected onto an xy-plane.
Figure 10:
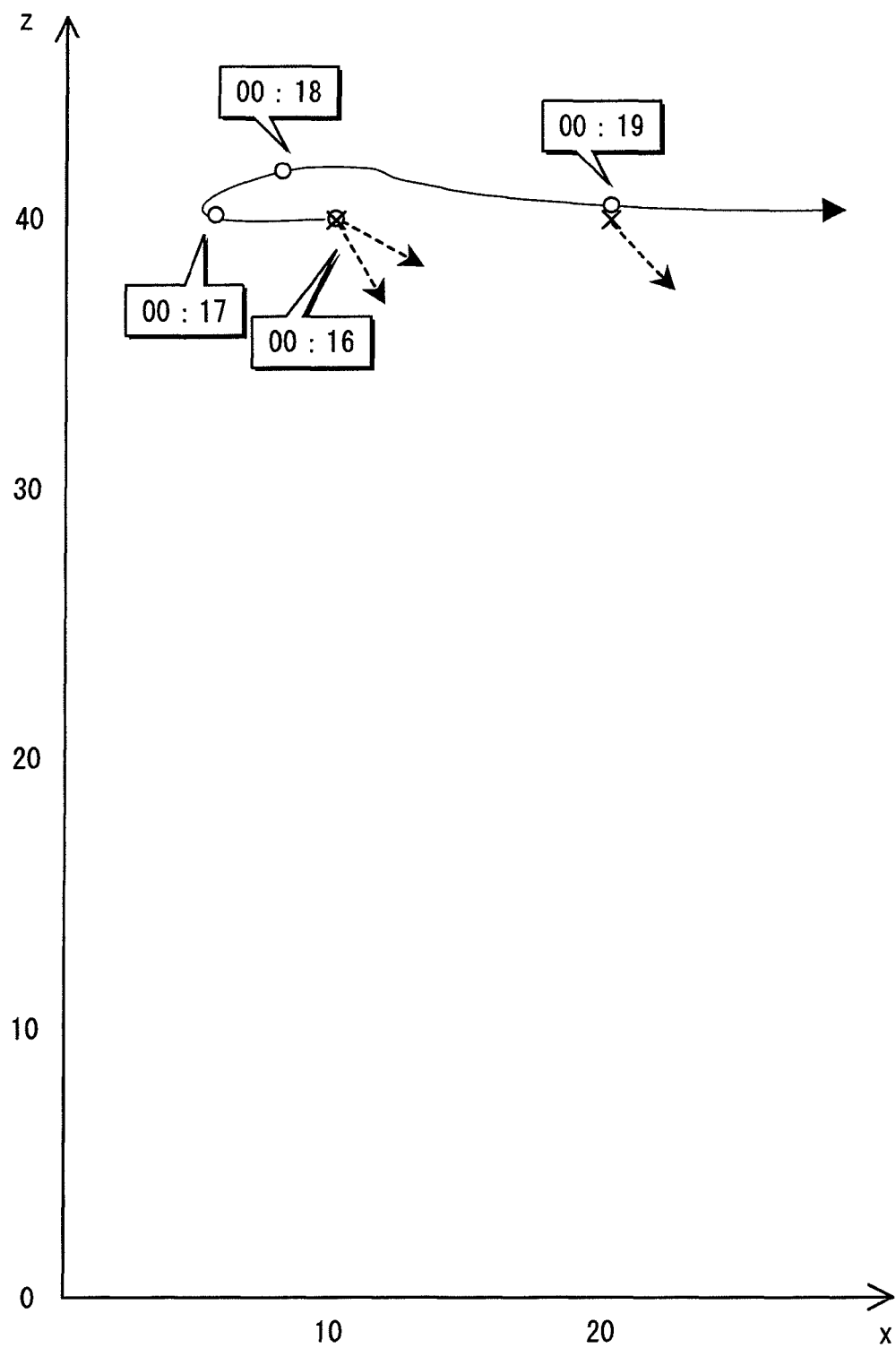
FIG. 10 shows (i) the sets of coordinates, at each of which the moving object 2 is scheduled to be positioned at the corresponding time, and (ii) the actual path that the moving object 2 has actually followed, the sets of coordinates and the path being projected onto an xz-plane.

The scheduled path and the actual path of the moving object 2 are shown in FIGS. 9 and 10.

FIG. 9 shows (i) sets of coordinates, at each of which the moving object 2 is scheduled to be positioned at a corresponding time and (ii) an actual path that the moving object 2 has actually followed, the sets of coordinates and path being projected onto the xy-plane.

In FIG. 9, the sets of coordinates, at each of which the moving object 2 is scheduled to be positioned at a corresponding time, correspond to the instruction information 70 shown in FIG. 7A. Referring to FIG. 9, each "x" represents coordinates at which the moving object 2 is scheduled to be positioned at a corresponding time. Each dashed line represents an imaging direction in which the mobile 2 is scheduled to capture an image at a corresponding time.

The actual path of the moving object 2 corresponds to the positional difference information 80 shown in FIG. 8A. A solid line represents the actual path of the moving object 2. Note, each actual imaging direction of the moving object 2 is parallel to a corresponding one of the scheduled imaging directions of the moving object 2. Accordingly, each actual imaging direction is not illustrated in FIG. 9.

FIG. 10 shows (i) sets of coordinates at each of which the moving object 2 is scheduled to be positioned at a corresponding time and (ii) the actual path of the moving object 2, the sets of coordinates and path being projected onto the xz-plane.

Since FIG. 10 shows the same elements as FIG. 9, a detailed description of FIG. 10 is omitted.

1.4.2 Captured Image Information 90

Figure 11:
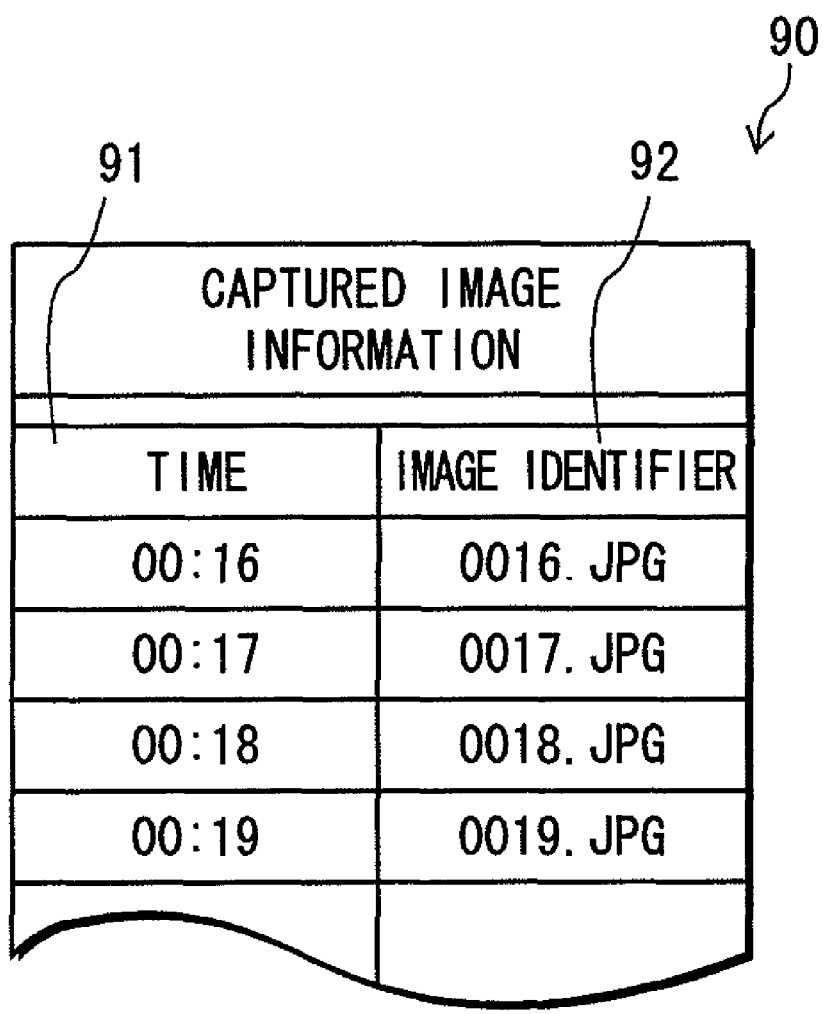
FIG. 11 shows captured image information 90.

FIG. 11 shows the captured image information 90.

As shown in FIG. 11, the captured image information 90 is composed of one or more information sets each of which includes a time 91 and image identifier 92.

Each time 91 indicates a scheduled time at which a corresponding image was captured.

Each image identifier 92 indicates an identifier for identifying the corresponding image captured by the camera 24. Examples of the image identifier 92 include a file name of an image.

1.5 Operations

The following describes operations of the moving object 2 and the image correction device 1.

1.5.1 Operations of the Moving Object 2

The moving object 2 successively captures an image while moving in accordance with the instruction information 70.

Figure 12:
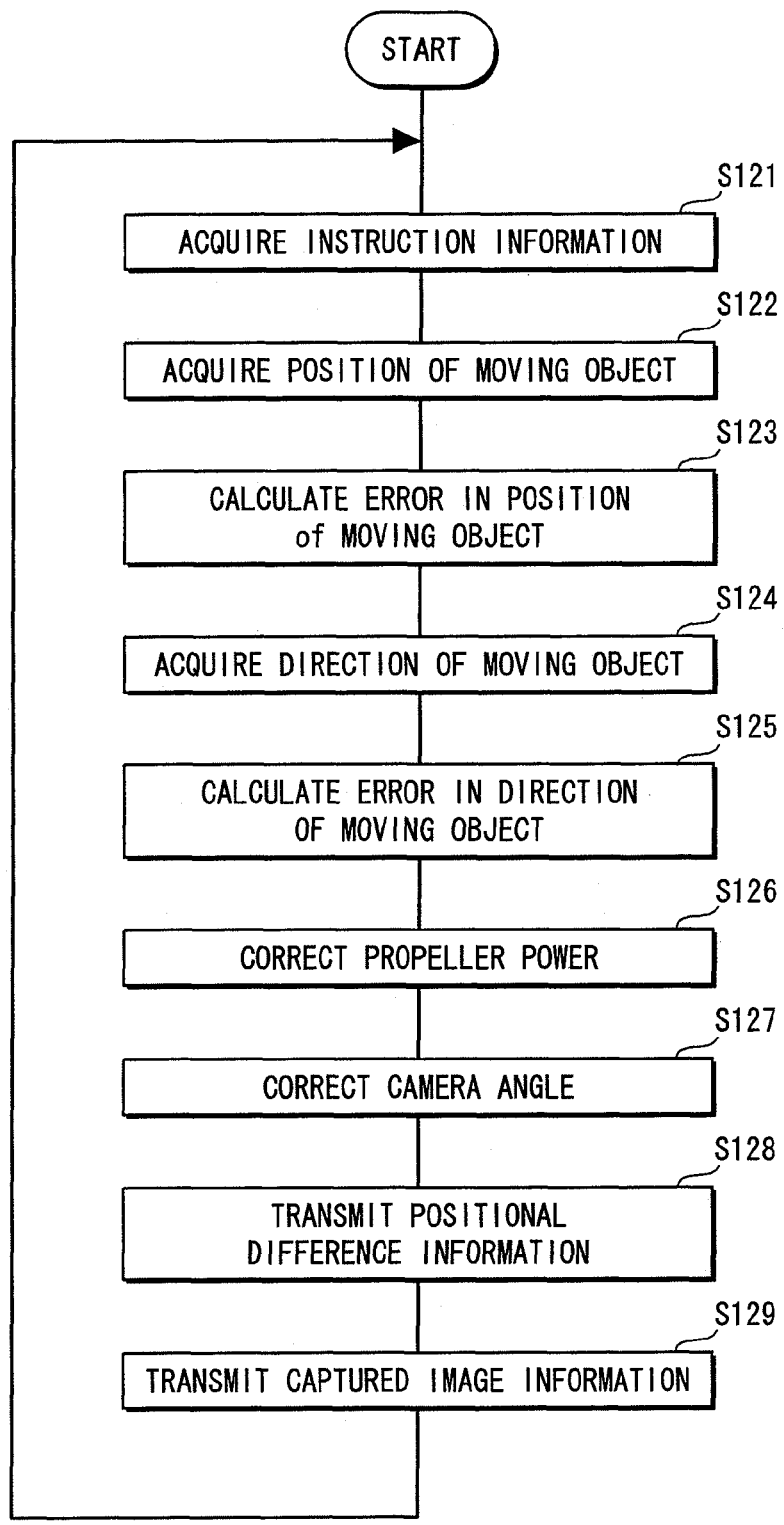
FIG. 12 is a flowchart showing operations of the moving object 2.

FIG. 12 is a flowchart showing the operations of the moving object 2.

The instruction information acquisition unit 201 acquires the instruction information 70 from the movement instruction device 3 (Step S121). The positional error calculation unit 202 acquires an actual position of the moving object 2 from the position management unit 203 (Step S122). Then, based on the instruction information 80 and the actual position of the moving object 2, the positional error calculation unit 202 calculates a positional error vector (Step S123).

The directional error calculation unit 205 acquires, from the direction management unit 206, a direction in which the moving object 2 is actually facing (Step S124). Then the directional error calculation unit 205 calculates a directional error vector (Step S125).

Based on the instruction information 70, the positional error vector and the directional error vector, the propeller power correction unit 209 corrects a propeller power such that the moving object 2 follows its scheduled path (Step S126).

The camera angle correction unit 211 corrects the camera angle, based on the directional error vector and the instruction information 70 (Step S127).

The positional difference information transmission unit 208 transmits the positional difference information 80 to the image correction device 1 (Step S128).

The captured image information transmission unit 214 transmits a captured image and corresponding captured image information 90 to the image correction device 1 (Step S129).

The moving object 2 repeats the above processing by making its constituent elements function.

1.5.2 Operations of the Image Correction Device 1

Figure 13:
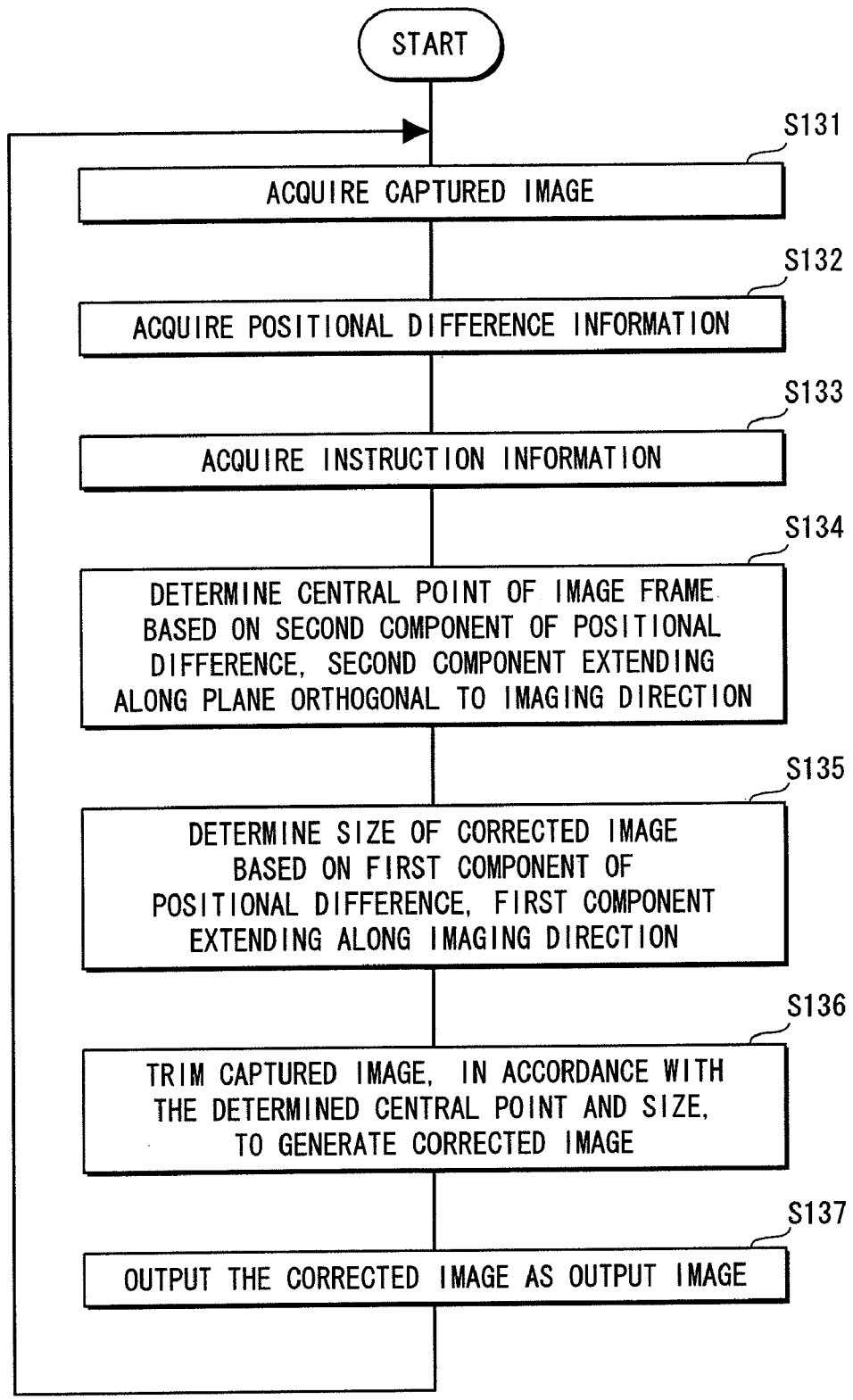
FIG. 13 is a flowchart showing operations of the image correction device 1.

FIG. 13 is a flowchart showing the operations of the image correction device 1.

The image correction device 1 determines an image frame by using the positional error vector and the scheduled imaging direction of the camera 24 that are obtained at a corresponding scheduled time indicated by the instruction information 70, the positional difference information 80, etc. The image correction device then (i) trims an image captured at the corresponding scheduled time to generate a corrected image that is enclosed by the determined image frame, and (ii) outputs the corrected image as an output image.

To be specific, in the imaging correction device 1, the captured image information acquisition unit 12 acquires the captured image and the corresponding captured image information 90 that have been transmitted from the moving object 2 (Step S131). The positional difference information acquisition unit 11 acquires the positional difference information 80 transmitted from the moving object 2 (Step S132). The camera information acquisition unit 13 acquires the instruction information 70 transmitted from the movement instruction device 3 (Step S133).

As explained in above "1.3.4 Image correction processing unit 14", the imaging correction processing unit 14 decomposes the positional error vector, which is indicated by the positional error 82 of the positional difference information 80, into (i) the first component and (ii) the second component.

The image correction device 1 causes the point calculation subunit 101 to determine the central point of the image frame in accordance with which the captured image is to be trimmed and then output as an output image, based on the second component of the positional error vector (Step S134).

The image correction device 1 also causes the size calculation subunit 102 to determine a size of the image frame, based on the first component of the positional error vector (Step S135).

The image correction device 1 trims the captured image in accordance with the image frame that is determined by the central point and the size determined in the above manner, to generate a corrected image that is enclosed by the determined image frame (Step S136). Processing of Steps S134 and S135 will be discussed in more detail later.

The image correction device 1 causes the image output unit 15 to output the corrected image to the display 4 as the output image (Step S137).

The image correction device 1 repeats the above processing.

1.6 How to Determine the Image Frame

Next is a detailed description of processing performed by the point calculation subunit 101 and the size calculation subunit 102 to determine the output image frame, in accordance with which the captured image is to be trimmed and output as an output image.

As discussed earlier, the point calculation subunit 101 determines the central point of the output image frame based on the second component of the positional error vector.

The size calculation subunit 102 determines the size of the output image frame based on the first component of the positional error vector.

The scheduled imaging direction, in which the camera 24 captures an image from its scheduled position, is parallel to the actual imaging direction, in which the camera 24 captures an image from its actual position. Hence, an error in the first component of the positional error vector indicates whether the distance between the actual position of the camera 24 and the plane of the subject is smaller or larger than the distance between the scheduled position of the camera 24 and the plane of the subject. If smaller, the camera 24 will capture the image at closer range, with the result that the subject appears larger in the captured image than it does in an image captured from the scheduled position of the camera 24. If larger, then the subject appears smaller in the captured image than it does in the image captured from the scheduled position of the camera 24. In view of this, for instance, when the subject appears large in the captured image, the image correction device 1 makes the size of the output image frame larger than that of the standard image frame, then outputs the corrected image, which is enclosed by the enlarged output image frame, as the output image.

In the above case, however, the output image will be large in size; therefore, the image correction device 1 should output the corrected image after shrinking it to the size of a partial image enclosed by the standard image frame. This way, the output image looks the same as the partial image that would have been output if the camera 24 captured the image from its scheduled position.

Regarding an error in a camera position, the error associated with the second component affects a position of the subject in the captured image. For example, assume that the camera 24 is scheduled to capture an image of the subject such that the subject is positioned in, or in the vicinity of, the center of the captured image. If the camera 24 captures the image of the subject from a higher altitude than it is originally scheduled to, then the subject will be positioned below the central point in the captured image, or near the bottom edge of the captured image, because the actual imaging direction in which the camera 24 captures the image from its actual position is parallel to the scheduled imaging direction in which the camera 24 is scheduled to capture the image from its scheduled position.

When there is an error in the second component, the image correction device 1 shifts the central point of the standard image frame in the direction opposite to the direction of the error, and deems the shifted point the central point of the output image frame. This way, the image correction device 1 can output the corrected image (output image) that looks the same as an output image that would have been output if the camera 24 performed the image capturing from its scheduled position.

Figure 14B:
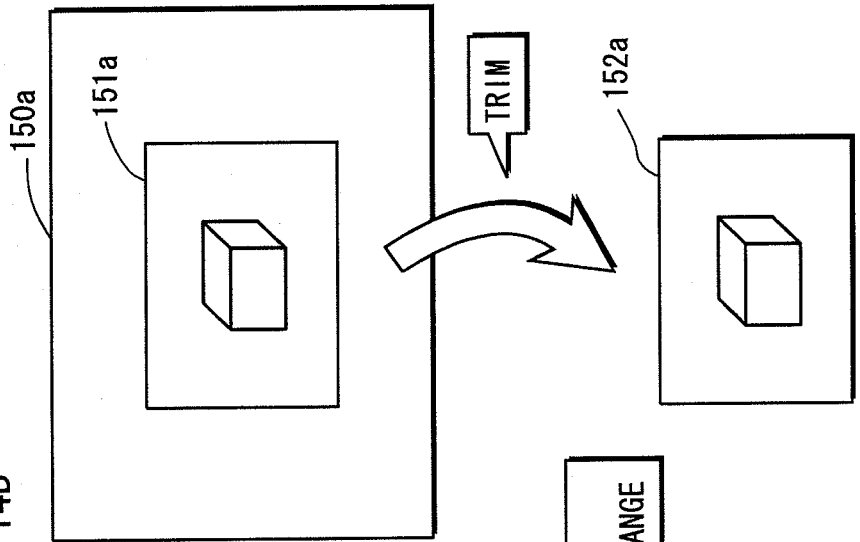
FIGS. 14A and 14B show a process in which an image correction processing unit 14 determines an output image frame when an actual camera position matches a scheduled camera position.
Figure 14A:
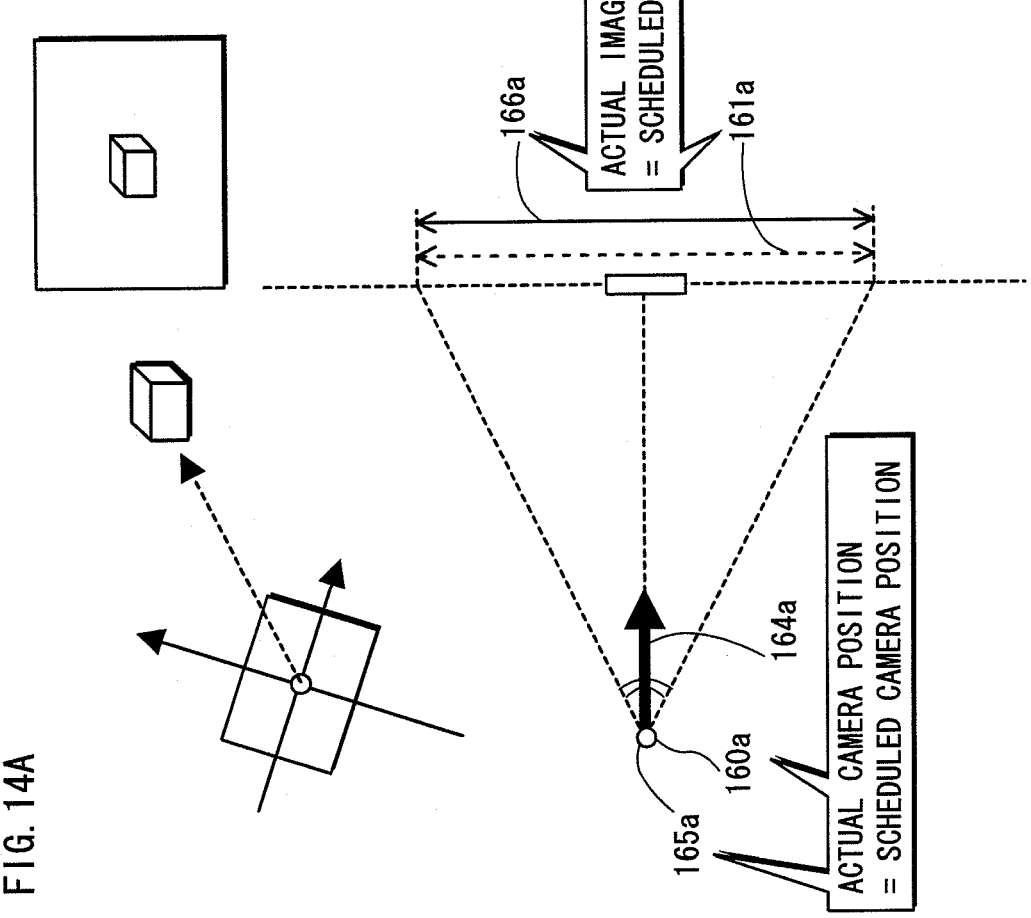

1.6.1 When the Camera's Actual Position Matches the Camera's Scheduled Position FIGS. 14A and 14B show a process in which the image correction processing unit 14 determines the output image frame when the actual camera position matches the scheduled camera position.

In this case, since the positional error vector is a zero vector, the output image frame would be naturally the same as the standard image frame.

FIG. 14A shows a camera position and a size of an actual imaging range showing the plane of the subject, the imaging range being captured by the camera 24. It should be mentioned that FIG. 14A shows the camera position and the actual imaging range as viewed parallel to the plane of the subject. The plane of the subject is orthogonal to the imaging direction of the camera 24. A scheduled camera position 160a matches an actual camera position 165a. Accordingly, the scheduled camera position 160a and the actual camera position 165a share the same imaging direction 164a. On the plane of the subject, a scheduled imaging range 161a also matches an actual imaging range 166a.

FIG. 14B shows an image 150a captured with a wide angle of view, a standard image frame 151a, and an output image 152a.

The image correction processing unit 14 (i) determines the standard image frame 151a as an output image frame, (ii) trims the captured image 150a in accordance with the output image frame to generate a corrected image that is enclosed by the output image frame, and (iii) outputs the corrected image as the output image 152a.

Figure 15B:
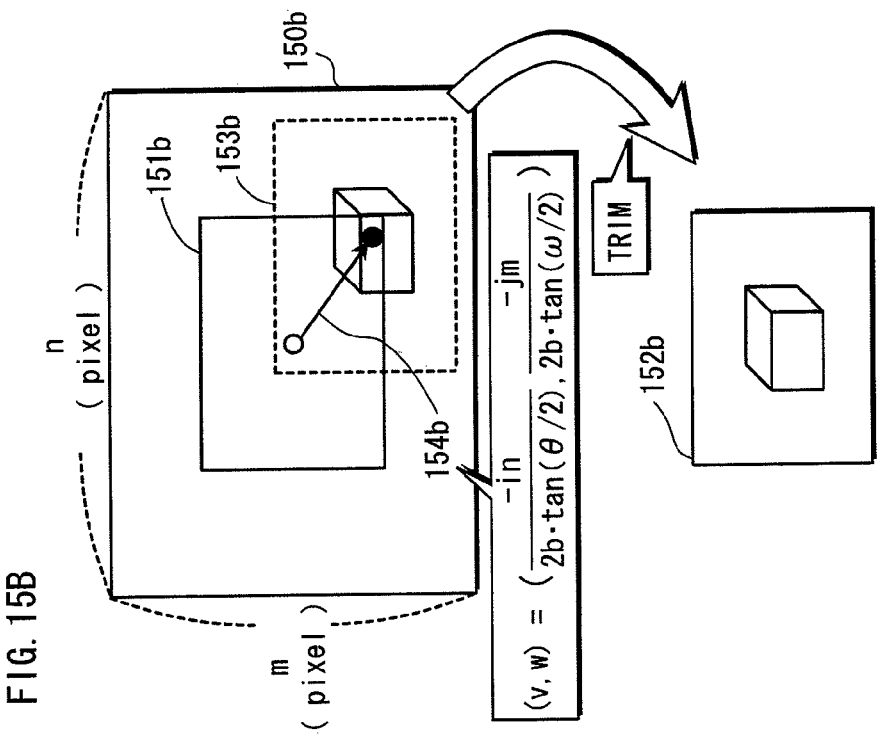
FIGS. 15A and 15B show a process in which the image correction processing unit 14 determines the output image frame when a positional error vector is orthogonal to an imaging direction of a camera.
Figure 15A:
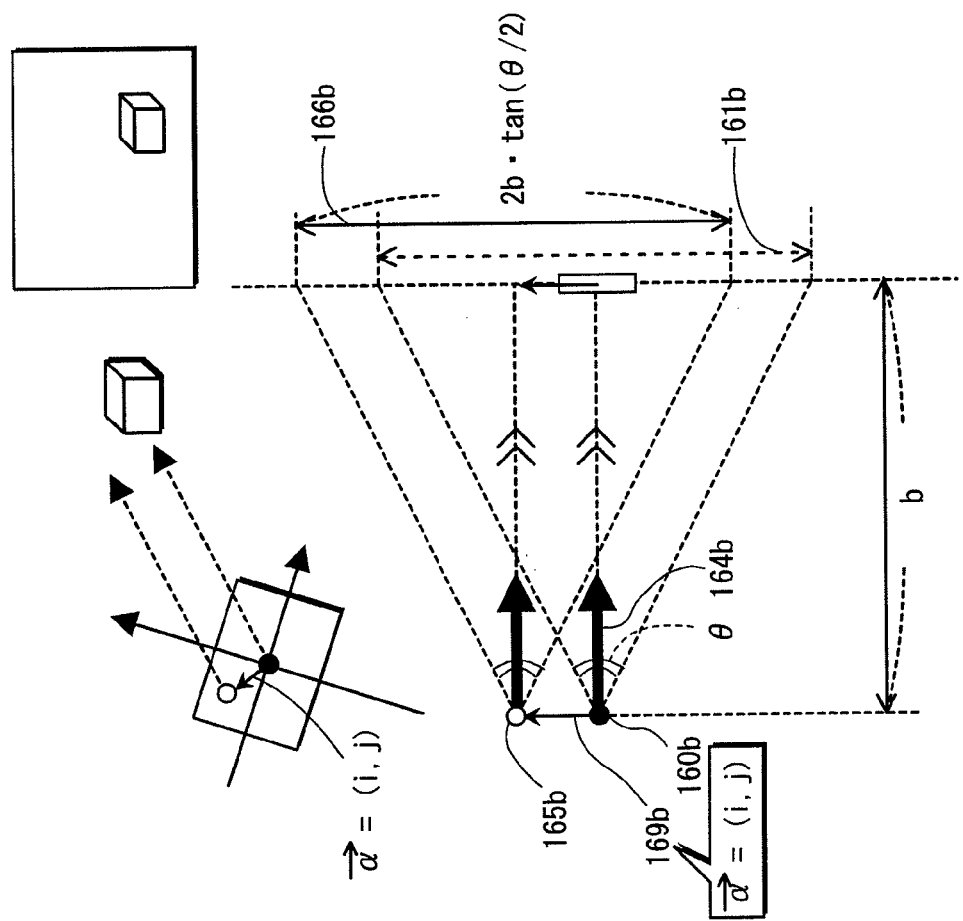

1.6.2 When the Positional Error Vector is Orthogonal to the Imaging Direction FIGS. 15A and 15B show a process in which the image correction processing unit 14 determines the output image frame when the positional error vector is orthogonal to the imaging direction.

FIG. 15A shows camera positions and a size of an actual imaging range showing the plane of the subject, the actual imaging range being captured by the camera 24. As in the case of FIG. 14A, FIG. 15A shows the camera positions and the actual imaging range as viewed parallel to the plane of the subject. On a plane orthogonal to the imaging direction, an actual camera position 165b has strayed off a scheduled camera position 160b by a positional error vector 169b. An actual imaging direction 164b, in which the camera 24 captures an image from its actual camera position 160a, is parallel to a scheduled imaging direction, in which the camera 24 is scheduled to capture an image from its scheduled camera position 160b. On the plane of the subject, an actual imaging range 166b has also strayed off a scheduled imaging range 161b by the positional error vector 169b.

Since the positional error vector 169b is orthogonal to the actual imaging direction 164b, it has no first component. Thus, the image correction processing unit 14 makes a correction to the central point of the image frame, but not to the size of the corrected image.

Assume here that a vector representing the second component of the positional error vector 169b is expressed as $\alpha(i,j)$. A component i of the vector $\alpha$ is parallel to a horizontal direction of the plane of the subject, whereas a component j of the vector $\alpha$ is parallel to a vertical direction of the plane of the subject.

As described above, the actual imaging direction 164b of the camera 24 is parallel to the scheduled imaging direction of the camera 24. The plane of the subject is orthogonal to the actual imaging direction 164b of the camera 24. This leads to the understanding that the actual imaging range 166b has strayed off the scheduled imaging range 161b by the vector $\alpha(i,j)$.

Figure 16:
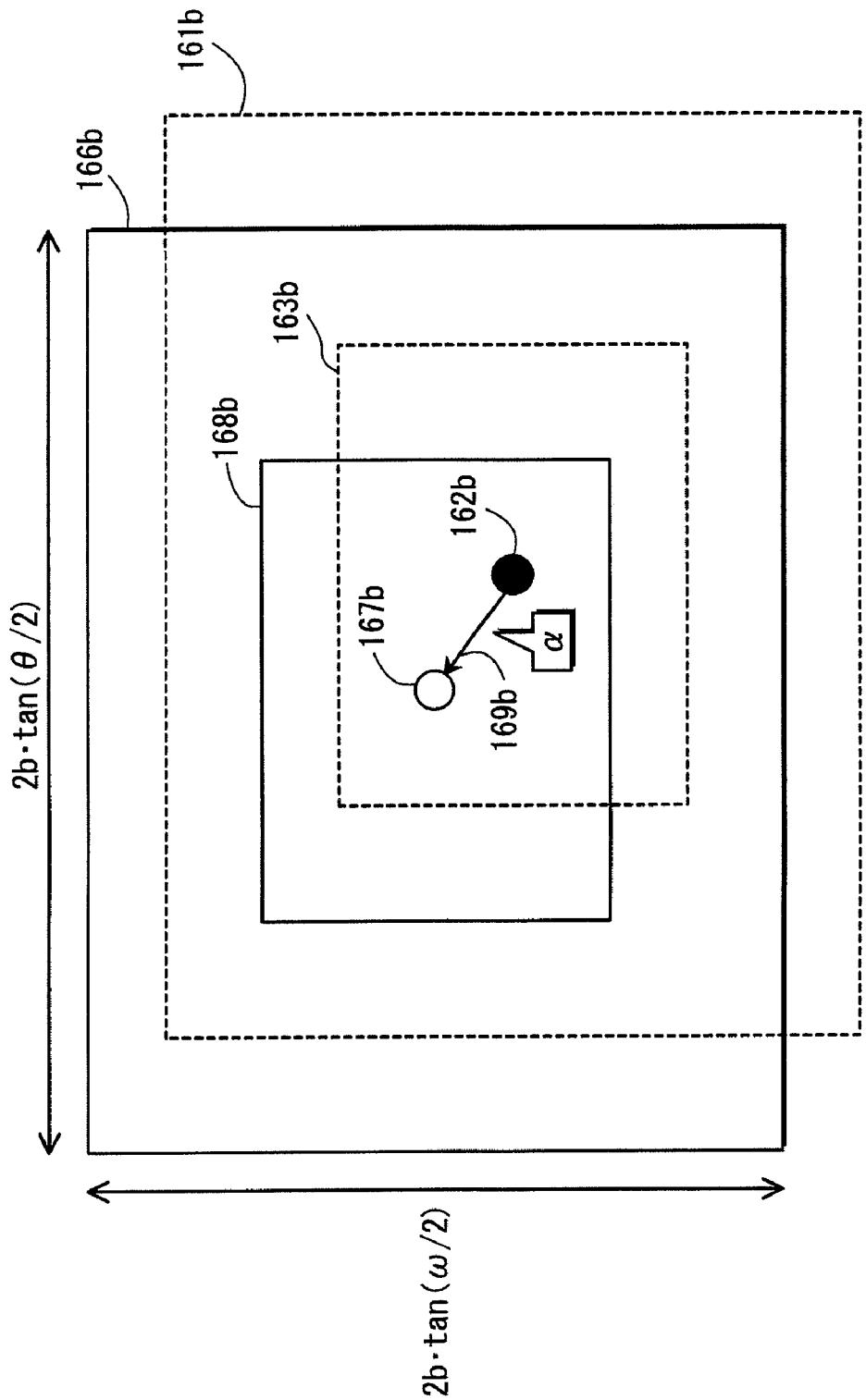
FIG. 16 shows (i) a scheduled imaging range to be captured from the scheduled camera position and (ii) an actual imaging range captured from the actual camera position, each imaging range being on a plane of a subject to be captured.

FIG. 16 shows a scheduled imaging range to be captured from the scheduled camera position and an actual imaging range to be captured from the actual camera position, each imaging range being on the plane of the subject. As shown in FIG. 16, by shifting the scheduled imaging range 161b by the positional error vector 169b (vector $\alpha$), the scheduled imaging range 161b is matched with the actual imaging range 166b. Referring to FIG. 16, a central point of the scheduled imaging range 161b is a scheduled central point 162b, and a central point of the actual imaging range 166b is an actual central point 167b.

Referring to FIG. 16 again, the scheduled imaging range 161b includes a scheduled standard frame 163b, in accordance with which an image captured from the scheduled camera position is to be trimmed then output as an output image. In other words, the scheduled standard frame 163b encloses an output image that would have been output as an originally scheduled output image. Similarly, the actual imaging range 166b includes an actual standard frame 168b, in accordance with which an image captured from the actual camera position is to be trimmed then output as an output image. In other words, the actual standard frame 168b is the equivalent of a standard image frame of the image actually captured.

As shown in FIG. 16, by shifting the actual imaging range on the plane of the subject (captured from the actual camera position) by $-\alpha$, which is a reverse vector of the vector $\alpha$, the actual imaging range can be matched with the scheduled imaging range (captured from the scheduled camera position) on the plane of the subject. This means that if the actual standard frame 168b is shifted by the reserve vector of the vector $\alpha$, then it will match the scheduled standard frame 163b.

What is scheduled to be output is an output image enclosed by the scheduled standard frame 163 within the scheduled imaging range 161b. This should be taken into consideration in determining the output image frame.

FIG. 15B shows a captured image 150b captured with a wide angle of view, a standard image frame 151b, an output image 152b, an output image frame 153b, and a central point correction amount 154b. The central point correction amount 154b indicates to what extent the central point of the captured image 150b (i.e., the central point of the standard image frame 151) should be shifted to become the central point of the output image frame.

Here, a distance between the camera 24 and the plane of the subject is assumed as "b". This distance is already known as it is indicated by "the distance 76" of the instruction information 70. A horizontal angle of view and a vertical angle of view of the camera 24 are assumed as "θ" and "ω", respectively. The angle of view of the camera 24 is also already known as it is indicated by "the angle of view 75" of the instruction information 70. A size of the captured image 150b is assumed as "m" pixels in height and "n" pixels in width. Accordingly, provided a size of the imaging range on the plane of the subject is expressed in terms of distance, the size of the imaging range would be "2b×tan(θ/2)" in the horizontal direction, and "2b×tan(ω/2)" in a vertical direction. A vector representing the second component of the positional error vector is expressed as (i,j). On the plane of the subject, by shifting the actual imaging range captured from the actual camera position by the reverse vector of the vector $\alpha$, the actual imaging range can be matched with the scheduled imaging range captured from the scheduled camera position.

Therefore, the central point of the standard image frame 151b should be shifted within the captured image 150b ("m" pixels in height and "n" pixels in width) in the following manner, provided that the central point is shifted by "v" pixels in the horizontal direction and "w" pixels in the vertical direction. With respect to the horizontal direction, "−i:2b×tan (θ/2)=v:n" can be obtained by the following equation: "a component i of the reverse vector of the vector α: a size of the plane of the subject in the horizontal direction=a shift amount by which the central point shifts in the horizontal direction: a size of the captured image in the horizontal direction". Accordingly, the central point should be shifted by "v=−in/{2b×tan(θ/2)}" in the horizontal direction. Likewise, the central point should be shifted by "w=−jm/{2b×tan(ω/2)}" in the vertical direction.

The image correction processing unit 14 determines the central point of the output image frame 153b by shifting the central point of the standard image frame 151b by "v" pixels in the horizontal direction and "w" pixels in the vertical direction. Note, as stated earlier, that the size of the output image frame 153b is the same as the size of the standard image frame 151b.

1.6.3 When the Positional Error Vector is Pointing in the Imaging Direction

Figure 17B:
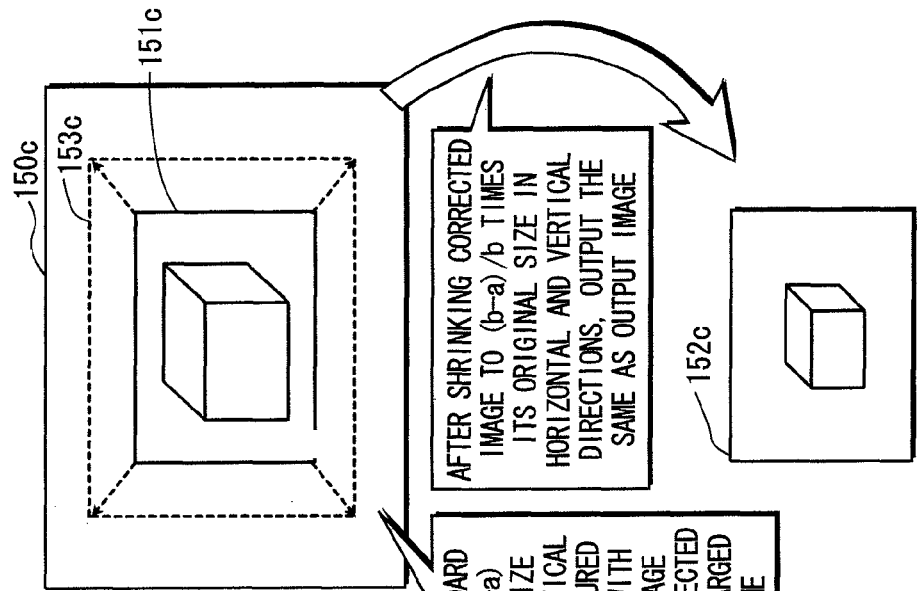
FIGS. 17A and 17B show a process in which the image correction processing unit 14 determines the output image frame when the positional error vector is pointing in the imaging direction.
Figure 17A:
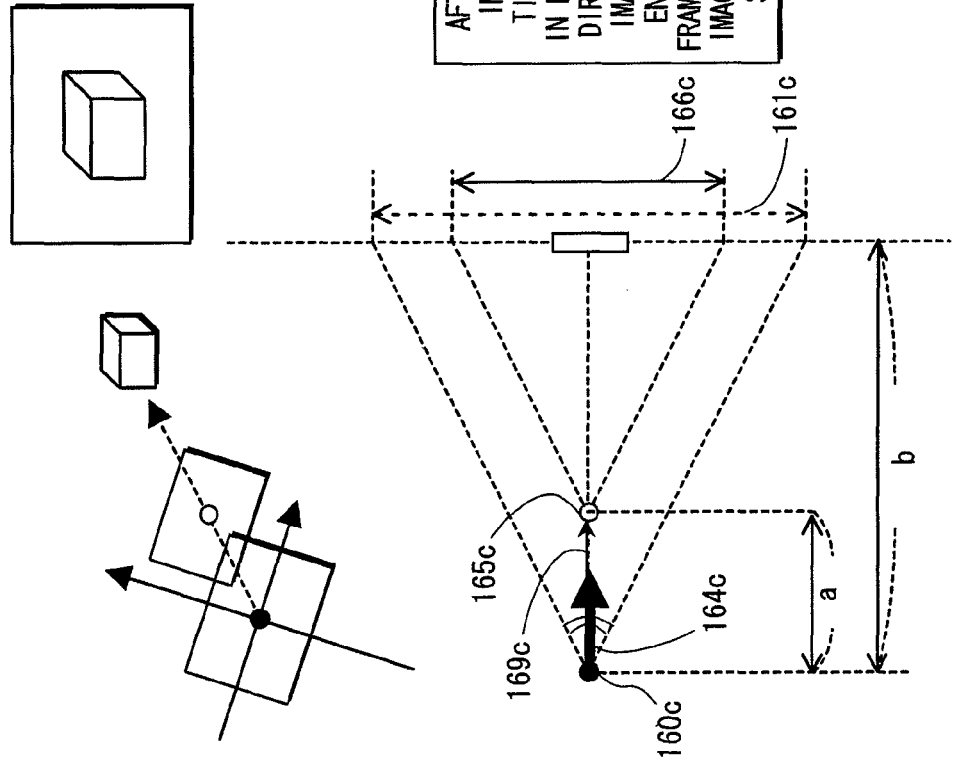

FIGS. 17A and 17B show a process in which the image correction processing unit 14 determines the output image frame when the positional error vector is pointing in the imaging direction.

FIG. 17A shows camera positions and a size of an actual imaging range showing the plane of the subject, the actual imaging range being captured by the camera 24. As in the case of FIG. 14A, FIG. 17A shows the camera positions and the actual imaging range as viewed parallel to the plane of the subject. An actual camera position 165c has strayed off a scheduled camera position 160c by a positional error vector 169c in the imaging direction. The positional error vector 169c is pointing in an imaging direction 164c. An actual imaging range 166c is smaller than a scheduled imaging range 161c.

In other words, FIGS. 17A and 17B depict a case where the distance between the actual camera position and the plane of the subject is smaller than that between the scheduled camera position and the plane of the subject. Since the positional error vector 169c is pointing in the imaging direction 164c, it has no second component. The image correction processing unit 14 thereby corrects a size of the corrected image that is to be output as the output image.

A magnitude of the positional error vector 169c is assumed as "a". A distance between the scheduled camera position and the plane of the subject is assumed as "b". This "b" can be obtained from "the distance 76" of the instruction information 70. Accordingly, a distance between the actual camera position and the plane of the subject is "b−a".

The scheduled imaging range 161c and the actual imaging range 166c each have a height:width ratio of "b:(b−a)". That is, a size of the actual imaging range 166c, both in the horizontal and vertical directions, can be obtained by multiplying a size of the scheduled imaging range 161c by "(b−a)/b". Put another way, the size of the scheduled imaging range 166c can be obtained by multiplying the size of the actual imaging range 161c by "b/(b−a)", both in the horizontal and vertical directions. Hence, a size of an output image frame 153c should be obtained by multiplying a size of a standard image frame 151c by "b/(b−a)", both in the horizontal and vertical directions. As stated earlier, a central point of the standard image frame 151c matches a central point of the output image frame 153c.

FIG. 17B shows a captured image 150c captured with a wide angle of view, the standard image frame 151c, an output image 152c, and the output image frame 153c.

The image correction processing unit 14 regards the central point of the standard image frame 151c as the central point of the output image frame 153c, and determines the size of the output image frame 153c, both in the horizontal and vertical directions, by multiplying the size of the standard image frame 151c by "b/(b−a)". Namely, the image correction processing unit 14 enlarges the size of the standard image frame 151c about its central point.

However, enlarging the size of the standard image frame 151c renders the size of the output image 152c large as well. Therefore, after trimming the captured image in accordance with the enlarged output image frame 153c to generate the corrected image that is enclosed by the enlarged output image frame 153, the image correction processing unit 14 shrinks the corrected image to "(b−a)/b" times its original size, both in the horizontal and vertical directions. Then, the image correction processing unit 14 outputs the corrected image that has been shrunk as the output image 152c.

1.6.4 When the Positional Error Vector is Pointing in the Opposite Direction from the Imaging Direction FIGS. 18A and 18B show a process in which the image correction processing unit 14 determines the output image frame when the positional error vector is pointing in the opposite direction from the imaging direction.

FIG. 18A shows camera positions and a size of an actual imaging range showing the plane of the subject, the actual imaging range being captured by the camera 24. As in the case of FIG. 14A, FIG. 18A shows the camera positions and the imaging range as viewed parallel to the plane of the subject. An actual camera position 165d has strayed off a scheduled camera position 160d by a positional error vector 169d in a direction opposite from an imaging direction 164d. An actual imaging range 166d is larger than a scheduled imaging range 161d.

In other words, FIGS. 18A and 18B depict a case where the distance between the actual camera position and the plane of the subject is larger than that between the scheduled camera position and the plane of the subject. Since the positional error vector 169d is parallel to (although pointing in the opposite direction from) the imaging direction 164d, the positional error vector 169d has no second component that extends along the orthogonal plane. The image correction processing unit 14 thereby trims the captured image such that a size of an output image would be appropriate.

As in the cases of above "1.6.3 When the positional error vector is pointing in the imaging direction" and FIG. 16, a magnitude of the positional error vector 169d is assumed as "a", and a distance between the scheduled camera position and the plane of the subject is assumed as "b". Accordingly, a distance between the actual camera position and the plane of the subject would be "b+a". As is the case with the above example of FIG. 16, it is to be understood that an output image frame 153d can be obtained by multiplying a size of a standard image frame 151d by "b/(b+a)" in both the horizontal and vertical directions.

FIG. 18B shows a captured image 150d captured with a wide angle of view, the standard image frame 151d, an output image 152d, and the output image frame 153d.

The image correction processing unit 14 determines a size of the output image frame 153d by multiplying the size of the standard image frame 151 by "b/(b+a)", both in the horizontal and vertical directions. That is to say, the output image frame 153b is smaller than the standard image frame 151 in size.

The image correction processing unit 14 (i) trims the captured image in accordance with the output image frame 153*d* to generate a corrected image that is enclosed by the output image frame 153*d*, (ii) enlarges the corrected image to "(b+a)/b" times its original size, both in the horizontal and vertical directions, and (iii) outputs the corrected image that has been enlarged as the output image 152*d*.

1.6.5 General Case

Figure 19B:
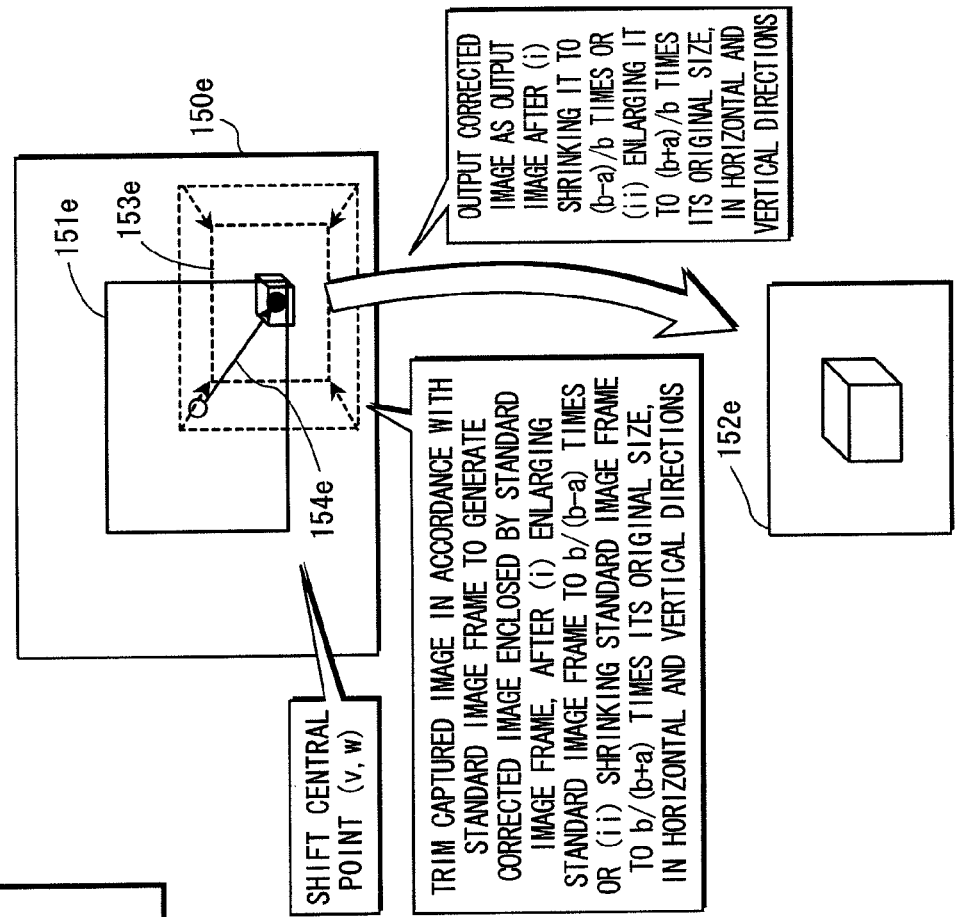
FIGS. 19A and 19B show a process in which the image correction processing unit 14 determines the output image frame by decomposing the positional error vector into (i) a first component that extends along the imaging direction and (ii) second component that extends along a plane orthogonal to the imaging direction.
Figure 19A:
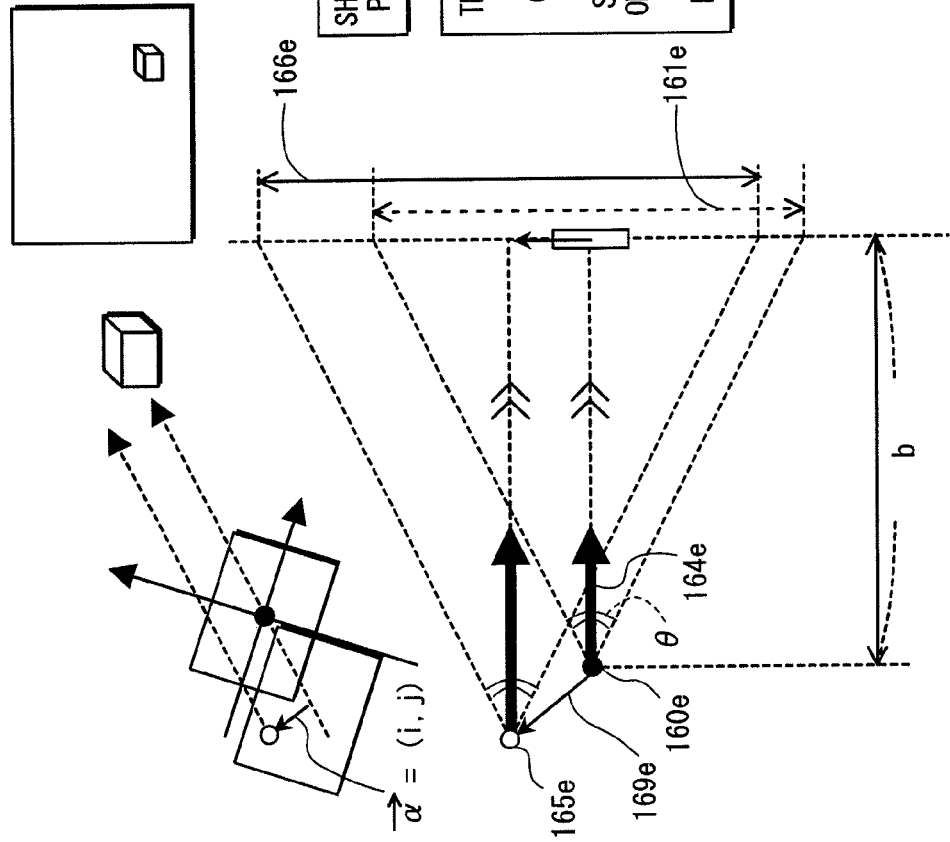

FIGS. 19A and 19B show a process in which the image correction processing unit 14 determines the output image frame by decomposing the positional error vector into the first component and the second component.

As set forth, the case where the positional error vector is only composed of the first component has been explained in "1.6.3 When the positional error vector is pointing in the imaging direction" and "1.6.4 When the positional error vector is pointing in the opposite direction from the imaging direction". The case where the positional error vector is only composed of the second component has been explained in "1.6.2 When the positional error vector is orthogonal to the imaging direction".

As a general case, a combination of the above-described processes should be used when the positional error vector can be decomposed into the first and second components.

Assume that (i) a projection vector is α (i,j), the projection vector being the positional error vector projected onto the orthogonal plane (i.e., the second component of the positional error vector), (ii) a magnitude of the first component is "a", and (iii) the distance between the scheduled camera position and the plane of the subject is "b". In this case, a central point of an output image frame 153*e* should be determined as explained in "1.6.2 When the positional error vector is orthogonal to the imaging direction", and a size of the output image frame 153*e* should be determined as explained in "1.6.3 When the positional error vector is pointing in the imaging direction" or "1.6.4 When the positional error vector is pointing in the opposite direction from the imaging direction".

1.7 Modification 1 of Embodiment 1

The above-described Embodiment 1 may be modified as follows.

1.7.1 Modification 1: Specify the Scheduled Path Afterward

According to the above Embodiment 1, the image correction device 1 corrects an image captured while the moving object 2 is moving along the scheduled path indicated by the instruction information 70. Put another way, Embodiment 1 has described a case where the scheduled path that the moving object 2 is scheduled to follow is prespecified ahead of the image capturing. However, this is not a limitation of the present invention. The scheduled path that the moving object 2 should follow may be specified after the image capturing.

In this case, the image correction device 1 outputs, based on an image actually captured, an output image that would have been obtained if the mobile device 2 performed an image capturing by following the scheduled path to be specified later.

Figure 20:
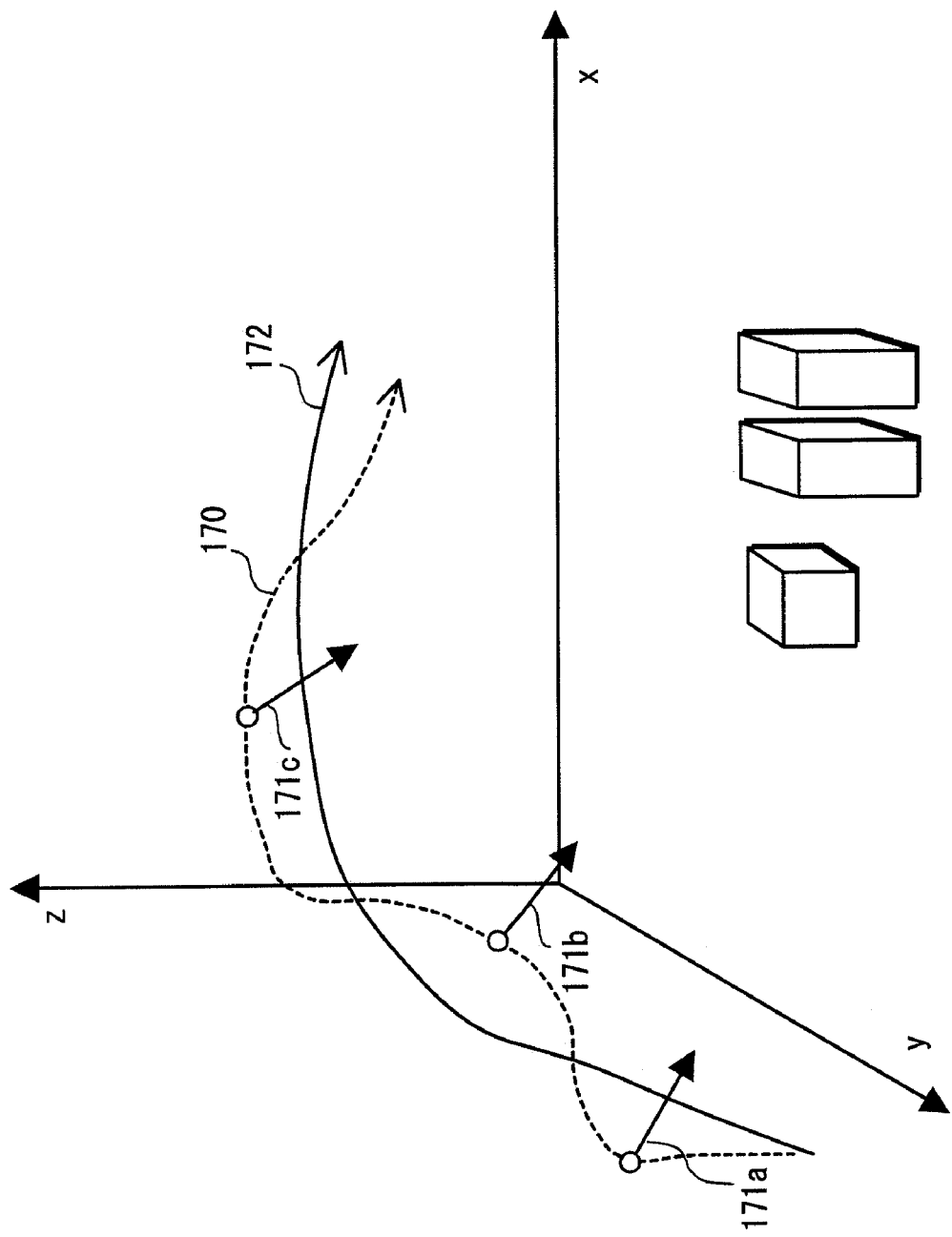
FIG. 20 shows an overview of Modification 1.

FIG. 20 shows an overview of Modification 1. FIG. 20 shows a trajectory 170 that the moving object 2 has actually followed. FIG. 20 also shows an actual imaging direction 171 (171*a*, 171*b*, . . . ) in which the camera has actually captured an image, and a user-specified path 172 which is specified by a user after the image capturing.

As shown in FIG. 20, the trajectory 170 and the actual imaging direction 171 (171*a*, 171*b*, . . . ) at a corresponding time are shown on a display, such that the user can refer to these when specifying a scheduled path. With reference to the trajectory shown on the display, the user specifies the scheduled path that the camera should follow. For instance, the user may draw the scheduled path, or, select the scheduled path out of a plurality of path options that are illustrated in the forms of pipes with the actual trajectory of the camera being illustrated as an axis of the pipes.

Once the user has specified the user-specified path 172 in the above-described manner, it is possible to calculate a positional error vector connecting a point on the trajectory 170 and a point on the user-specified path 172 can be calculated. With such information as the calculated positional error vector and the actual imaging direction 171, determining the output image frame based on the positional error vector makes it possible to trim the captured image to output an output image that would have been obtained if the image capturing was performed at the point on the user-specified path 172, just as described earlier in detail.

In order to calculate the positional error vector, it is necessary to obtain a point on the user-specified path 172 that corresponds to a point on the trajectory 170. With respect to the corresponding point on the trajectory 170, the point on the user-specified path 172, which is used to calculate the positional error vector, can be positioned anywhere on the user-specified path 172. For example, the point on the user-specified path 172 may be an intersection of (i) a plane that includes one point on the trajectory 170 and that is orthogonal to the moving direction of the moving object with the camera which is operated according to the global coordinate system, and (ii) the user-specified path 172. The imaging direction of the moving object is assumed to be obtained based on the trajectory 170.

As a matter of course, the point that is on the user-specified path 172 and is for calculating the positional error vector may be determined in a manner other than the one described above. For example, assume that there is a vector that extends from one point on the trajectory 170 in the actual imaging direction 171 of the camera; the stated point, which is on the user-specified path 172 and is for calculating the positional error vector, may be an intersection of (i) a plane along which the vector extends and (ii) the user-specified path 172.

Figure 21:
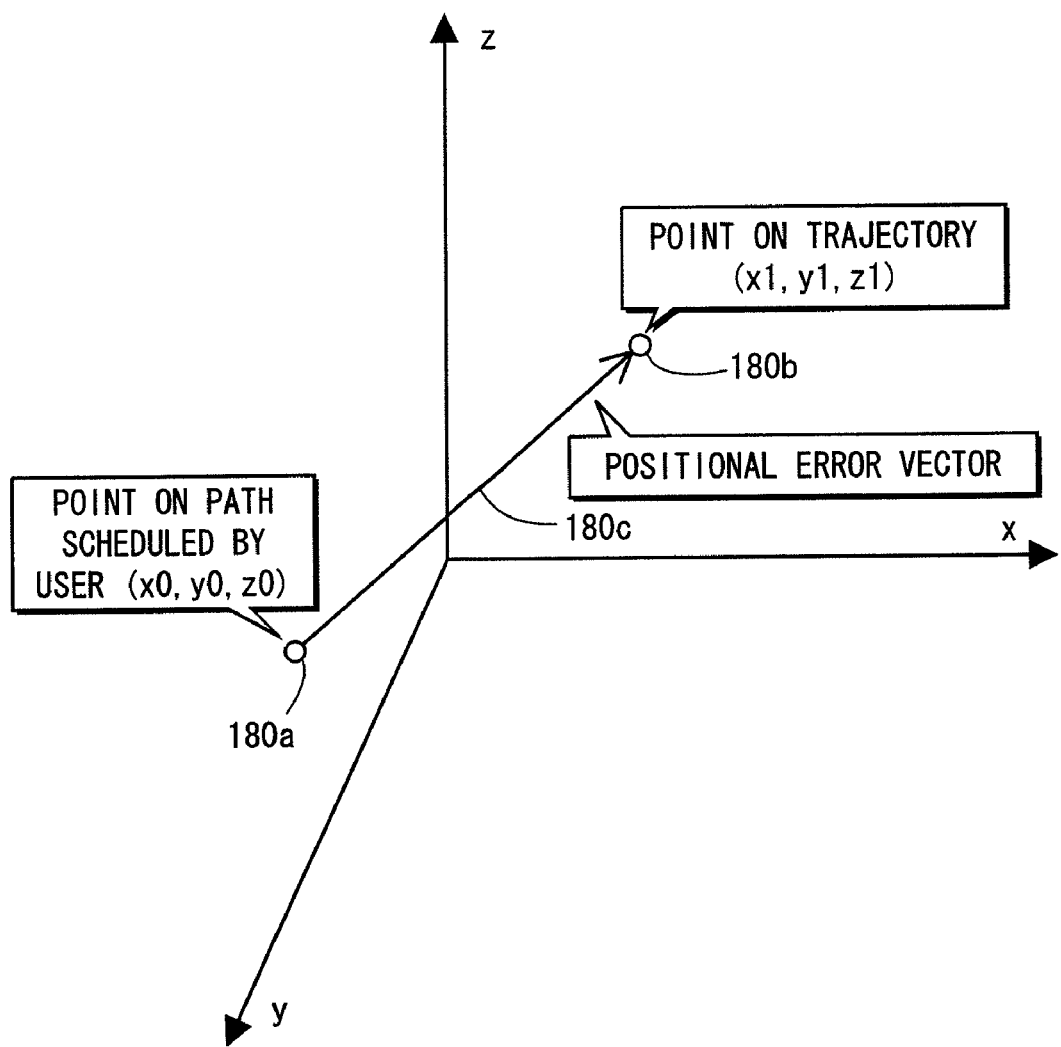
FIG. 21 shows an example of calculating the positional error vector pertaining to Modification.

Upon determining, in the above-described manner, the point that is on the user-specified path 172 and for calculating the positional error vector, the image correction device 1 calculates, as shown in FIG. 21, the positional error vector which is a vector whose initial point is the determined point (180*a*) on the user-specified, scheduled path and whose terminal point is a point 180*b* that is on the trajectory and corresponds to the determined point.

1.7.2 Exemplary Structure of Modification 1

Figure 22:
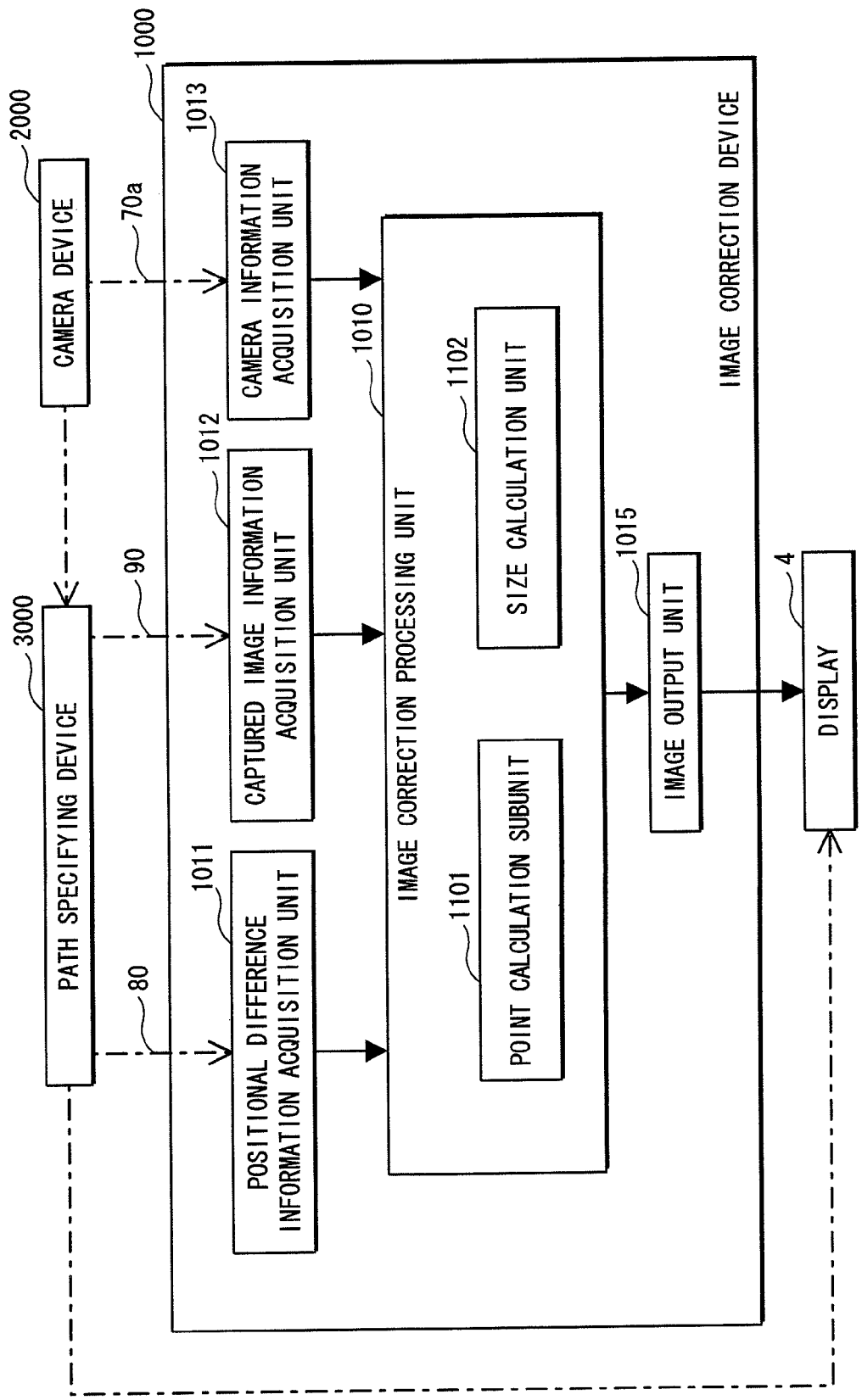
FIG. 22 shows the exemplary structure of the present invention in a case where a scheduled path that the moving object 2 has to follow is specified afterward.

FIG. 22 shows the exemplary structure of the present invention in a case where the scheduled path that the moving object 2 should follow is specified afterward.

As shown in FIG. 22, Modification 1 can be structurally implemented by, for example, an image correction device 1000, a camera device 2000, a path specifying device 3000 and a display 4.

1.7.3 Structure of the Camera Device 2000

The camera device 2000 captures an image while moving, and stores therein a trajectory it has actually followed (i.e., coordinates it has passed and its moving direction) and an imaging direction in which a camera is facing at the scheduled time to capture the image. For example, the camera device 2000 can store therein the stated coordinates and its moving direction in which it is facing when passing the coordinates, by having the same functions as the position management unit 203, GPS 204 and the direction management unit 206 of the moving object 2. The camera device 2000 also stores therein the camera's imaging direction, angle of view at the scheduled time, and so forth, in correspondence with the scheduled time.

It should be mentioned that, if the camera has a fixed angle of view, there is no need to store the camera's angle of view every time an image is captured, because the fixed angle of view does not change. The same rule applies to the imaging direction as well.

The camera device 2000 further stores therein a distance between itself and the plane of the subject at the scheduled time. This distance can be obtained by measuring, with use of a distance sensor or the like, a distance between the camera device 2000 and another substance (a building, a structure, the Earth's surface, etc.) that exists in the imaging direction of the camera. Here, it is permissible that the distance between the camera device 2000 and the plane of the subject (i) is not calculated by the camera device 2000 but by another device or the like after the image capturing, or (ii) is specified by a user.

This way, the camera device 2000 generates and stores therein followed trajectory information 70a exemplarily shown in FIG. 23. The camera device 2000 transmits the followed trajectory information 70a to the image correction device 1000 and the path specifying device 3000.

The camera device 2000 has the same functions as the captured image acquisition unit 213 and the captured image information transmission unit 214 of the moving object 2. The camera device 2000 generates the captured image information 90 and transmits the same to the image correction device 1000.

1.7.3.1 Followed Trajectory Information 70a

Next is a description of the followed trajectory information 70a.

As shown in FIG. 23, the followed trajectory information 70a is composed of one or more information sets each of which includes: a time 71a; a position 72a; a moving direction 73a; an imaging direction 74a; an angle of view 75a; and a distance 76a indicating a distance between a camera provided in the camera device 2000 and the plane of the subject. Practically, the followed trajectory information 70a is approximately equivalent to the instruction information 70. The only difference is that the followed trajectory information 70a indicates a path that the camera device 2000 has actually followed or the like, whereas the instruction information 70 indicates the scheduled path that the camera device 2000 is scheduled to follow.

Each time 71a indicates a scheduled time at which the camera provided in the camera device 2000 captures a corresponding image.

Each position 72a indicates coordinates of the global coordinate system, the coordinates representing an actual position in which the camera device 2000 is actually positioned at the scheduled time indicated by the corresponding time 71a.

Each moving direction 73a indicates a direction in which the camera device 2000 is actually facing at the scheduled time indicated by the corresponding time 71a in the global coordinate system.

Each imaging direction 74a indicates a direction in which the camera provided in the camera device 2000 is actually facing at the scheduled time indicated by the corresponding time 71a in a camera coordinate system. Note, the camera coordinate system of the camera provided in the camera device 2000 may be defined in any way. For example, as with the case of the moving object 2, the p-, q- and r-axes may be defined.

Each angle of view 75a indicates an angle of view that is set for the camera provided in the camera device 2000 at the scheduled time indicated by the corresponding time 71a.

Each distance 76a indicates a distance from the camera provided in the camera device 2000 and the plane of the subject.

1.7.4 Structure of the Path Specifying Device 3000

The path specifying device 3000 acquires the followed trajectory information 70a from the camera device 2000, and shows, on the display 4, a trajectory that the camera has actually followed.

Although not illustrated in detail, the path specifying device 3000 includes an image processing unit that, based on the position 72a or the like of the followed trajectory information 70a, draws the path actually followed by the camera device 2000 in three dimension or the like. It is conventionally known that there has been technology for displaying, on a display, a trajectory that has been actually followed by a moving object (e.g., the camera device 2000), based on information indicating coordinates at which the moving object was positioned at the corresponding scheduled time. As this technology is not a characteristic feature of the present invention, a detailed description of this technology is omitted.

The path specifying device 3000 includes an operation reception unit (e.g., a keyboard, a touchscreen, etc.) that receives, from a user, such an input as a scheduled path. Upon receiving the scheduled path, the path specifying device 3000 calculates, with reference to the scheduled path and the followed trajectory information 70a, a positional error vector that arises at the scheduled time. For example, the path specifying device 3000 can calculate the positional error vector, by having the same function as the positional error calculation unit 202 of the moving object 2. Then the path specifying device 3000 stores therein, in correspondence with the corresponding scheduled time, the calculated positional error vector as positional difference information 80, which is equivalent to the positional difference information 80 explained in the above embodiment.

The path specifying device 3000 transmits the positional difference information 80 to the image correction device 1000.

1.7.5 Structure of the Image Correction Device 1000

The image correction device 1000 has approximately the same function as the image correction device 1 described in the above embodiment. The only differences are that (i) a camera information acquisition subunit 1013 acquires the followed trajectory information 70a, (ii) the positional difference information 80 is acquired from the path specifying device 3000, and (iii) the captured image information 90 is acquired from the camera device 2000. As mentioned in the above "1.7.3.1 Followed trajectory information 70a", the followed trajectory information 70a is practically equivalent to the instruction information 70. Here, in a case where the camera device 2000 does not measure the distance between its camera and the plane of the subject as previously described in "1.7.3 Structure of the camera device 2000", the followed trajectory information 70a does not include the distance 76a between the camera and the plane of the subject. In this case, the image correction device 1000 either (i) acquires information equivalent to the distance 76a from another device that has calculated the distance between the camera and the plane of the subject, or (ii) receives, from the user, the distance between the camera and the plane of the subject.

The image correction device 1000 includes: a positional difference information acquisition unit 1011; a captured image information acquisition unit 1012; the camera information acquisition unit 1013; an image correction processing unit 1010; and an image output unit 1015. The image correction processing unit 1010 includes a point calculation subunit 1101 and a size calculation unit 1102.

The functions of these constituent elements are respectively equivalent to those of the positional difference information acquisition unit 11, the captured image information acquisition unit 12, the camera information acquisition unit 13, the image correction processing unit 14, the image output unit 15, the point calculation subunit 101, and the size calculation subunit 102, which are included in the image correction device 1 as shown in FIG. 6. For this reason, detailed descriptions of the above constituent elements are omitted.

1.7.6 Operations of the Image Correction Device 1000

With reference to the moving direction 73a and the imaging direction 74a of the followed trajectory information 70a, the image correction device 1000 can calculate an imaging direction of the camera. Hence, as with the image correction device 1, the image correction device 1000 can determine an output image frame by decomposing the calculated positional error vector into (i) a first component that extends along the imaging direction of the camera and (ii) a second component that extends along the orthogonal plane. As the imaging correction device 1000 should perform processing in the same manner as the image correction device 1, a detailed description of such processing is omitted.

1.8 Modification 2 of Embodiment 1

It is described in Embodiment 1 that the camera 24 is hardly rolled. However, a possibility that the camera 24 gets rolled is within the scope of the present invention.

The following is a description of Embodiment 2. It should be mentioned that the following description will be given under the assumption that the positional error vector has no first component. In a case where the positional error vector has a first component, a size of the output image frame should be determined by performing the processes described in the above "1.6.3 When the positional error vector is pointing in the imaging direction" or "1.6.4 When the positional error vector is pointing in the opposite direction from the imaging direction".

That is to say, if the camera gets rolled, the following should be taken into consideration: how the imaging range captured from the actual camera position should be shifted to match the imaging range captured from the scheduled camera position.

Hereafter, an angle by which the camera 24 is rotated in roll about the imaging direction is referred to as a roll angle.

It is assumed that, if there is a possibility that the camera 24 gets rolled, then the moving object 2 stores therein a roll amount by which the camera 24 has been rolled at the scheduled time. It is also assumed that the moving object 2 transmits, to the image correction device 1, roll angle information indicating the roll amount obtained at the scheduled time, and that the image correction device 1 acquires the transmitted roll information.

1.8.1 When an Actual Camera Position Matches a Scheduled Camera Position

First, the following describes a case where the actual camera position matches a scheduled camera position, but an actual roll angle of the camera 24 is different from a scheduled roll angle of the camera 24.

FIGS. 24A-24D show the scheduled imaging range to be captured from the scheduled camera position and the actual imaging range captured from the actual camera position, in a case where the actual roll angle of the camera 24 is different from the scheduled roll angle of the camera 24.

When the camera 24 is in the scheduled camera position, it is assumed that the camera 24 has not been rolled (i.e., the camera 24 is in an unrolled state) and thus has a roll angle of 0. On the other hand, it is assumed that the camera 24 in the actual camera position has been rolled (i.e., the camera 24 is in a rolled state) by an angle of $\theta$ in a counter-clockwise direction.

Figures 24B, 24C, 24D:
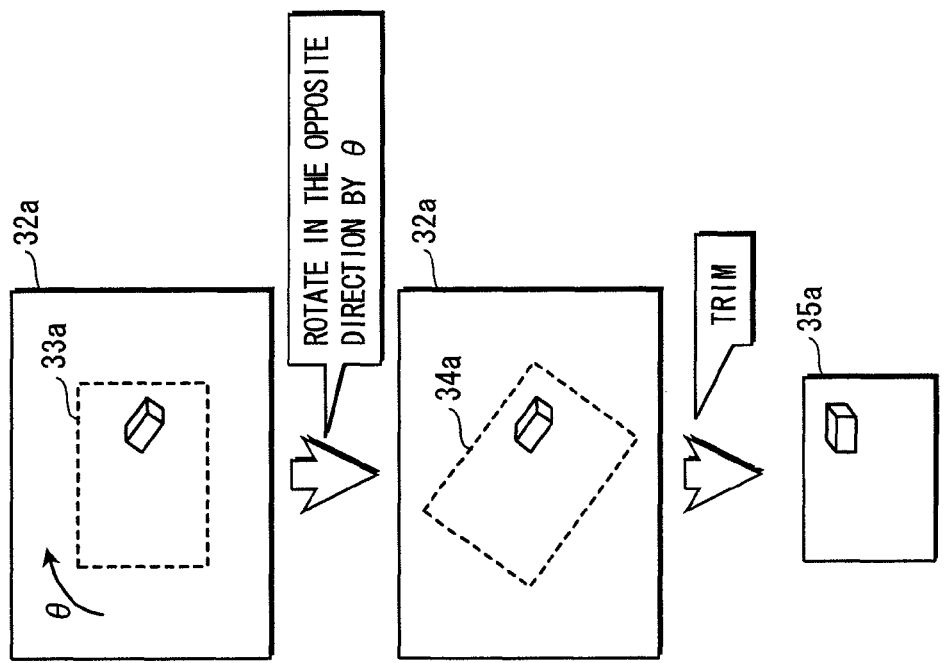
FIGS. 24A-24D show the scheduled imaging range to be captured from the scheduled camera position and the actual imaging range captured from the actual camera position, in a case where an actual roll angle of the camera is different from a scheduled roll angle of the camera.
Figure 24A:
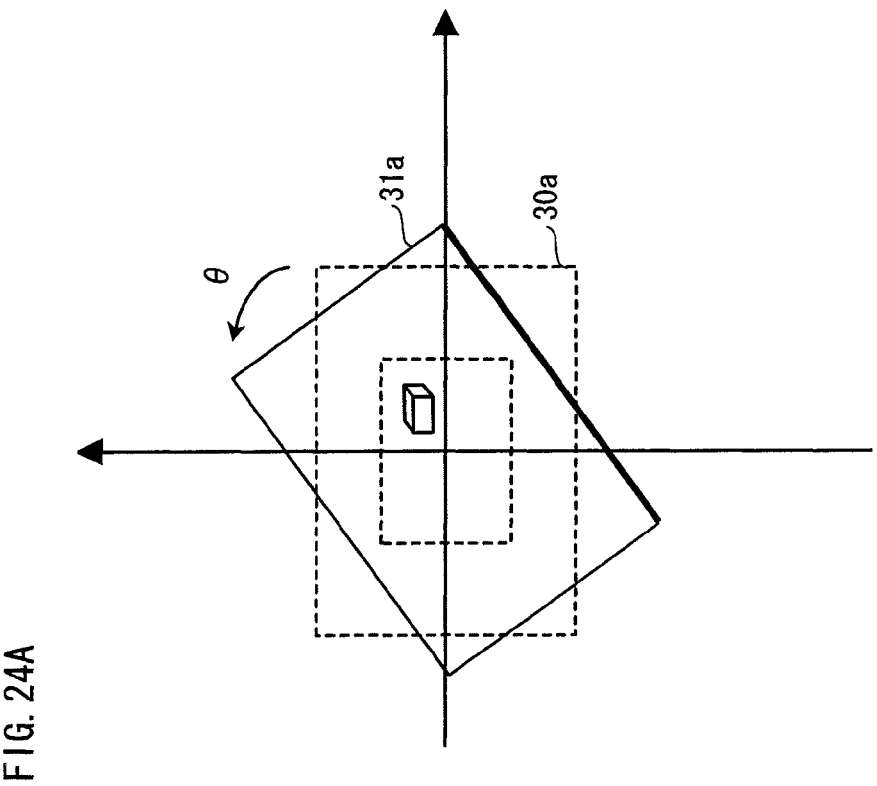

Referring to FIG. 24A, an outer dashed line represents a scheduled imaging range 30a to be captured from the scheduled camera position. A solid line represents an actual imaging range 31a that is captured from the actual camera position. An inner dashed line within the scheduled imaging range 30a represents a frame in accordance with which the captured image is to be trimmed and then output as an output image.

The actual imaging range 31a is the scheduled imaging range 30a rotated about the central point thereof by the angle of $\theta$ in the counterclockwise direction. Accordingly, in order to match the actual imaging range 31a with the scheduled imaging range 30a, the actual imaging range 31a should be rotated about the central point thereof by the angle of $\theta$ in a clockwise direction. Here, with respect to a partial image enclosed by a standard image frame of the actual imaging range 31a, a partial image enclosed by a standard image frame of the scheduled imaging range 30a looks rotated by the angle of $\theta$ in the clockwise direction in an image actually captured. In this view, by rotating the standard image frame of the actual imaging range 31a about its central point by the angle of $\theta$ in the clockwise direction, it is possible to obtain the image frame in accordance with which the captured image is to be trimmed then output as the output image.

FIG. 24B shows a captured image 32a captured from the actual camera position, and its standard image frame 33a.

An output image frame 34a can be obtained by rotating the standard image frame 33a by the angle of $\theta$ in the clockwise direction (or, by an angle of $-\theta$ in the counterclockwise direction). The output image frame 34a is shown in FIG. 24C.

An output image 35a is obtained by (i) trimming the captured image in accordance with the output image frame 34a to generate a corrected image that is enclosed by the output image frame 34a and (ii) outputting the corrected image as the output image 35a. The output image 35a is shown in FIG. 24D.

The foregoing has described the following case: when the camera is positioned in the scheduled camera position, the camera is scheduled to perform the image capturing in the unrolled state. Basically, when the actual camera position matches the scheduled camera position but there is a difference between the actual roll angle and the scheduled roll angle, the actual imaging range captured from the actual camera position is rotated by the stated difference.

Accordingly, it is possible to match the actual imaging range with the scheduled imaging range by rotating the actual imaging range by the stated roll angle difference in the opposite direction. This means that the output image frame can be obtained by rotating the standard image frame of the actual imaging range about its central point by the stated roll angle difference in the opposite direction.

1.8.2 When the Actual Camera Position is Different from the Scheduled Camera Position Next, the following describes, as a general case, a case where (i) the camera positioned in the actual camera position has been rolled and (ii) the actual camera position and the scheduled camera position are different from each other, but are both on a plane orthogonal to the camera's imaging direction.

The following description is given under the following assumption: although the camera is scheduled to be in an unrolled state when it is in the scheduled camera position, in reality the camera positioned in the actual camera position has been rolled by an angle of $\theta$ in a counterclockwise direction.

The orthogonal plane is expressed using i- and j-axes. Here, the i- and j-axes are respectively parallel to the horizontal and vertical directions of the scheduled imaging range that is scheduled to be captured from the scheduled camera position without the camera being rolled, the scheduled imaging range being on the plane of the subject. The second component of the positional error vector is referred to as a vector α(i,j), given that the second component extends along the orthogonal plane.

FIGS. 25A-25D show the scheduled imaging range to be captured from the scheduled camera position and the actual imaging range captured from the actual camera position, in a case where the scheduled camera position is different from the actual camera position, and the scheduled roll angle is different from the actual roll angle.

Figure 25B:
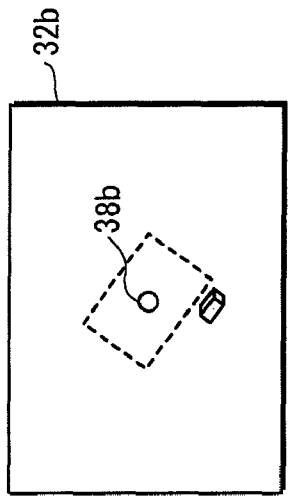
FIGS. 25A-25D show the scheduled imaging range to be captured from the scheduled camera position and the actual imaging range captured from the actual camera position, in a case where the scheduled camera position is different from the actual camera position, and the scheduled roll angle is different from the actual roll angle.
Figure 25C:
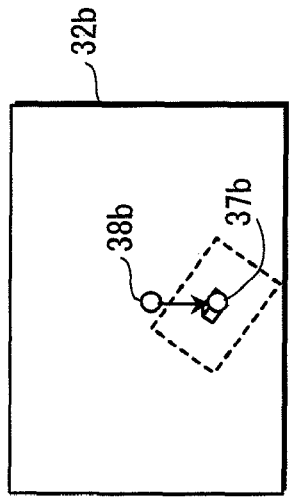
Figure 25D:
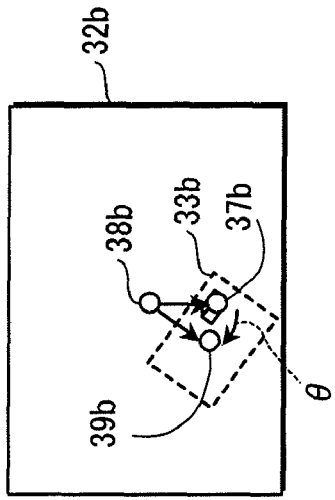
Figure 25A:
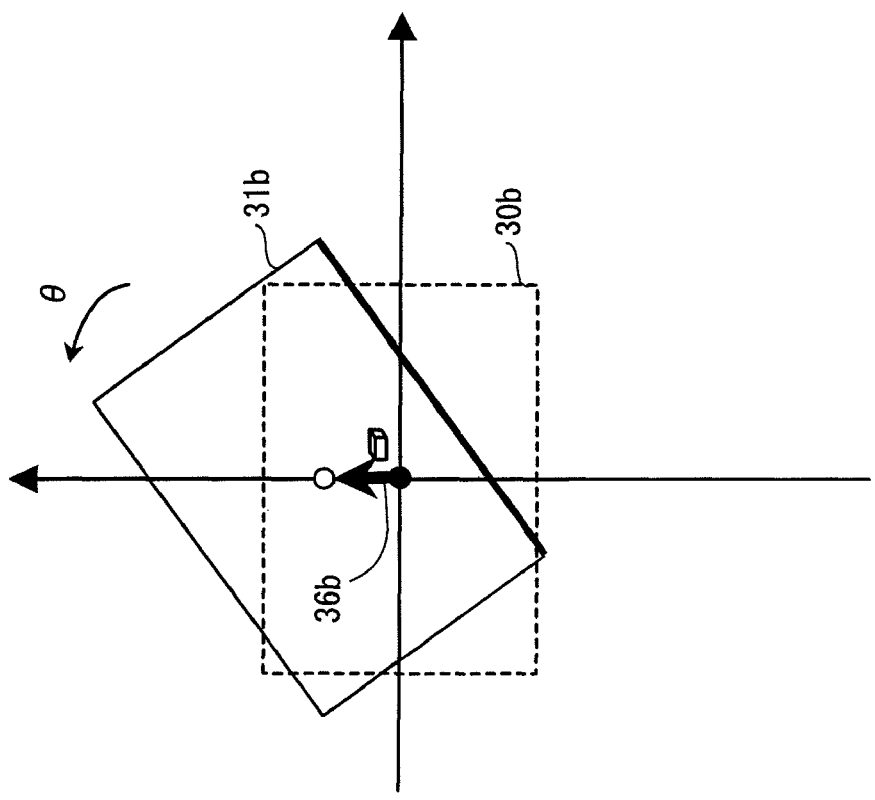

Referring to FIG. 25A, a dashed line represents a scheduled imaging range 30b that is scheduled to be captured from the scheduled camera position, and a solid line represents an actual imaging range 31b captured from the actual camera position. A projection vector 36b is the positional error vector α being projected onto the plane of the subject. As the orthogonal plane is parallel to the plane of the subject, FIG. 25A also shows the i- and j-axes on the orthogonal plane.

As shown in FIG. 25A, in order to match the actual imaging range 31b with the scheduled imaging range 30b, the actual imaging range 31b should be (i) shifted by a reverse vector of the projection vector 36b along the ij-plane, and (ii) rotated in the opposite direction by the roll angle difference. Also, in order to obtain an output image that would have been obtained if the image capturing was performed from the scheduled camera position, the following should be performed: rotating a standard image frame of the captured image (the actual imaging range 31b) about its central point by an angle of θ in the clockwise direction; and shifting the central point of the standard image frame of the captured image in accordance with the projection vector in view of the roll angle difference.

Referring to FIG. 25B, a dashed line represents the standard image frame of the captured image 32b captured from the actual camera position, the standard image frame having been rotated by an angle of θ in the clockwise direction (or, by an angle of −θ in the counterclockwise direction).

In the above state, however, the positional difference is not taken into consideration; accordingly, a partial image enclosed by the rotated standard image frame of the captured image 32b is not the same as an output image that would have been obtained if the image capturing were performed from the scheduled camera position.

It should be reminded here that the vector α is based on the ij-plane, and that the i- and j-axes are respectively parallel to the horizontal and vertical directions of the scheduled imaging range on the plane of the subject, where the scheduled imaging range is scheduled to be captured without the camera being rolled. In a case where the camera captures an image from its actual camera position in an unrolled state, the horizontal and vertical directions of the scheduled imaging range are parallel to the horizontal and vertical directions of the actual imaging range, respectively. Considering this, the central point of the output image frame can be obtained by shifting the central point of the standard image frame of the captured image 32b in the opposite direction from the direction pointed by the projection vector 36b, which is the vector α being projected onto the plane of the subject.

On the other hand, in a case where the camera in the actual camera position captures an image in a rolled state, the horizontal and vertical directions of the scheduled imaging range are not parallel with the horizontal and vertical directions of the actual imaging range on the plane of the subject, respectively. The projection vector 36b is the vector α(i,j) being projected onto the plane of the subject; therefore, in order to match the actual imaging range with the scheduled imaging range, it is first required to perform the following: provided i'- and j'-axes are respectively parallel to the horizontal and vertical directions of the actual imaging range, shifting the central point of the actual imaging range by a component of the projection vector 36b (i.e., by the vector α(i,j)) in a direction opposite to the direction pointed by the vector α (in other word, shifting the central point of the actual imaging range by −i in the i'-axis direction and −j in the j'-axis direction).

Second, it is required to rotate the shifted central point of the actual imaging range about the original (unshifted) central point of the actual imaging range, by an angle of θ in the clockwise direction (or by an angle of −θ in the counterclockwise direction) By performing the above, the central point of the actual imaging range can be matched with that of the scheduled imaging range.

The aforementioned should be taken into consideration also when determining the output image frame within the actual captured image. In this case, provided that the camera captures the image from its actual camera position in the unrolled state, it is required to rotate the central point of the output image frame about the central point of the standard image frame by the angle of θ in the clockwise direction, or by the angle of −θ in the counterclockwise direction (i.e., in the opposite direction from the roll direction). The rotated central point is the central point of the output image frame in the actual imaging range that the camera captured in the rolled state.

FIG. 25C shows a central point 37b of the output image frame, which is obtained in the case where the camera captures the image from its actual camera position in the unrolled state. Considering that (i) the horizontal and vertical directions of the scheduled imaging range are respectively parallel to the i- and j-axes of the orthogonal plane, and (ii) the vector α and the projection vector 36b are expressed using such components as the i- and j-axes, it follows that the central point of the output image frame, which is obtained when the camera captures the image in the unrolled state, should be shifted in the direction opposite to the direction indicated by each component of the projection vector 36b.

A central point 39b of an output image frame 33b can be obtained by rotating the above central point 37b about the central point 38b of the standard image frame by the angle of θ in the clockwise direction. FIG. 25D shows the output image frame 33b and its central point 39b.

1.8.3 Summary: when the Camera is Rolled

In sum, in the case where (i) the camera in the actual camera position has been rotated by an angle of θ in the counterclockwise direction, contrary to the fact that the camera is scheduled to perform the image capturing in the unrolled state from the scheduled position, and (ii) the actual camera position and the scheduled camera position are different from each other, but are both on the orthogonal plane, the following should be performed: rotating the central point of the output image frame, which is captured by the camera in the unrolled state as explained in Embodiment 1, about the central point of the standard image frame by the angle of θ in the clockwise direction (or by the angle of −θ in the counterclockwise direction); and further rotating the output image frame itself about its central point by the angle of θ in the clockwise direction.

Note, in a case where the camera is scheduled to perform the image capturing in the rolled state from the scheduled camera position, the following should be conducted: first, determining, from the actual captured image, an output image frame that would have been obtained if the camera was scheduled to perform the image capturing in the unrolled state from the scheduled camera position; and then, rotating the determined output image frame about its central point by a roll angle by which the camera in the scheduled position is scheduled to be rolled, in a direction in which the camera in the scheduled position is scheduled to be rolled.

In this case, it is assumed that the image correction device 1 acquires scheduled roll angle information indicating a roll amount by which the camera in the scheduled position is scheduled be rolled.

1.9 Modification 3 of Embodiment 1

According to the foregoing description of Embodiment 1, the actual imaging direction of the camera 24 is parallel to the scheduled imaging direction in which the camera 24 is scheduled to face, the scheduled imaging direction being shown by the instruction information 70.

This, however, is not a limitation of the present invention. Even when the actual imaging direction of the camera 24 is off the scheduled imaging direction of the camera 24 (i.e., when the actual imaging direction of the camera 24 is not parallel to the scheduled imaging direction of the camera 24), the image correction device 1 can determine an output image frame within the captured image, while taking such a difference into consideration.

1.9.1 When the Actual Imaging Direction is Different from the Scheduled Imaging Direction As mentioned earlier, in the present invention, the output image frame is determined by decomposing the positional error vector into the first component and the second component. In a case where the actual imaging direction of the camera 24 is not parallel to the scheduled imaging direction of the camera 24 (i.e., in a case where there is an error between the actual and scheduled imaging directions), a vector representing this error is referred to as an imaging direction error vector. Since each imaging direction is expressed by a vector, the imaging direction error vector, for example, represents a difference obtained by subtracting (i) a vector representing the scheduled imaging direction from (ii) a vector representing the actual imaging direction. This imaging direction error vector can be decomposed into (i) a first component that extends along the imaging direction and (ii) a second component that extends along the orthogonal plane. Accordingly, the output image frame can be determined in view of a difference between the actual and scheduled imaging directions, in the same manner as when the positional error vector is decomposed into the first component and the second component.

In the above embodiment, it is assumed that a vector representing an imaging direction is expressed by a unit vector. It should be noted here that a magnitude of the second component of the imaging direction error vector becomes larger as the distance between the camera position and the plane of the subject gets larger. In contrast with this, the first component of the imaging direction error vector does not change in magnitude.

Figure 26B:
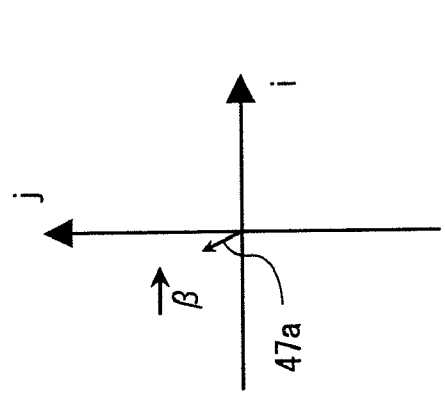
FIGS. 26A-26C show a camera position and planes of the subject to be captured, in a case where there is an imaging direction error vector.
Figure 26C:
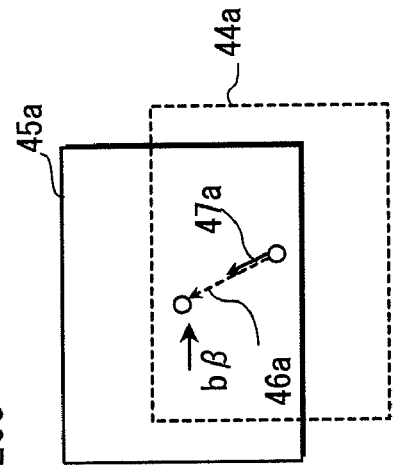
Figure 26A:
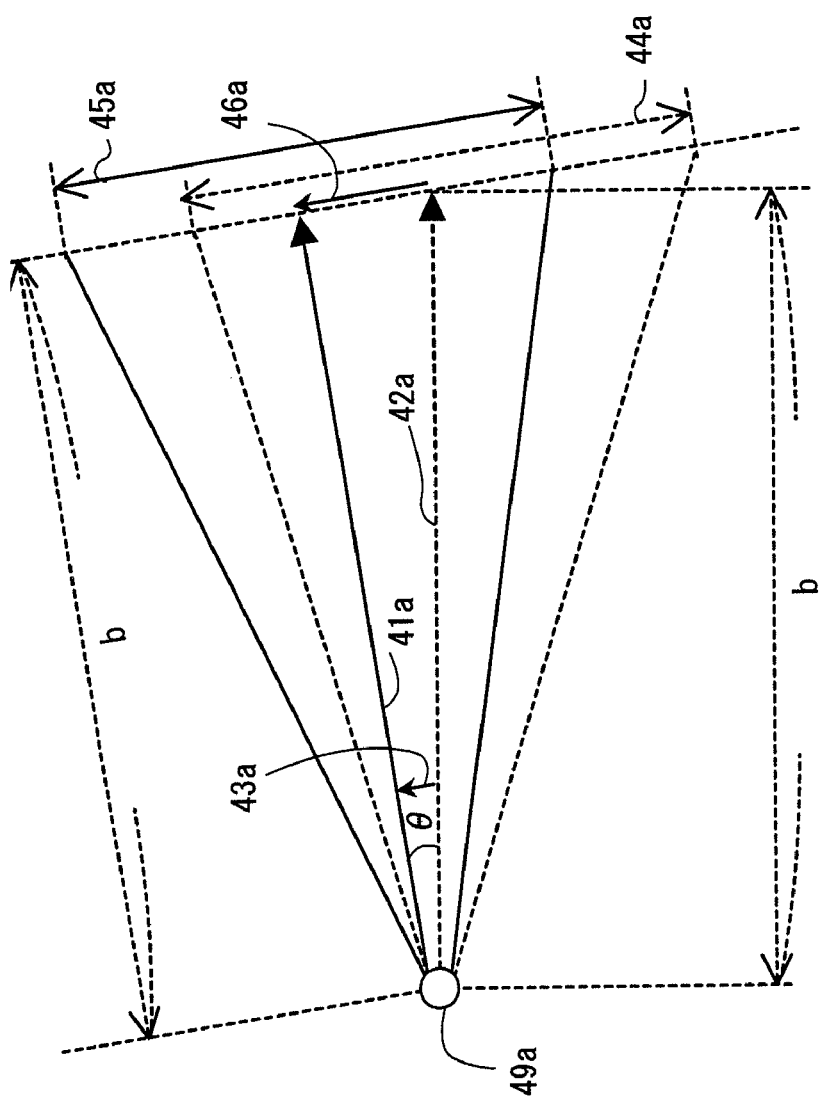

FIGS. 26A-26C show a camera position and planes of the subject to be captured, in a case where there is an imaging direction error vector.

FIG. 26A shows a scheduled imaging direction 41a, an actual imaging direction 42a, an imaging direction error vector 43a, a scheduled imaging range 44a, an actual imaging range 45a, a difference 46a, and a camera position 49a.

It is assumed here that both the scheduled camera position and the actual camera position are on the same point (i.e., the camera position 49a), and that the scheduled imaging direction 41a is different from the actual imaging direction 42a by an angle of θ.

Here, it is assumed that the actual imaging direction 42a is already known because, for example, the moving object 2 stores therein an actual imaging direction.

As described above, the scheduled imaging direction 41a and the actual imaging direction 42a are each expressed by a unit vector. It is assumed that a distance between the camera position and the plane of the subject is "b", and that a distance between the scheduled camera position and the plane of the subject is approximately the same as that between the actual camera position and the plane of the subject. Accordingly, the second component of the imaging direction error vector is "b" times larger when measured along the plane of the subject than when measured in the camera position 49a. In other words, the difference 46a is "b" times larger than the second component of the imaging direction error vector 43a measured in the camera position 49a.

FIG. 26B shows a vector β(i,j) representing the second component of the imaging direction error vector.

FIG. 26C shows the scheduled imaging range 44a, the actual imaging range 45a, and the difference 46a that are projected onto the plane of the subject. Also shown in FIG. 26C is a vector β47a, which is the vector β(i,j) representing the second component of the imaging direction error vector. As shown in FIG. 26C, the difference 46a is "b" times longer than the vector β47a. In the case where there is an error between the actual imaging direction and the scheduled imaging direction, the central point of the output image frame should be determined in the same manner as the above Embodiment 1, assuming that the difference 46a is the second component of the positional error vector.

Likewise, the size of the output image frame should be enlarged or shrunk in accordance with the first component of the imaging direction error vector, just as explained in "1.6.3 When the positional error vector is pointing in the imaging direction" and "1.6.4 When the positional error vector is pointing in the opposite direction from the imaging direction" of the above Embodiment 1.

1.9.2 When the Actual Imaging Direction is Different from the Scheduled Imaging Direction (Additional Remarks)

Note, the second component of the imaging direction error vector affects the captured image more as the distance between the camera position and the plane of the subject is larger. Hence, when such a distance is relatively large, there is a possibility that the first component of the imaging direction error vector may affect the captured image on a lesser scale than the second component of the imaging direction error vector. In other words, even if the scheduled imaging direction is different from the actual imaging direction, the size of the subject in the image captured along the actual imaging direction would not be so different from that in the image captured along the scheduled imaging direction, as long as the distance between the camera position and the subject is relatively large.

Accordingly, the size of the output image frame may be neither enlarged nor shrunk, assuming that the first component of the imaging direction error vector approximates a zero vector obtained when the actual imaging direction is the same as the scheduled imaging direction. This can accelerate a processing speed of the image correction device 1, and thus can be useful when the image correction device 1 is required to perform real-time processing.

In a case where the actual imaging direction is different from the scheduled imaging direction, and also the actual camera position is different from the scheduled camera position, the central point of the output image frame should be determined in accordance with a vector obtained by combining the above-mentioned difference 46 and the second component of the positional error vector.

1.9.3 When the Moving Object 2 is in Motion

According to the description of the above Embodiment 1, the moving object 2 is hardly rolled/pitched, and the rolling/pitching of the moving object 2 does not have severe effects on the captured image. However, if an actual imaging method is different from a scheduled imaging method (e.g., if the moving object 2 is rolled or pitched when incorporating the actual imaging method, whereas the moving object 2 is not scheduled to be rolled or pitched when incorporating the scheduled imaging method), there is a case where the actual imaging direction of the camera 24 may be different from the scheduled imaging direction of the camera 24.

For example, if the moving object 2 is in a rolled state at the scheduled time, then the actual imaging direction of the camera 24 would be rotated about the p-axis; put another way, the actual imaging direction is different from the scheduled imaging direction. In this manner, movements of the moving object 2 can be expressed as movements around the p-, q- and r-axes (i.e., rotations in the camera coordinate system). Hence, such movements can be regarded as errors in the camera's imaging direction.

As mentioned above, the output image frame can be determined in view of movements of the moving object 2 by decomposing the imaging direction error vector into the first component and the second component, the imaging direction error vector representing the error between the scheduled imaging direction of the camera 24 and the actual imaging direction of the camera 24.

For example, the moving object 2 stores therein its actual roll, pitch, or yaw angle at the scheduled time, and the image correction device 1 acquires such information from the moving object 2. Then, upon acquiring information indicating a scheduled roll, pitch, or yaw angle by which the moving object 2 is scheduled to rotated while moving, the image correction device 1 obtains moving object movement error information indicating an error between the scheduled and actual movements of the moving object 2, by calculating an error between the actual information (the actual roll angle, etc.) and the scheduled information (the scheduled roll angle, etc.). Obtaining the moving object movement error information allows the image correction device 1 to acknowledge the error between the scheduled and actual imaging directions of the camera. In view of this, an output image should be obtained by trimming the captured image, in accordance with the error between the scheduled and actual imaging directions of the camera, just as described earlier.

1.10 Other Additional Remarks

Although the image correction device 1 of the present invention is described above based on the embodiment, it may be modified in the following manners. It should be noted that the present invention is not confined to the image correction device 1 illustrated in the above embodiment.

1.10.1 Timing at which the Positional Difference Information Transmission Unit 208 Performs Transmission Below are additional notes on the timing at which the positional difference information transmission unit 208 transmits the positional difference information 80 to the image correction unit 1. It is permissible that the positional difference information transmission unit 208 transmits positional difference information 80 every time it receives a positional error vector from the positional error calculation unit 202. In this case, the image correction device 1 receives positional error vectors one by one, each positional error vector corresponding to a different one of scheduled times. This makes it possible to make a real-time correction to the image captured by the camera 24 provided in the moving object 2. It is also permissible that the positional difference information transmission unit 208 may transmit pieces of positional difference information 80 to the image correction device 1 all at once, after accumulating, to some extent, the positional error vectors each corresponding to the different one of scheduled times.

The same rule applies to the timing at which the captured image information transmission unit 214 transmits the captured image information 90 and the image captured by the camera 24. That is, it is permissible that the captured image information transmission unit 214 reads out and transmits an image (stored in the captured image acquisition unit 213) together with corresponding captured image information 90 every time it captures the image. This allows the image correction device 1 to make a real-time correction to the captured image. It is also permissible that the captured image information transmission unit 214 transmits images and corresponding pieces of captured image information 90 all at once, after accumulating the images to some extent.

1.10.2 Variations of the Moving Object 2

The above embodiment has depicted an exemplary case where the moving object 2 is an airborne object. This, however, is not a limitation of the present invention. In other words, as long as the moving object 2 is something that is affected by a disturbance, the present invention can be applied. The moving object 2 may, for example, be a movable floating craft (e.g., a boat, yacht, and sailboat) that floats on and moves across water. While traveling, the movable floating craft is susceptible to a wind. The movable floating craft is also rocked by waves. Alternatively, the moving object 2 may be a vehicle that travels along the Earth's surface; in this case, there is a possibility that the moving object 2 may get bounced off by an obstacle (e.g., a stone) when traveling through mountainous areas or wastelands. Alternatively, instead of travelling along the Earth's surface or moving across water, the moving object 2 may travel underwater; in this case, there is a possibility that movements of the moving object 2 may be affected by a current.

1.10.3 Variations of the Structure

It is described in the above embodiment that the image correction device 1, the moving object 2 and the movement instruction device 3 are different objects. However, these are not necessarily separate from one another. For example, it is permissible that the moving object 2 has the functions of the movement instruction device 3 and the image correction device 1, or that the image correction device 1 has the function of the movement instruction device 3. For example, although the above embodiment describes that corrections are made to the propeller power and the camera angle by the moving object 2 calculating a positional error and a directional error, the movement instruction device 3 may remotely instruct the moving object 2 to perform such processing. Likewise, although it has been described that the image correction device 1 acquires the instruction information 70 from the movement instruction device 3, the image correction device may instead acquire the instruction information 70 from the moving object 2.

Referring to the illustration of FIG. 6, the display 4 is outside the image correction device 1. However, the display 4 may be included in the image correction device 1.

According to the above embodiment, the moving object 2 makes corrections to the captured images, the propeller power and the camera angle, based on the positional error vector and the directional error vector. Other than these, the moving object 2 may, based on data obtained by measuring a disturbance, (i) determine an output image frame in accordance with which the captured image is to be trimmed then output as an output image and (ii) make corrections to the propeller power and the camera angle. To measure the disturbance, such an item as a wind pressure sensor can be used. In the case where the moving object 2 moves across water or underwater, a water pressure sensor can be used instead. Similarly, in the case where the moving object 2 travels along the Earth's surface, a pressure sensor can be used.

It is permissible that the determination of the output image frame and the corrections on the propeller power and the camera angle are performed based on the speed, acceleration, etc., of the moving object 2.

It is described above that the position and direction of the moving object 2 is acquired using GPS 204 and the gyroscope 207. Instead of this, it is permissible that another device measures the position and direction of the moving object 2 and informs the moving object 2 of a result of the measurement.

Although it is described above that the moving object 2 flies by means of the balloon 21 and the propeller 22, it may use other means to fly, such as a blade, wings and a jet engine.

According to the above embodiment, the image correction device 1 acquires information on the scheduled imaging direction 74 of the camera 24 by receiving the instruction information 70, and decomposes the positional error vector based on the information on the scheduled imaging direction 74. Instead of this, it is permissible that the moving object 2 (i) successively stores therein scheduled imaging directions of the camera 24, (ii) acquires actual imaging directions of the camera 24, and (iii) decomposes each positional error vector based on a corresponding one of the actual imaging directions, so as to make corrections to the captured images.

It has been assumed that the distance indicated by the instruction information 70 is a distance between the scheduled camera position and the plane of the subject. However, in a case where the moving object 2 can measure the distance between the camera position and the plane of the subject, the correction on the size of the corrected image, etc., may be performed in accordance with a distance between the actual camera position and the plane of the subject.

A method for calculating an error vector, such as the positional error vector and the directional error vector, is not limited to the ones explained in the above embodiment. For example, the positional error vector may be a vector going from the coordinates at which the moving object 2 is actually positioned to the coordinates at which the moving object 2 is scheduled to be positioned. The same goes for the directional error vector; the directional error vector may be a vector difference obtained by subtracting a unit vector indicating a direction in which the moving object 2 is actually facing from a unit vector indicating a direction in which the moving object 2 is scheduled to face. Many other methods for calculating an error vector are allowed.

1.10.4 Correcting Video

According to the above embodiment, the image correction device 1 makes corrections to the image captured by the camera 24 provided in the moving object 2. However, in a case where the moving object 2 takes a video, the image correction device 1 may be a video correction device that makes corrections to the video, which is constituted by still images, by (i) determining an output image frame for each still image constituting the video, (ii) trimming each still image in accordance with a corresponding one of the output image frames in sequence, to generate corrected images that are enclosed by the output image frames, and (iii) outputting the corrected images as output images in sequence. Such a video correction device may be used in various situations, such as the following: a video is taken from a bird's eye view using a camera provided in an inexpensive, small moving object, at a site of a disaster or in a venue of an event (e.g., an outdoor competition); then, the video correction device receives the taken video in real-time and corrects/outputs still images constituting the taken video in sequence. When a video is taken by a person, the video would be taken exactly as scheduled by an operator (i.e., the person) as a matter of course, since the person operates the camera. However, in this case, taking the video from a bird's eye view requires the person to ride on a helicopter or the like, which not only renders the moving object 2 relatively large but also results in a high cost in general.

1.10.5 Variations of Method for Correcting Images

The above embodiment describes the method for determining an output image frame within a captured image. The method may have the following exemplary variation.

A shift direction, shift amount, scale, etc., are pre-calculated based on the positional error vector, the distance between the camera position and the plane of the subject, and the angle of view, where the shift direction and shift amount respectively indicate in which direction and to what extent the central point of the standard image frame should be shifted, and the scale indicates a ratio by which the size of the corrected image enclosed by the standard image frame is enlarged/shrunk. A result of the pre-calculation may be stored in the image correction device 1 as image correction information. In other words, in a case where the above-described positional error vector exists, the image correction device 1 should store therein a magnitude and a direction of a vector required to shift an actual imaging range of the plane of the subject to a scheduled imaging range of the plane of the subject. These correction amounts are to be pre-calculated through experiments, simulations, etc.; then, the shift amount by which the central point of the output image frame is shifted is determined based on the magnitude of the vector.

1.10.6 Other Remarks (1) The above devices may be computer systems structured specifically from a microprocessor, a ROM, a RAM, a hard disk unit, a display unit, a keyboard, a mouse, etc. A computer program is stored in the RAM or the hard disk unit. The devices achieve their functions as the microprocessor operates in accordance with the computer program. Instruction code which indicates commands to the computer is structured as a combination of multiple instruction codes in order for the computer program to achieve predetermined functions.

(2) A portion or all of the constituent elements of the above devices may be structured as a single system LSI (Large Scale Integration). A system LSI is a super multifunctional LSI manufactured by integrating a plurality of structural units onto a single chip. Specifically, it is a computer system including a microprocessor, a ROM, a RAM, and the like. A computer program is stored in the RAM. The system LSI achieves its functions as the microprocessor operates in accordance with the computer program.

(3) A portion or all of the constituent elements of the above devices may be structured as a removable IC card or stand-alone module. The IC card or the module is a computer system including a microprocessor, a ROM, and a RAM. The IC card and the module may include the above super multi-functional LSI. The IC card and the module achieve their functions as the microprocessor operates in accordance with the computer program. This IC card or module may be tamper resistant.

(4) The present invention may be the methods shown above. Also, the present invention may be computer programs for causing computers to realize the methods, or may be digital signals representing the computer programs.

Also, the present invention may be a computer-readable recording medium such as a flexible disk, a hard disk, a CD-ROM, an MO, a DVD, a DVD-ROM, a DVD-RAM, a BD (Blu-ray Disc), or a semiconductor memory on which the computer programs or the digital signals are recorded. The present invention may be the computer programs or the digital signals which are recorded on these recording media.

Also, the present invention may be the computer programs or digital signals which are transmitted via an electronic communications circuit, a wireless or fixed-line communications circuit, a network such as the Internet, a data broadcast, etc.

Also, the present invention may be a computer system including a microprocessor and a memory, whereby the memory stores the computer programs, and the microprocessor operates in accordance with the computer programs.

Also, the present invention may be carried out by another independent computer system by transferring the programs or the digital signals which have been recorded on the recording media, or by transferring the programs or the digital signals via the network, etc.

(5) The present invention may be any combination of the above embodiment and modifications.

When a camera provided in a moving object captures an image, it often results in a situation where a disturbance affects the moving object and hence the captured image is different from an image that is originally scheduled to be captured. In such a situation, the image correction device of the present invention comes in useful since it can acquire the scheduled image by correcting the actual, captured image based on the difference between an actual position and a scheduled position of the moving object. Also, the image correction device of the present invention can be used as a video correction device that outputs a video after making corrections to still images that constitute the video.

The invention claimed is:

1. An image correction device for correcting at least one image that has been captured by a camera provided in a moving object, the image correction device comprising:
an image acquisition unit operable to acquire an image captured by a camera;
a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time;
a determination unit operable to determine an output image frame, by correcting a standard image frame in accordance with the acquired positional difference information;
a corrected image output unit operable to (i) trim the captured image in accordance with the determined output image frame to generate a corrected image that is enclosed by the determined output image frame, and (ii) output the corrected image;
a camera information acquisition unit operable to acquire imaging direction information indicating at least one of (i) an actual imaging direction in a range of an optical axis of the camera along which the camera captures the image from the actual camera position, and (ii) a scheduled imaging direction in a range of an optical axis of the camera along which the camera is scheduled to perform an image capturing from the scheduled camera position,
wherein the standard image frame is located within the captured image in a position that is determined by a first reference point, and the determination unit comprises:
a decomposition subunit operable to, in accordance with the acquired imaging direction information, decompose the difference indicated by the positional difference information into (i) a first component that extends along the imaging direction indicated by the imaging direction information, and (ii) a second component that extends along a plane orthogonal to the imaging direction;
a size calculation subunit operable to determine a size of the output image frame, by correcting a size of the standard image frame in accordance with the first component; and
a point calculation subunit operable to determine a second reference point that determines a position in which the output image frame is located within the captured image, by shifting the first reference point of the standard image frame in accordance with the second component.

2. The image correction device of claim 1, wherein
the difference indicated by the positional difference information is a vector whose initial point is the scheduled camera position and whose terminal point is the actual camera position at the scheduled time,
the second component is a projection vector that is projected on the orthogonal plane, and
the point calculation subunit is operable to (i) calculate, in accordance with a magnitude of the projection vector, a shift amount by which the first reference point should be shifted, and (ii) shift the first reference point of the standard image frame by the calculated shift amount in a direction opposite to a direction pointed by the projection vector extending along the orthogonal plane.

3. The image correction device of claim 2, wherein
the camera information acquisition unit is further operable to acquire (i) angle-of-view information indicating at least one of (a) an angle of view of the camera positioned in the actual camera position at the scheduled time and (b) an angle of view that the camera is scheduled to have when performing the image capturing from the scheduled camera position, and (ii) distance information indicating at least one of (c) a distance between the actual camera position and a subject to be captured in the image and (d) a distance between the scheduled camera position and the subject to be captured,
the point calculation subunit is operable to (i) calculate a size of an imaging range in accordance with the acquired angle-of-view information and distance information, and (ii) calculate the shift amount in view of a ratio of the size of the imaging range to the magnitude of the projection vector.

4. The image correction device of claim 1, wherein
the difference is expressed by a vector whose initial point is the scheduled camera position and whose terminal point is the actual camera position at the scheduled time, and
the size calculation subunit determines the output image frame by (i) enlarging a the size of the standard image frame when the first component of the vector is pointing in a same direction as the imaging direction, or (ii) shrinking the size of the standard image frame when the first component of the vector is pointing in a direction opposite to the imaging direction.

5. The image correction device of claim 1, wherein
the size calculation subunit (i) includes a scale determination subunit operable to, in accordance with a magnitude of the first component, determine a scale according to which the size of the standard image frame should be corrected, and (ii) corrects the size of the standard image frame according to the determined scale.

6. The image correction device of claim 5, wherein
the difference indicated by the positional difference information is a vector whose initial point is the scheduled camera position and whose terminal point is the actual camera position at the scheduled time,
the magnitude of the first component of the vector is a, while a distance between the scheduled camera position and a subject to be captured in the image is b,
the camera information acquisition unit is further operable to acquire distance information indicating the distance between the scheduled camera position and the subject to be captured, and
the scale determination subunit determines the scale to be (i) b/(b−a) when the first component of the vector is pointing in the same direction as the imaging direction, and (ii) b/(b+a) when the first component of the vector is pointing in a direction opposite to the imaging direction.

7. The image correction device of claim 5, wherein
the corrected image output unit (i) includes an output image size adjustment subunit operable to (a) trim the captured image in accordance with the output image frame to generate the corrected image that is enclosed by the determined output image frame and (b) enlarge or shrink the corrected image by multiplying a size of the corrected image by a multiplicative inverse of the determined scale, and (ii) outputs the corrected image whose size has been multiplied by the multiplicative inverse of the determined scale.

8. The image correction device of claim 1, further comprising:
an imaging direction error information acquisition unit operable to acquire imaging direction error information indicating an error between (i) an actual imaging direction that is in range with an optical axis of the camera along which the camera captures the image from the actual camera position, and (ii) a scheduled imaging direction that is in range with an optical axis of the camera along which the camera is scheduled to perform an image capturing from the scheduled camera position, wherein
the determination unit determines the output image frame, by correcting the standard image frame in accordance with the positional difference information in view of the acquired imaging direction error information.

9. The image correction device of claim 8, further comprising:
a camera information acquisition unit operable to acquire imaging direction information indicating at least one of the actual imaging direction and the scheduled imaging direction,
wherein the standard image frame is located within the captured image in a position that is determined by a first reference point, and
the determination unit comprises:
a decomposition subunit operable to, in accordance with the acquired imaging direction information, decompose (i) the difference indicated by the positional difference information into (a) a first component that extends along the imaging direction indicated by the imaging direction information and (b) a second component that extends along a plane orthogonal to the imaging direction, and (ii) the error indicated by the imaging direction error information into (c) a first component that extends along the imaging direction indicated by the imaging direction information and (d) a second component that extends along a plane orthogonal to the imaging direction;
a size calculation subunit operable to determine a size of the output image frame, by correcting a size of the standard image frame in accordance with the first component of the difference and the first component of the error; and
a point calculation subunit operable to determine a second reference point that determines a position in which the output image frame is located within the captured image, by shifting the first reference point of the standard image frame in accordance with the second component of the difference and the second component of the error.

10. The image correction device of claim 1, wherein
the standard image frame is located within the captured image in a position that is determined by a first reference point, and the determination unit includes a point calculation subunit operable to determine a second reference point that determines a position in which the output image frame is located within the captured image, by shifting the first reference point of the standard image frame in accordance with the difference indicated by the positional difference information.

11. The image correction device of claim 1, further comprising:
an instruction information acquisition unit operable to acquire instruction information indicating a path that the moving object is scheduled to follow, wherein
the moving object makes the camera capture the image while moving in accordance with the instruction information, and
the scheduled camera position is on the path indicated by the instruction information.

12. The image correction device of claim 1, further comprising:
an image correction information acquisition unit operable to acquire and store therein image correction information that includes a correction method for correcting the standard image frame, the image correction information and the correction method corresponding to the difference indicated by the positional difference information, wherein
the determination unit determines the output image frame in accordance with the correction method, by reading out the correction method from the stored image correction information.

13. The image correction device of claim 1, wherein
the moving object makes the camera capture the at least one image that is used for generating a video,
the image correction device makes the determination unit determine the output image frame for each of the images, and
the corrected image output unit includes a video output subunit operable to output the video by (i) trimming each image in accordance with a corresponding one of the determined output image frames to generate at least one corrected image each of which is enclosed by the corresponding one of the output image frames, and (ii) reconstructing the corrected images in a video format.

14. An image correction device for correcting at least one image that has been captured by a camera provided in a moving object, the image correction device comprising:
an image acquisition unit operable to acquire an image captured by a camera;
a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time;

a determination unit operable to determine an output image frame, by correcting a standard image frame in accordance with the acquired positional difference information; and a corrected image output unit operable to (i) trim the captured image in accordance with the determined output image frame to generate a corrected image that is enclosed by the determined output image frame, and (ii) output the corrected image, wherein the camera can be rotated about an imaging direction that is in a range of an optical axis of the camera along which the camera captures the image at the scheduled time, the imaging direction serving as a rotation axis, the image correction device further comprises a roll angle information acquisition unit operable to acquire actual roll angle information indicating an actual rotation amount by which an imaging range has been rotated at the scheduled time, the actual rotation amount being expressed by means of an angle, and the determination unit determines the output image frame, by correcting the standard image frame in accordance with the positional difference information in view of the acquired actual roll angle information.

15. The image correction device of claim 14, wherein the roll angle information acquisition unit is further operable to acquire scheduled roll angle information indicating a scheduled rotation amount, by which the imaging range is scheduled to be rotated when the camera is in the scheduled camera position, the determination unit includes a rotation amount difference calculation subunit operable to calculate a rotation amount difference indicating a difference between (i) the scheduled rotation amount indicated by the acquired scheduled roll angle information and (ii) the actual rotation amount indicated by the acquired actual roll angle information, and the determination unit determines the output image frame, by rotating the corrected standard image frame according to the rotation amount difference calculated by the rotation amount difference calculation subunit.

16. The image correction device of claim 15, wherein the standard image frame is located within the captured image in a position that is determined by a first reference point, the determination unit further comprises:

a point calculation subunit operable to determine, in accordance with the positional difference information, a direction in which and a shift amount by which the first reference point of the standard image frame should be shifted; and a point correction subunit operable to (i) shift the first reference point by the determined shift amount in the determined direction, and (ii) rotate the shifted first reference point about the original first reference point of the standard image frame, by the actual rotation amount indicated by the actual roll angle information, in a direction opposite to a rotation direction suggested by the actual roll angle information, and wherein the determination unit determines the output image frame by (i) positionally determining a new image frame within the captured image in accordance with the shifted and rotated first reference point, and (ii) rotating the new image frame about the shifted and rotated first reference point, by the rotation amount difference calculated by the rotation amount difference calculation subunit, in a direction opposite to a rotation direction suggested by the rotation amount difference.

17. An image correction device for correcting at least one image that has been captured by a camera provided in a moving object, the image correction device comprising:

an image acquisition unit operable to acquire an image captured by a camera;

a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time;

a determination unit operable to determine an output image frame, by correcting a standard image frame in accordance with the acquired positional difference information; and a corrected image output unit operable to (i) trim the captured image in accordance with the determined output image frame to generate a corrected image that is enclosed by the determined output image frame, and (ii) output the corrected image, wherein the image correction device, further comprises:

a movement error information acquisition unit operable to acquire moving object movement error information indicating at least one of (i) an actual roll angle and a scheduled roll angle, (ii) an actual pitch angle and a scheduled pitch angle, and (iii) an actual yaw angle and a scheduled yaw angle, where the actual roll, pitch and yaw angles are of the moving object at the scheduled time, whereas the scheduled roll, pitch and yaw angles are of the moving object when the camera is in the scheduled camera position, and wherein the determination unit determines the output image frame, by correcting the standard image frame in accordance with the positional difference information in view of the acquired moving object movement error information.

18. The image correction device of claim 17, further comprising:

a camera information acquisition unit operable to acquire imaging direction information indicating at least one of (i) an actual imaging direction that is in range with an optical axis of the camera along which the camera captures the image from the actual camera position, and (ii) a scheduled imaging direction that is in range with the optical axis of the camera along which the camera is scheduled to perform an image capturing from the scheduled camera position, wherein the determination unit comprises:

a decomposition subunit operable to, in accordance with the acquired imaging direction information, decompose (i) the difference indicated by the positional difference information into (a) a first component that extends along the imaging direction indicated by the imaging direction information and (b) a second component that extends along a plane orthogonal to the imaging direction, and (ii) the difference indicated by the moving object movement error information into (c) a first component that extends along the imaging direction indicated by the imaging direction information and (d) a second component that extends along a plane orthogonal to the imaging direction;

a size calculation subunit operable to determine a size of the output image frame, by correcting a size of the standard image frame in accordance with a sum of (i) the first component of the difference indicated by the positional difference information and (ii) the first component of the difference indicated by the moving object movement error information; and a point calculation subunit operable to determine a second reference point that determines a position in which the output image frame is located within the captured image, by shifting the first reference point of the standard image frame in accordance with a sum of (i) the second component of the difference indicated by the positional difference information and (ii) the second component of the difference indicated by the moving object movement error information.

19. An image correction device for correcting at least one image that has been captured by a camera provided in a moving object, the image correction device comprising:

an image acquisition unit operable to acquire an image captured by a camera;

a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time;

a determination unit operable to determine an output image frame, by correcting a standard image frame in accordance with the acquired positional difference information; and a corrected image output unit operable to (i) trim the captured image in accordance with the determined output image frame to generate a corrected image that is enclosed by the determined output image frame, and (ii) output the corrected image, wherein the determination unit is operable to determine a size of the output image frame, by enlarging or shrinking a size of the standard image frame in accordance with the difference indicated by the positional difference information.

20. An image correction device for correcting at least one image that has been captured by a camera provided in a moving object, the image correction device comprising:

an image acquisition unit operable to acquire an image captured by a camera;

a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time;

a determination unit operable to determine an output image frame, by correcting a standard image frame in accordance with the acquired positional difference information; and a corrected image output unit operable to (i) trim the captured image in accordance with the determined output image frame to generate a corrected image that is enclosed by the determined output image frame, and (ii) output the corrected image; and an image correction information acquisition unit operable to acquire and store therein image correction information that includes a correction method for correcting the standard image frame, the image correction information and the correction method corresponding to the difference indicated by the positional difference information, wherein the determination unit determines the output image frame in accordance with the correction method, by reading out the correction method from the stored image correction information the standard image frame is located within the captured image in a position that is determined by a first reference point, the image correction information includes, in one-to-one correspondence, (i) a size of the output image frame and (ii) a second reference point that determines a position in which the output image frame is located within the captured image, and the determination unit determines the output image frame to be a frame specified by the size and the second reference point that are included in the image correction information.

21. An image correction system for correcting at least one image that has been captured by a camera provided in a moving object, the image correction system comprising:

a scheduled position reception unit operable to receive a scheduled camera position in which a camera is scheduled to be positioned at a scheduled time to capture an image;

a scheduled position information storage unit operable to store therein the received scheduled camera position as scheduled position information;

a trajectory information acquisition unit operable to acquire trajectory information indicating a trajectory that a moving object has actually followed;

a positional difference calculation unit operable to, in accordance with the scheduled position information and the acquired trajectory information, calculate a difference between (i) the scheduled camera position and (ii) an actual camera position in which the camera is positioned at the scheduled time;

a determination unit operable to determine an output image frame, by correcting a standard image frame in accordance with the difference calculated by the positional difference calculation unit;

a corrected image output unit operable to (i) trim the captured image in accordance with the determined output image frame to generate a corrected image that is enclosed by the determined output image frame, and (ii) output the corrected image; and a camera information acquisition unit operable to acquire imaging direction information indicating at least one of (i) an actual imaging direction in a range of an optical axis of the camera along which the camera captures the image from the actual camera position, and (ii) a scheduled imaging direction in a range of an optical axis of the camera along which the camera is scheduled to perform an image capturing from the scheduled camera position, wherein the standard image frame is located within the captured image in a position that is determined by a first reference point, and the determination unit comprises:

a decomposition subunit operable to, in accordance with the acquired imaging direction information, decompose the difference indicated by the positional difference information into (i) a first component that extends along the imaging direction indicated by the imaging direction information, and (ii) a second component that extends along a plane orthogonal to the imaging direction;

a size calculation subunit operable to determine a size of the output image frame, by correcting a size of the standard image frame in accordance with the first component; and a point calculation subunit operable to determine a second reference point that determines a position in which the output image frame is located within the captured image, by shifting the first reference point of the standard image frame in accordance with the second component.

22. An image correction method for correcting at least one image that has been captured by a camera provided in a moving object, comprising the steps of:

acquiring an image captured by a camera;

acquiring positional difference information indicating a difference between (i) a scheduled camera position in which the camera is scheduled to be positioned at a scheduled time to capture the image and (ii) an actual camera position in which the camera is positioned at the scheduled time;

determining an output image frame by correcting a standard image frame in accordance with the calculated difference; and trimming the captured image in accordance with the determined output image frame to generate a corrected image that is enclosed by the determined output image frame, and outputting the corrected image; and acquiring imaging direction information indicating at least one of (i) an actual imaging direction in a range of an optical axis of the camera along which the camera captures the image from the actual camera position, and (ii) a scheduled imaging direction in a range of an optical axis of the camera along which the camera is scheduled to perform an image capturing from the scheduled camera position, wherein the standard image frame is located within the captured image in a position that is determined by a first reference point, and the determining step further comprises:

in accordance with the acquired imaging direction information, decomposing the difference indicated by the positional difference information into (i) a first component that extends along the imaging direction indicated by the imaging direction information, and (ii) a second component that extends along a plane orthogonal to the imaging direction;

determining a size of the output image frame, by correcting a size of the standard image frame in accordance with the first component; and determining a second reference point that determines a position in which the output image frame is located within the captured image, by shifting the first reference point of the standard image frame in accordance with the second component.

23. A non-transitory computer-readable recording medium storing a control program that makes an image correction method perform image correction processing for correcting at least one image that has been captured by a camera provided in a moving object, the program causing a computer to perform steps comprising:

acquiring an image captured by a camera;

acquiring positional difference information indicating a difference between (i) a scheduled camera position in which the camera is scheduled to be positioned at a scheduled time to capture the image and (ii) an actual camera position in which the camera is positioned at the scheduled time;

determining an output image frame by correcting a standard image frame in accordance with the calculated difference;

trimming the captured image in accordance with the determined output image frame to generate a corrected image that is enclosed by the determined output image frame, and outputting the corrected image; and acquiring imaging direction information indicating at least one of (i) an actual imaging direction in a range of an optical axis of the camera along which the camera captures the image from the actual camera position, and (ii) a scheduled imaging direction in a range of an optical axis of the camera along which the camera is scheduled to perform an image capturing from the scheduled camera position, wherein the standard image frame is located within the captured image in a position that is determined by a first reference point, and the determination step further comprises:

in accordance with the acquired imaging direction information, decomposing the difference indicated by the positional difference information into (i) a first component that extends along the imaging direction indicated by the imaging direction information, and (ii) a second component that extends along a plane orthogonal to the imaging direction;

determining a size of the output image frame, by correcting a size of the standard image frame in accordance with the first component; and determining a second reference point that determines a position in which the output image frame is located within the captured image, by shifting the first reference point of the standard image frame in accordance with the second component .

24. An integrated circuit that performs image correction processing for correcting at least one image that has been captured by a camera provided in a moving object, comprising:

an image acquisition unit operable to acquire an image captured by a camera;

a difference acquisition unit operable to acquire positional difference information indicating a difference between (i) a scheduled camera position in which the camera is scheduled to be positioned at a scheduled time to capture the image and (ii) an actual camera position in which the camera is positioned at the scheduled time;

a determination unit operable to determine an output image frame by correcting a standard image frame in accordance with the calculated difference; and a corrected image output unit operable to (i) trim the captured image in accordance with the determined output image frame to generate a corrected image that is enclosed by the determined output image frame, and (ii) output the corrected image; and a camera information acquisition unit operable to acquire imaging direction information indicating at least one of (i) an actual imaging direction in a range of an optical axis of the camera along which the camera captures the image from the actual camera position, and (ii) a scheduled imaging direction in a range of an optical axis of the camera along which the camera is scheduled to perform an image capturing from the scheduled camera position, wherein the standard image frame is located within the captured image in a position that is determined by a first reference point, and the determination unit comprises:

a decomposition subunit operable to, in accordance with the acquired imaging direction information, decompose the difference indicated by the positional difference information into (i) a first component that extends along the imaging direction indicated by the imaging direction information, and (ii) a second component that extends along a plane orthogonal to the imaging direction;
a size calculation subunit operable to determine a size of the output image frame, by correcting a size of the standard image frame in accordance with the first component; and
a point calculation subunit operable to determine a second reference point that determines a position in which the output image frame is located within the captured image, by shifting the first reference point of the standard image frame in accordance with the second component.

* * * * *